United States Patent
Oishi et al.

(10) Patent No.: US 9,556,312 B2
(45) Date of Patent: *Jan. 31, 2017

(54) POLYIMIDE PRECURSOR, POLYIMIDE, POLYIMIDE FILM, POLYIMIDE METAL LAMINATE, AND POLYIMIDE SOLUTION

(71) Applicants: National University Corporation Iwate University, Morioka-shi (JP); Ube Industries, Ltd., Ube-shi (JP)

(72) Inventors: Yoshiyuki Oishi, Morioka (JP); Shin-ichiro Kohama, Ube (JP); Nobuharu Hisano, Ube (JP)

(73) Assignees: NATIONAL UNIVERSITY CORPORATION IWATE UNIVERSITY, Morioka-shi (JP); UBE INDUSTRIES, LTD., Ube-shi (JP)

( * ) Notice: Subject to any disclaimer, the term of this patent is extended or adjusted under 35 U.S.C. 154(b) by 188 days.

This patent is subject to a terminal disclaimer.

(21) Appl. No.: 14/401,058

(22) PCT Filed: May 14, 2013

(86) PCT No.: PCT/JP2013/063387
§ 371 (c)(1),
(2) Date: Nov. 13, 2014

(87) PCT Pub. No.: WO2013/172331
PCT Pub. Date: Nov. 21, 2013

(65) Prior Publication Data
US 2015/0132591 A1 May 14, 2015

(30) Foreign Application Priority Data

May 14, 2012 (JP) ................................. 2012-111028
May 14, 2012 (JP) ................................. 2012-111045
Nov. 14, 2012 (JP) ................................. 2012-250712

(51) Int. Cl.
| | |
|---|---|
| *B32B 15/08* | (2006.01) |
| *C08G 73/10* | (2006.01) |
| *B32B 15/088* | (2006.01) |
| *C08J 5/18* | (2006.01) |
| *C09D 179/08* | (2006.01) |

(52) U.S. Cl.
CPC ......... *C08G 73/1067* (2013.01); *B32B 15/088* (2013.01); *C08G 73/1085* (2013.01); *C08J 5/18* (2013.01); *C09D 179/08* (2013.01); *B32B 2379/08* (2013.01); *C08J 2379/08* (2013.01); *Y10T 428/31678* (2015.04); *Y10T 428/31681* (2015.04)

(58) Field of Classification Search
CPC ... C08G 73/1085; C08G 69/26; C07D 251/54; C07D 251/70; B32B 27/281; B32B 7/12; B32B 15/12; B32B 2427/00; Y10T 428/31678
See application file for complete search history.

(56) References Cited

U.S. PATENT DOCUMENTS

| 3,666,723 | A | | 5/1972 | Kray et al. |
| 3,755,322 | A | * | 8/1973 | Winter ................ C07D 251/52 544/196 |
| 3,803,075 | A | * | 4/1974 | Kray .................. C08G 73/1085 428/366 |
| 2012/0308816 | A1 | | 12/2012 | Kohama et al. |
| 2014/0066571 | A1 | | 3/2014 | Takasawa et al. |

FOREIGN PATENT DOCUMENTS

| JP | B-S48-8272 | 3/1973 | |
| JP | 52-3388 B1 * | 1/1977 | ............. C07D 25/18 |
| JP | A-2004-156001 | 6/2004 | |
| JP | A-2009-87763 | 4/2009 | |
| JP | A-2009-263570 | 11/2009 | |
| JP | A-2010-31102 | 2/2010 | |
| WO | WO 2011/099555 A1 | 8/2011 | |
| WO | WO 2012/124664 A1 | 9/2012 | |

OTHER PUBLICATIONS

STIC Search Report dated Jul. 6, 2016.*
International Preliminary report on Patentability in International Application No. PCT/JP2013/063387 dated Nov. 18, 2014.

* cited by examiner

*Primary Examiner* — Eisa Elhilo
(74) *Attorney, Agent, or Firm* — Knobbe Martens Olson & Bear LLP

(57) ABSTRACT

A polyimide precursor, a polyimide using the polyimide precursor, and a polyimide film using the polyimide. The polyimide film has excellent adhesiveness to a metal layer or an adhesive, and has improved heat resistance. The polyimide solution may be used as a coating material.

20 Claims, No Drawings

POLYIMIDE PRECURSOR, POLYIMIDE, POLYIMIDE FILM, POLYIMIDE METAL LAMINATE, AND POLYIMIDE SOLUTION

This application is the U.S. National Phase under 35 U.S.C. §371 of International Application No. PCT/JP2013/063387, filed May 14, 2013, designating the U.S., and published in Japanese as WO 2013/172331 on Nov. 21, 2013, which claims priority to Japanese Patent Application No. 2012-111028, filed May 14, 2012; Japanese Patent Application No. 2012-111045, filed May 14, 2012; and Japanese Patent Application No. 2012-250712, filed Nov. 14, 2012, the entire contents of which are incorporated herein by reference.

TECHNICAL FIELD

The present invention relates to a polyimide film excellent in adhesiveness with a metal layer or an adhesive and having improved heat resistance, a polyimide precursor to manufacture the polyimide film, a polyimide, a polyimide-metal laminate, and a polyimide solution useful in the field of coating material application and the like.

BACKGROUND ART

A polyimide film has been extensively used in the fields of electric/electronic devices, semiconductors and so on, because of its excellent heat resistance, chemical resistance, mechanical strength, electric properties, dimensional stability and so on. For example, for a flexible printed circuit board (FPC), there has been used a copper-clad laminated substrate where a copper foil is laminated on one or both sides of a polyimide film.

In general, a polyimide film may not provide a laminate having adequately high peeling strength when a metal layer is formed on a polyimide film by dry plating such as metal deposition and sputtering, or when a metal layer is formed on a polyimide film by wet plating such as electroless plating.

Many of polyimides, particularly many of high heat resistant polyimides mainly containing an aromatic group is insoluble in organic solvents. Therefore, a high heat resistant polyimide is produced by a method including forming a self-supporting film (may be referred to as a gel film) using a polyimide precursor solution such as polyamic acid which is not fully polyimidized, and heating it to complete imidization. Although soluble polyimides are also known, the soluble polyimides known to date are generally low heat resistant, and components of a polyimide having relatively high heat resistance is limited.

Patent Document 1 has described a polyimide prepared by using a triazine-based diamine, showing an example in which a polyimide solution is applied on a metal foil. In addition, as examples of the use of a triazine-based diamine, Patent Document 2 has disclosed an end-modified imide oligomer prepared by using a triazine-based diamine, and Patent Document 3 has disclosed a polymer electrolyte prepared by using a triazine-based diamine. Patent Document 4 discloses a polyimide which is prepared by using a triazine-based diamine having two amino groups (—NH$_2$) in para-positions in benzene rings relative to two NH groups bonded to the triazine rings (hereinafter, it may be referred as "p-ATDA"). Further, Patent Document 5 has disclosed that a laminate of a polyimide film prepared by using a triazine-based diamine and a metal foil has excellent adhesiveness and adherence.

PRIOR ART REFERENCES

Patent Documents

Patent Document 1: U.S. Pat. No. 3,803,075
Patent Document 2: Japanese Patent Laid-Open No. 2009-263570
Patent Document 3: Japanese Patent Laid-Open No. 2009-87763
Patent Document 4: Japanese Patent Laid-Open No. 2010-31102
Patent Document 5: WO2011/099555

SUMMARY OF THE INVENTION

Problem to be Solved by the Invention

A main aspect of the present invention has been made to improve the properties of a polyimide prepared by using a triazine-based diamine. Namely, an objective of an aspect of the present invention is to provide a polyimide precursor to give a polyimide film having excellent adhesiveness to an adhesive and/or adherence to a metal layer and having furthermore improved heat resistance, a polyimide using the polyimide precursor, and a polyimide film using the polyimide.

An objective of another aspect of the present invention is to provide a laminate of a polyimide film and an adhesive, and a polyimide-metal laminate formed by laminating a metal foil directly or via an adhesive layer.

As described above, soluble polyimides known to date have limitations on their components or properties, and therefore, they are inadequate to fully comply with various applications. Thus, it is considered technologically significantly important to provide a new polyimide solution because the improvement in the properties are expected in the field of protective film, insulating film, coating agent and the like, and also development to new applications are expected.

Therefore, an objective of a main aspect of the present invention is to provide a polyimide solution capable of forming a coating film having excellent properties.

Means for Solving the Problem

The aspects of the present invention are generally classified into two groups.

A main aspect of the present invention relates to a polyimide precursor comprising a structural unit represented by general formula (AI):

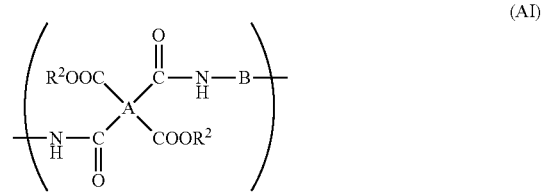

(in which A is tetravalent aromatic group or aliphatic group, B is divalent aromatic group, and $R^2$ independently each other represents hydrogen, alkyl having 1 to 6 carbon atoms, or alkylsilyl group having 3 to 9 carbon atoms), wherein B in general formula (AI) comprises a triazine moiety represented by following formula (AB1):

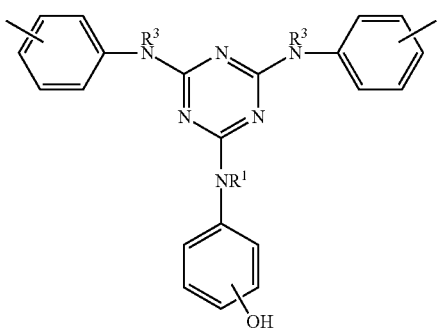

(in which $R^1$ denotes hydrogen, alkyl group having 1 to 6 carbon atoms or aromatic group, and $R^3$ denotes hydrogen, methyl or ethyl).

Another main aspect of the present invention relates to a polyimide solution comprising a polyimide dissolved in an organic solvent, the polyimide comprising a structural unit represented by general formula (BII):

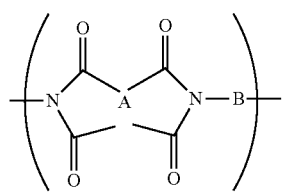

(in which A is tetravalent aromatic group or aliphatic group, and B is divalent aromatic group)

wherein in the polyimide, B in general formula (BII) comprises a triazine moiety represented by following formula (BB1):

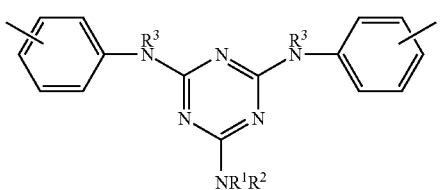

(in which $R^1$ and $R^2$, independently each other, denote hydrogen or alkyl or aryl having 1 to 12 carbon atoms, and $R^3$ denotes hydrogen, methyl or ethyl.).

Effect of the Invention

According to an aspect of the present invention, there is provided a polyimide precursor to give a polyimide film having excellent adhesiveness to an adhesive and/or adherence to a metal layer and having furthermore improved heat resistance, a polyimide using the polyimide precursor, and a polyimide film using the polyimide.

According to an aspect of the present invention, there is provided a polyimide solution capable of forming a coating film having excellent properties.

Embodiment for Carrying out the Invention

The present invention is generally classified into two groups, which are referred as the invention of Part A and the invention of Part B. The explanation will be given to the inventions of Part A and Part B, separately.

<<Part A>>

The invention of Part A relates to the following items.

1. A polyimide precursor comprising a structural unit represented by general formula (AI):

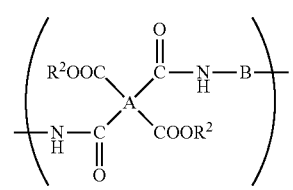

(in which A is tetravalent aromatic group or aliphatic group, B is divalent aromatic group, and $R^2$ independently each other represents hydrogen, alkyl having 1 to 6 carbon atoms, or alkylsilyl group having 3 to 9 carbon atoms), wherein B in general formula (AI) comprises a triazine moiety represented by following formula (AB1):

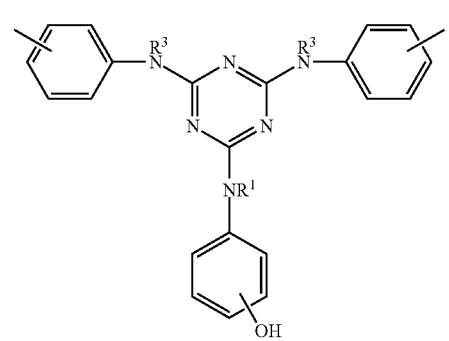

(in which $R^1$ denotes hydrogen, alkyl group having 1 to 6 carbon atoms or aromatic group, and $R^3$ denotes hydrogen, methyl or ethyl).

2. A polyimide precursor according to the above item 1, wherein A in general formula (AI) comprises tetravalent aromatic group obtainable by removing two carboxylic anhydride groups from a compound selected from 3,3',4,4'-biphenyltetracarboxylic dianhydride, 4,4'-oxydiphthalic dianhydride and 3,3',4,4'-benzophenonetetracarboxylic dianhydride.

3. A polyimide precursor according to the above item 1, wherein A in general formula (AI) comprises tetravalent aromatic group obtainable by removing two carboxylic anhydride groups from pyromellitic dianhydride.

4. A polyimide precursor according to any one of the above items 1 to 3, wherein B in general formula (AI) comprises the triazine moiety represented by general formula (AB1) in an amount of 10 to 100 mol %.

5. A polyimide obtainable from the polyimide precursor according to any one of the above items 1 to 4, comprising a structural unit represented by general formula (AII):

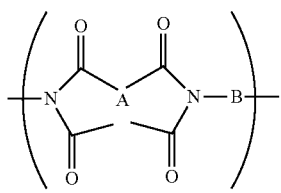

(BII)

(in which A and B are groups as defined above).

6. A polyimide film comprising the polyimide according to the above item 5.
7. A metal laminate comprising the polyimide film according to the above item 6 and a metal layer laminated on the polyimide film directly or via an adhesive.
8. A process for manufacturing a polyimide film, comprising the steps of:
   reacting a tetracarboxylic dianhydride component with a diamine component comprising a diamine compound represented by general formula (AB2) in an organic solvent,
   removing the organic solvent to obtain a solid polyimide,
   dissolving the solid polyimide in a organic solvent,
   flow-casting or applying the obtained polyimide solution on a support, and
   heating at 80 to 150° C. or lower.

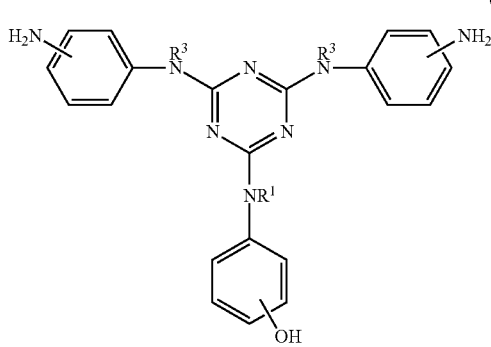

(AB2)

9. A process for manufacturing a polyimide film, comprising the steps of:
   reacting a tetracarboxylic dianhydride component with a diamine component comprising a diamine compound represented by general formula (AB2) in an organic solvent,
   removing the organic solvent to obtain a solid polyimide,
   dissolving the solid polyimide in a organic solvent,
   flow-casting or applying the obtained polyimide solution on a support, and
   heating at 280 to 350° C. or lower.

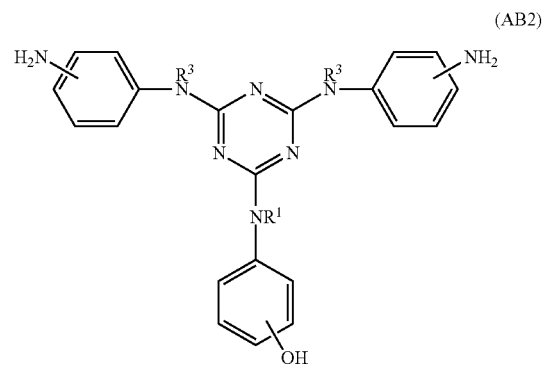

(AB2)

According to the invention of Part A, there is provided a polyimide precursor to give a polyimide film having excellent adhesiveness to an adhesive and/or adherence to a metal layer and having furthermore improved heat resistance, a polyimide using the polyimide precursor, and a polyimide film using the polyimide.

According to an aspect of the invention of Part A, there is provided a laminate of a polyimide film and an adhesive and a polyimide-metal laminate formed by laminating a metal foil directly or via an adhesive layer.

<<Embodiment of the Invention of Part A>>

The embodiments of the invention of Part A will be described in details.

The polyimide precursor (polyamic acid) comprises a structural unit represented by general formula (AI):

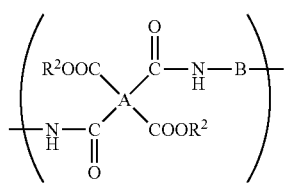

(AI)

(in which A is tetravalent aromatic group or aliphatic group, B is a divalent aromatic group, and $R^2$ represents hydrogen, alkyl having 1 to 6 carbon atoms, or alkylsilyl group having 3 to 9 carbon atoms).

A is a residue obtainable by removing four COOH groups from tetracarboxylic acid (i.e. a residue obtainable by removing two carboxylic anhydride groups $(CO)_2O$ from tetracarboxylic dianhydride), and B is a residue obtainable removing two $NH_2$ groups from diamine. In formula (AI), $R^2$ is preferably hydrogen or alkylsilyl group having 3 to 9 carbon atoms etc.

The polyimide obtained from the polyimide precursor comprises a structural unit represented by general formula (AII):

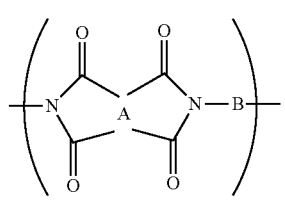

(AII)

(in which A is tetravalent aromatic group or aliphatic group, and B is a divalent aromatic group).

A is a residue obtainable by removing four COOH groups from tetracarboxylic acid (i.e. a residue obtainable by removing two carboxylic anhydride groups $(CO)_2O$ from tetracarboxylic dianhydride), and B is a residue obtainable removing two $NH_2$ groups from diamine. Hereinafter, tetracarboxylic acid and tetracarboxylic dianhydride used for the reaction of the process for producing polyimides are referred to as tetracarboxylic acid component, and diamines are referred to as diamine component. A and B in formulae (AI) and (AII) are included in the polyimide structure originated from tetracarboxylic acid component and diamine component, respectively.

In the polyimide precursor and polyimide of the invention of Part A, B in general formulae (AI) and (AII) comprise a triazine moiety represented by following formula (AB1):

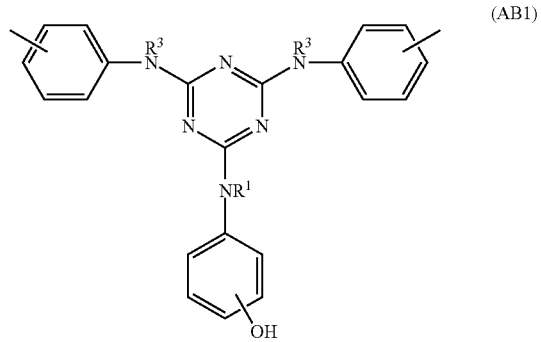

(AB1)

(in which $R^1$ denotes hydrogen, alkyl group having 1 to 6 carbon atoms or aromatic group, and $R^3$ denotes hydrogen, methyl or ethyl). For B in the polyimide precursor and the polyimide, the proportion of the group represented by formula (AB1) is more than 0 to 100 mol %, preferably 5 to 100 mol % and further preferably 10 to 100 mol %.

Originated from 2,4-bis(aminoanilino)-6-substituted amino-1,3,5-triazine used as a diamine component, the structure of formula (AB1) is introduced in the polyimide precursor and the polyimide. The details of the structure of formula (AB1) will be clear from the description about diamine components described below.

In formula (AB1), aliphatic alkyl group for $R^1$ has preferably 1 to 3 carbon atoms and aromatic group for $R^1$ has preferably 6 to 12 carbon atoms and is preferably phenyl, biphenyl or naphthyl. $R^1$ is preferably hydrogen or alkyl having 1 to 3 carbon atoms. In formula (AB1), $R^3$ is preferably hydrogen or methyl, and more preferably hydrogen.

The polyimide precursor of the invention of Part A is preferably in the form of solution in view of handling properties. The polyimide of the invention of Part A may be in the form of film, powder, solution and any other desired form, but the following explanation will be given to, as an example, a production of a polyimide film.

The polyimide film is obtained by thermal imidization and/or chemical imidization, and in case that plurality of tetracarboxylic acid components and/or diamine components are included, it may be a random copolymer or block copolymer, or combination of these.

The thickness of the polyimide film is not particularly limited, but it is 5 to 120 μm, preferably 6 to 75 μm, further preferably 7 to 60 μm.

Examples of a process for manufacturing a polyimide film generally include:

(1) a process comprising flow-casting, on a support in a form of film, a polyamic acid solution or a polyamic acid solution composition containing, as necessary, additives selected from an imidization catalyst, a dehydrating agent, a release assisting agent and inorganic fine particles in a polyamic acid solution, drying the film by heating to give a self-supporting film, and then heating it for cyclodehydration and for desolvation to give a polyimide film;

(2) a process comprising flow-casting, on a support in a form of film, a polyamic acid solution composition prepared by adding a cyclization catalyst and a dehydrating agent and a further selected additive, as necessary, such as inorganic fine particles to a polyamic acid solution; then chemically cyclodehydrating it and, as necessary, drying it by heating to give a self-supporting film, which is then heated for desolvation and imidization to give a polyimide film;

(3) when a polyimide is soluble in an organic solvent, a process comprising flow-casting, on a support in a form of film, a polyimide solution composition containing selected additives such as a release assisting agent and inorganic fine particles, drying by heating it to partially or completely remove a solvent, and then heating it to a maximum heating temperature to give a polyimide film: and (4) when a polyimide is soluble in an organic solvent, a process for producing a polyimide film by flow-casting, on a support in a form of film, a polyimide solution composition containing selected additives such as a release assisting agent and inorganic fine particles, heating the film to a maximum heating temperature while a solvent is removed, to give a polyimide film.

In the above production processes, the heating process after forming a self-supporting film is conducted at such a temperature that a maximum heating temperature is preferably 300° C. or higher, 350° C. or higher, further 450° C. or higher. This improves peeling strength after a heat treatment.

In the heating at a maximum heating temperature in the above production processes, the film may be heated on the support or heated after peeled from the support.

The polyimide film is preferably produced from a polyimide precursor (polyamic acid).

There will be described production processes and starting materials used for the polyimide precursor and the polyimide.

<Tetracarboxylic Acid Component and Diamine Component>

The tetracarboxylic acid dianhydride constituting the tetracarboxylic acid component may be an aromatic one or an aliphatic one.

The specific examples of aromatic tetracarboxylic dianhydrides include 3,3',4,4'-biphenyl tetracarboxylic dianhydride (s-BPDA), pyromellitic dianhydride, 2,3,3',4'-biphenyl tetracarboxylic dianhydride, 4,4'-oxydiphthalic dianhydride, diphenyl sulfone-3,4,3',4'-tetracarboxylic dianhydride, bis(3,4-dicarboxyphenyl)sulfide dianhydride, 2,2-bis(3,4-dicarboxyphenyl)-1,1,1,3,3,3-hexafluoropropane dianhydride (another nomenclature: 4,4'-(hexafluoroisopropylidene)diphthalic dianhydride), 2,3,3',4'-benzophenone tetracarboxylic dianhydride, 3,3',4,4'-benzophenone tetracarboxylic dianhydride, bis(3,4-dicarboxyphenyl)methane dianhydride, 2,2-bis(3,4-dicarboxyphenyl)propane dianhydride, p-phenylene bis(trimellitic acid monoester anhydride), p-biphenylene bis(trimellitic acid monoester anhydride), m-terphenyl-3,4,3',4'-tetracarboxylic dianhydride, p-terphenyl-3,4,3',4'-tetracarboxylic dianhydride, 1,3-bis(3,4-dicarboxyphenoxy)benzene dianhydride, 1,4-bis(3,4-dicarboxyphenoxy)benzene dianhydride, 1,4-bis(3,4-dicarboxyphenoxy)biphenyl dianhydride, 2,2-bis[(3,4-dicarboxyphenoxy)phenyl]propane dianhydride, 2,3,6,7-naphthalene tetracarboxylic dianhydride, 1,4,5,8-naphthalene tetracarboxylic dianhydride, 4,4'-(2,2-hexafluoroisopropylidene)diphthalic dianhydride. These are used alone or in combination of two or more. The tetracarboxylic dianhydride used herein is suitably selected in consideration of desired properties and the like.

As aliphatic tetracarboxylic dianhydrides, alicyclic tetracarboxylic dianhydrides are preferably used. The examples of the alicyclic tetracarboxylic dianhydrides include the following ones and their derivatives.

(1S,2R,4S,5R)-cyclohexanetetracarboxylic dianhydride,
(cis,cis,cis1,2,4,5-cyclohexanetetracarboxylic dianhydride),
(1S,2S,4R,5R)-cyclohexanetetracarboxylic dianhydride,
(1R,2S,4S,5R)-cyclohexanetetracarboxylic dianhydride,
bicyclo[2.2.2]octane-2,3,5,6-tetracarboxylic dianhydride,
bicyclo[2.2.2]oct-7-ene-2,3,5,6-tetracarboxylic dianhydride,
4-(2,5-dioxo tetrahydrofuran-3-yl)-tetralin-1,2 dicarboxylic anhydride,
tetrahydrofuran-2,3,4,5-tetracarboxylic dianhydride,
bicyclo-3,3',4,4'-tetracarboxylic dianhydride,
1,2,3,4-cyclopentanetetracarboxylic dianhydride,
1,2,3,4-cyclobutanetetracarboxylic dianhydride (may be referred to as "CBDA"),
1,3-dimethyl-1,2,3,4-cyclobutanetetracarboxylic dianhydride,
1,4-dimethyl-1,2,3,4-cyclobutanetetracarboxylic dianhydride,
1,2,3,4-cyclohexanetetracarboxylic dianhydride,
pentacyclo[8.2.1.1$^{4,7}$.0$^{2,9}$.0$^{3,8}$]tetradecane-5,8,11,12-tetracarboxylic dianhydride,
5-(2,5-dioxotetrahydrofuryl)-3-methyl-3-cyclohexene-1,2-dicarboxylic anhydride,
cyclohex-1-ene-2,3,5,6-tetracarboxylic dianhydride, and
bicyclo[2.2.1]heptane-2,3,5,6-tetracarboxylic dianhydride.

These alicyclic tetracarboxylic dianhydrides may be used alone or in combination of two or more.

The tetracarboxylic acid component preferably comprises at least an acid dianhydride selected from 3,3',4,4'-biphenyl tetracarboxylic dianhydride (s-BPDA), pyromellitic dianhydride (PMDA), 4,4'-oxydiphthalic dianhydride (ODPA), 3,3',4,4'-benzophenone tetracarboxylic dianhydride (BTDA), 1,2,3,4-cyclobutanetetracarboxylic dianhydride (CBDA), 2,2-bis(3,4-dicarboxyphenyl)-1,1,1,3,3,3-hexafluoropropane dianhydride (6 FDA) and 3,4,3',4'-diphenylsulfone tetracarboxylic dianhydride (DSDA).

In a preferred embodiment of the invention of Part A, the tetracarboxylic acid component preferably comprises an acid dianhydride selected from 3,3',4,4'-biphenyl tetracarboxylic dianhydride (s-BPDA), 4,4'-oxydiphthalic dianhydride (ODPA) and 3,3',4,4'-benzophenone tetracarboxylic dianhydride (BTDA). When these acid dianhydrides are used in combination with 2,4-bis(aminoanilino)-6-hydroxyphenyl-substituted amino-1,3,5-triazine represented by formula (AB2), polyimides having higher temperature in terms of 10% weight loss temperature heated under nitrogen and polyimides having higher glass transition temperature are obtained in comparison with the cases where the conventional triazine-based diamines are used.

In this embodiment, the acid dianhydride selected from s-BPDA, ODPA and BTDA is preferably contained in an amount of 50 mol % or more, more preferably 70 mol % or more, particularly preferably 75 mol % or more in 100 mol % of tetracarboxylic acid component.

In another preferred embodiment of the invention of Part A, the tetracarboxylic acid component preferably comprises pyromellitic dianhydride (PMDA). When PMDA is used in combination with 2,4-bis(aminoanilino)-6-hydroxyphenyl substituted amino-1,3,5-triazine represented by formula (AB2), the solubility of the polyimide to an organic solvent is improved in comparison with the cases where the conventional triazine-based diamines are used.

In this embodiment, PMDA is preferably contained in an amount of 50 mol % or more, more preferably 70 mol % or more, particularly preferably 75 mol % or more in 100 mol % of tetracarboxylic acid component.

The example and preferred structure of A in general formulae (AI) and (AII) correspond to the tetravalent residue obtainable by removing two carboxylic anhydride groups from the above tetracarboxylic dianhydrides, and the proportion thereof corresponds to the description of the above tetracarboxylic acid component.

The diamine component comprises a diamine compound represented by general formula (AB2).

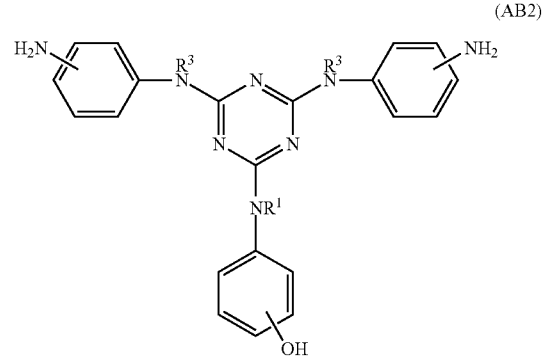

(AB2)

In the formula, $R^1$ denotes hydrogen, alkyl group having 1 to 6 carbon atoms or aromatic group, and $R^3$ denotes hydrogen, methyl or ethyl. Aliphatic alkyl group for $R^1$ has preferably 1 to 3 carbon atoms and aromatic group for R' has preferably 6 to 12 carbon atoms and is preferably phenyl, biphenyl or naphthyl. $R^1$ is preferably hydrogen or alkyl having 1 to 3 carbon atoms. In formula (AB2), $R^3$ is preferably hydrogen or methyl, and more preferably hydrogen.

In the diamine compound represented by general formula (AB2), aminoanilino groups (N-substituted or non-substituted) connected to two NH groups bonded to the triazine ring are not particularly limited, but they are preferably 4-aminoanilino (para-position) or 3-aminoanilino (mata-position). The substitution position of OH group in hydroxyphenyl group is not particularly limited, but it is preferably ortho-position or para-position.

The specific examples of diamine represented by general formula (AB2) include 2,4-bis(4-aminoanilino)-6-(4-hydroxyanilino)-1,3,5-triazine, 2,4-bis(3-aminoanilino)-6-(4-hydroxyanilino)-1,3,5-triazine, 2,4-bis(4-aminoanilino)-6-(N-methyl-4-hydroxyanilino)-1,3,5-triazine, 2,4-bis(3-aminoanilino)-6-(N-methyl-4-hydroxyanilino)-1,3,5-triazine, 2,4-bis(4-aminoanilino)-6-(2-hydroxyanilino)-1,3,5-triazine, 2,4-bis(3-aminoanilino)-6-(2-hydroxyanilino)-1,3,5-triazine, 2,4-bis(4-aminoanilino)-6-(N-methyl-2-hydroxyanilino)-1,3,5-triazine, and 2,4-bis(3-aminoanilino)-6-(N-methyl-2-hydroxyanilino)-1,3,5-triazine.

The diamine component may comprise diamine compound(s) that is generally used in the production of polyimide in addition to the diamine compound represented by general formula (AB2). The specific examples include:

1) diamines having one benzene ring, such as paraphenylene diamine(1,4-diaminobenzene; PPD), 1,3-diaminobenzene, 2,4-toluenediamine, 2,5-toluenediamine, 2,6-toluenediamine, 2) diamines having two benzene rings, for example diaminodiphenyl ethers, such as 4,4'-diaminodiphenyl ether (ODA), 3,3'-diaminodiphenyl ether, 3,4'-diaminodiphenyl ether; 4,4'-diaminodiphenyl methane, 3,3'-dimethyl-4,4'-diaminobiphenyl, 2,2'-dimethyl-4,4'-diaminobiphenyl, 2,2'-bis(trifluoromethyl)-4,4'-diaminobiphenyl, 3,3'-dimethyl-4,4'-diaminodiphenyl methane, 3,3'-dicarboxy-4,4'-diaminodiphenyl methane, 3,3',5,5'-tetramethyl-4,4'-diaminodiphenyl methane, bis(4-aminophenyl)sulfide, 4,4'-diaminobenzanilide, 3,3'-dichlorobenzidine, 3,3'-dimethylbenzidine, 2,2'-dimethylbenzidine, 3,3'-dimethoxybenzidine, 2,2'-dimethoxybenzidine, 3,3'-diaminodiphenyl ether, 3,4'-diaminodiphenyl ether, 4,4'-diaminodiphenyl ether, 3,3'-diaminodiphenyl sulfide, 3,4'-diaminodiphenyl sulfide, 4,4'-diaminodiphenyl sulfide, 3,3'-diaminodiphenyl sulfone, 3,4'-diaminodiphenyl sulfone, 4,4'-diaminodiphenyl sulfone, 3,3'-diaminobenzophenone, 3,3'-diamino-4,4'-dichlorobenzophenone, 3,3'-diamino-4,4'-dimethoxybenzophenone, 3,3'-diaminodiphenyl methane, 3,4'-diaminodiphenyl methane, 4,4'-diaminodiphenyl methane, 2,2-bis(3-aminophenyl)propane, 2,2-bis(4-aminophenyl)propane, 2,2-bis(3-aminophenyl)-1,1,1,3,3,3-hexafluoropropane, 2,2-bis(4-aminophenyl)-1,1,1,3,3,3-hexafluoropropane, 3,3'-diaminodiphenyl sulfoxide, 3,4'-diaminodiphenyl sulfoxide, 4,4'-diaminodiphenyl sulfoxide, 3) diamines having three benzene rings, for example, 1,3-bis(3-aminophenyl)benzene, 1,3-bis(4-aminophenyl)benzene, 1,4-bis(3-aminophenyl)benzene, 1,4-bis(4-aminophenyl)benzene, 1,3-bis(4-aminophenoxy)benzene, 1,4-bis(3-aminophenoxy)benzene, 1,4-bis(4-aminophenoxy)benzene, 1,3-bis(3-aminophenoxy)-4-trifluoromethylbenzene, 3,3'-diamino-4-(4-phenyl)phenoxybenzophenone, 3,3'-diamino-4,4'-di(4-phenylphenoxy)benzophenone, 1,3-bis(3-aminophenylsulfide)benzene, 1,3-bis(4-aminophenylsulfide)benzene, 1,4-bis(4-aminophenylsulfide)benzene, 1,3-bis(3-aminophenylsulfone)benzene, 1,3-bis(4-aminophenylsulfone)benzene, 1,4-bis(4-aminophenylsulfone)benzene, 1,3-bis[2-(4-aminophenyl)isopropyl]benzene, 1,4-bis[2-(3-aminophenyl)isopropyl]benzene, 1,4-bis[2-(4-aminophenyl)isopropyl]benzene, 4) diamines having four benzene rings, for example, 3,3'-bis(3-aminophenoxy)biphenyl, 3,3'-bis(4-aminophenoxy)biphenyl, 4,4'-bis(3-aminophenoxy)biphenyl, 4,4'-bis(4-aminophenoxy)biphenyl, bis[3-(3-aminophenoxy)phenyl]ether, bis[3-(4-aminophenoxy)phenyl]ether, bis[4-(3-aminophenoxy)phenyl]ether, bis[4-(4-aminophenoxy)phenyl]ether, bis[3-(3-aminophenoxy)phenyl]ketone, bis[3-(4-aminophenoxy)phenyl]ketone, bis[4-(3-aminophenoxy)phenyl]ketone, bis[4-(4-aminophenoxy)phenyl]ketone, bis[3-(3-aminophenoxy)phenyl]sulfide, bis[3-(4-aminophenoxy)phenyl]sulfide, bis[4-(3-aminophenoxy)phenyl]sulfide, bis[4-(4-aminophenoxy)phenyl]sulfide, bis[3-(3-aminophenoxy)phenyl]sulfone, bis[3-(4-aminophenoxy)phenyl]sulfone, bis[4-(3-aminophenoxy)phenyl]sulfone, bis[4-(4-aminophenoxy)phenyl]sulfone, bis[3-(3-aminophenoxy)phenyl]methane, bis[3-(4-aminophenoxy)phenyl]methane, bis[4-(3-aminophenoxy)phenyl]methane, bis[4-(4-aminophenoxy)phenyl]methane, 2,2-bis[3-(3-aminophenoxy)phenyl]propane, 2,2-bis[3-(4-aminophenoxy)phenyl]propane, 2,2-bis[4-(3-aminophenoxy)phenyl]propane, 2,2-bis[4-(4-aminophenoxy)phenyl]propane, 2,2-bis[3-(3-aminophenoxy)phenyl]-1,1,1,3,3,3-hexafluoropropane, 2,2-bis[3-(4-aminophenoxy)phenyl]-1,1,1,3,3,3-hexafluoropropane, 2,2-bis[4-(3-aminophenoxy)phenyl]-1,1,1,3,3,3-hexafluoropropane, 2,2-bis[4-(4-aminophenoxy)phenyl]-1,1,1,3,3,3-hexafluoropropane.

These are used alone or in combination of two or more. The diamine used herein is suitably selected in consideration of desired properties and the like.

The diamine component may comprise triazine-based diamine compound(s) represented by general formula (C).

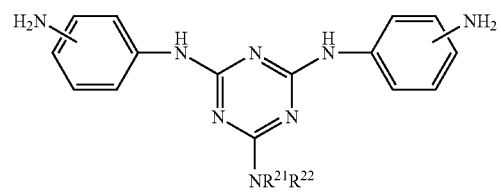

(C)

(in which $R^{21}$ denotes hydrogen or alkyl or aryl having 1 to 12 carbon atoms, and $R^{22}$ denotes hydrogen or alkyl or aryl having 1 to 12 carbon atoms).

The specific examples include 2,4-bis(3 or 4-aminoanilino)-6-benzylamino-1,3,5-triazine, 2,4-bis(3 or 4-aminoanilino)-6-naphthylamino-1,3,5-triazine, 2,4-bis(3 or 4-aminoanilino)-6-biphenylamino-1,3,5-triazine, 2,4-bis(3 or 4-aminoanilino)-6-diphenylamino-1,3,5-triazine, 2,4-bis(3 or 4-aminoanilino)-6-dibenzylamino-1,3,5-triazine, 2,4-bis(3 or 4-aminoanilino)-6-dinaphthylamino-1,3,5-triazine, 2,4-bis(3 or 4-aminoanilino)-6-N-methylanilino-1,3,5-triazine, 2,4-bis(3 or 4-aminoanilino)-6-N-methylnaphthylamino-1,3,5-triazine, 2,4-bis(3 or 4-aminoanilino)-6-methylamino-1,3,5-triazine, 2,4-bis(3 or 4-aminoanilino)-6-ethylamino-1,3,5-triazine, 2,4-bis(3 or 4-aminoanilino)-6-dimethylamino-1,3,5-triazine, 2,4-bis(3 or 4-aminoanilino)-6-diethylamino-1,3,5-triazine, 2,4-bis(3 or 4-aminoanilino)-6-dibutylamino-1,3,5-triazine, 2,4-bis(3 or 4-aminoanilino)-6-amino-1,3,5-triazine.

In the invention of Part A, the diamine compound represented by general formula (AB2) is used in an amount of more than 0 to 100 mol % or less, preferably 5 to 100 mol % and further preferably 10 to 100 mol %, and preferably 15 to 100 mol % and more preferably 17 to 100 mol %, and in a specific embodiment 25 to 100 mol % based on the total diamine component (=100 mol %).

When diamine(s) other than the diamine compound represented by formula (AB2) is used, the diamine component comprises diamine compound preferably selected from paraphenylene diamine (PPD) and diaminodiphenyl ethers, more preferably one or more compound selected from PPD, 4,4'-diaminodiphenyl ether and 3,4'-diaminodiphenyl ether, and particularly preferably PPD. The polyimide film obtained from these is excellent in mechanical property and the like.

The example and preferred structure of B in general formula (AI) correspond to the divalent residue obtainable by removing $NH_2$ from the above diamines, and the proportion thereof corresponds to the description of the above diamine component.

A polyimide of the invention of Part A is preferably free from at least one proton-conducting functional group selected from the group consisting of —SO₃H, —COOH and —PO₃H₂ as described in Patent Document 2, for excellent heat resistance.

<Preparation of Polyimide Precursor>

A polyimide precursor (polyamic acid) is produced by reacting a tetracarboxylic acid component and a diamine component; for example, substantially equimolar components may be reacted in an organic solvent to give a solution of a polyamic acid (partial imidization may be allowed to take place if the solution is maintained in homogeneous state). Alternatively, two or more polyamic acids in which one of the components is relatively excessively contained are preliminarily synthesized, and these polyamic acid solutions can be combined and mixed under the reaction conditions. The polyamic acid solution thus prepared can be used for production of a self-supporting film as it is or, as necessary, after removing or adding a solvent.

When a polyimide obtained is soluble in an organic solvent, the polyimide can be obtained by reacting a tetracarboxylic acid component and a diamine component. For example, a polyimide solution can be produced by reacting substantially equimolar components in an organic solvent. Alternatively, two or more polyimides in which one of the components is relatively excessively contained are preliminarily synthesized, and these polyimide solutions can be combined and mixed under the reaction conditions.

An organic solvent used herein for the polyamic acid solution or polyimide solution can be a known solvent such as N-methyl-2-pyrrolidone, N,N-dimethylformamide, N,N-dimethylacetamide and N,N-diethylacetamide. These organic solvents are used alone or in combination of two or more.

In the polymerization reaction of a polyamic acid and a polyimide, a concentration of the total monomers in an organic polar solvent can be appropriately selected depending on an intended use; for example, a concentration of the total monomers in an organic polar solvent is preferably 5 mass % to 30 mass %, further preferably 15 mass % to 27 mass %, particularly preferably 18 mass % to 26 mass %.

As an example of a process for preparing a polyamic acid, the above polymerization reaction of an aromatic tetracarboxylic acid component and an aromatic diamine component is conducted, for example, by mixing them in substantially equimolar amounts or in amounts such that one of them is slightly in excess of the other component (the acid component or the diamine component) and reacting them at a reaction temperature of 100° C. or lower, preferably 80° C. or lower for about 0.2 to 60 hours to give a polyamic acid solution.

As an example of a process for preparing a polyimide, the above polymerization reaction of an aromatic tetracarboxylic acid component and an aromatic diamine component is conducted, for example, by mixing them in substantially equimolar amounts or in amounts such that one of them is slightly in excess of the other component (the acid component or the diamine component) and processed by a known method to give a polyimide solution; for example, the mixture can be reacted at a reaction temperature of 140° C. or higher, preferably 160° C. or higher (preferably 250° C. or lower, further preferably 230° C. or lower) for about 1 to 60 hours to give a polyimide solution.

For thermal imidization, the polyamic acid solution may contain, as necessary, an imidization catalyst, an organic phosphorous-containing compound, inorganic fine particles or the like. For chemical imidization, the polyamic acid solution may contain, as necessary, a cyclization catalyst, a dehydrating agent, inorganic fine particles or the like. The polyimide solution may contain an organic phosphorous-containing compound, inorganic fine particles or the like. Furthermore, inorganic fine particles may be replaced by polyimide fine particles insoluble in an organic solvent.

Examples of an imidization catalyst include substituted or unsubstituted nitrogen-containing heterocyclic compounds, N-oxide compounds of the nitrogen-containing heterocyclic compounds, substituted or unsubstituted amino acid compounds, hydroxy-containing aromatic hydrocarbon compounds or aromatic heterocyclic compounds. Particularly preferably used is lower-alkylimidazoles such as 1,2-dimethylimidazole, N-methylimidazole, N-benzyl-2-methylimidazole, 2-methylimidazole, 2-ethyl-4-methylimidazole and 5-methylbenzimidazole; benzimidazoles such as N-benzyl-2-methylimidazole; isoquinoline; and substituted pyridines such as 3,5-dimethylpyridine, 3,4-dimethylpyridine, 2,5-dimethylpyridine, 2,4-dimethylpyridine and 4-n-propylpyridine. The amount of the imidization catalyst is preferably about 0.01 to 2 equivalents, particularly preferably about 0.02 to 1 equivalents based on amide acid units in a polyamide acid. The use of an imidization catalyst sometimes improves physical properties of a polyimide film obtained, particularly elongation and edge-break resistance.

Examples of an organic phosphorous-containing compound include phosphoric esters such as monocaproyl phosphoric ester, monooctyl phosphoric ester, monolauryl phosphoric ester, monomyristyl phosphoric ester, monocetyl phosphoric ester, monostearyl phosphoric ester, tirethyleneglycol monotridecyl ether monophosphoric ester, tetraethyleneglycol monolauryl ether monophosphoric ester, diethyleneglycol monostearyl ether monophosphoric ester, dicaproyl phosphoric ester, dioctyl phosphoric ester, dicapryl phosphoric ester, dilauryl phosphoric ester, dimyristyl phosphoric ester, dicetyl phosphoric ester, distearyl phosphoric ester, tetraethyleneglycol mononeopentyl ether diphosphoric ester, triethyleneglycol monotridecyl ether diphosphoric ester, tetraethyleneglycol monolauryl ether diphosphoric ester and diethyleneglycol monostearyl ether diphosphoric ester and amine salts of these phosphoric esters. Examples of an amine include ammonia, monomethylamine, monoethylamine, monopropylamine, monobutylamine, dimethylamine, diethylamine, dipropylamine, dibutylamine, trimethylamine, triethylamine, tripropylamine, tributylamine, monoethanolamine, diethanolamine and triethanolamine.

Examples of a cyclization catalyst include aliphatic tertiary amines such as trimethylamine and triethylenediamine; aromatic tertiary amines such as dimethylaniline; and heterocyclic tertiary amines such as isoquinoline, pyridine, a-picoline and 6-picoline.

Examples of a dehydrating agent include aliphatic carboxylic anhydrides such as acetic anhydride, propionic anhydride and butyric anhydride; and aromatic carboxylic anhydrides such as benzoic anhydride.

Examples of inorganic fine particles include inorganic oxide powders such as fine-particulate titanium dioxide powder, silicon dioxide (silica) powder, magnesium oxide powder, aluminum oxide (alumina) powder and zinc oxide powder; inorganic nitride powders such as fine-particulate silicon nitride powder and titanium nitride powder; inorganic carbide powders such as silicon carbide powder; and inorganic salt powders such as fine-particulate calcium carbonate powder, calcium sulfate powder and barium sulfate powder. These inorganic fine particles may be used in combination of two or more. For homogeneously dispersing these inorganic fine particles, a means known per se can be applied.

As the method for producing the polyimide precursor comprising a structural unit where $R^2$ representing alkyl having 1 to 6 carbon atoms or alkylsilyl group having carbon atoms in formula (AI), the method includes, for example, producing the polyamic acid as described above and esterifying it by reacting with an esterifying agent, or silylating it by reacting with a known silylating agent.

<Production of a Self-Supporting Film from a Polyamic Acid Solution>

A self-supporting film from a polyamic acid solution is produced by applying a polyamic acid solution on a support by flow casting and then heating it to such an extent that it becomes self-supporting state (it means it is in a stage before a usual curing process), for example, heating to such an extent that it can be peeled from the support.

There are no particular restrictions to a solid concentration of the polyamic acid solution used in the invention of Part A as long as a viscosity is within the range suitable for the production, but generally, it is preferably 5 to 30 mass %, further preferably 15 to 27 mass %, and particularly preferably 18 to 26 mass %.

A temperature and duration of heating in producing a self-supporting film is determined as appropriate. For thermal imidization, heating is conducted, for example, at a temperature of 50 to 180° C. for about 1 to 60 min.

There are no particular restrictions to a support as long as a polyamic acid solution can be cast on it, but it is preferably a smooth substrate; for example, a glass plate or a metal (for example, stainless steel) drum or belt.

There are no particular restrictions to the self-supporting film as long as a solvent has been removed such that the film can be peeled from a support and/or it is imidized, but in thermal imidization, a weight-loss-after-heating is preferably within the range of 20 to 50 mass % and when a weight-loss-after-heating is within the range of 20 to 50 mass % and an imidization rate is within the range of 7 to 55%, a self-supporting film has satisfactory mechanical properties.

Here, a weight-loss-after-heating of a self-supporting film is determined in accordance with the following equation from a mass of the self-supporting film (W1) and the mass of a cured film (W2).

Weight-loss-after-heating (mass %)={(W1-W2)/W1}×100

An imidization rate of the partially imidized self-supporting film is calculated by taking IR spectra of the self-supporting film and its fully-cured product (polyimide film) by the ATR method and determining an area or height of a vibrational band peak. A vibrational band peak employed can be, for example, a symmetric stretching vibration band of an imidocarbonyl group or a stretching vibration band of a benzene ring. More specifically, FT-IR spectra of a self-supporting film and its fully-cured film (polyimide film) were taken by the multireflection ATR method with Ge crystal and an incident angle of 45° using FT/IR6100 from JASCO Corporation, and an imidization rate was calculated in accordance with the following equation (1) using a ratio of a peak height of asymmetric stretching vibration of imidocarbonyl group at 1775 cm$^{-1}$ to a peak height of carbon-carbon symmetric stretching vibration of an aromatic ring at 1515 cm$^{-1}$.

Imidization rate (%)={(X1/X2)/(Y1/Y2)}×100    (1)

wherein
X1: peak height of a self-supporting film at 1775 cm$^{-1}$,
X2: peak height of a self-supporting film at 1515 cm$^{-1}$,
Y1: peak height of a fully-cured film at 1775 cm$^{-1}$,
Y2: peak height of a fully-cured film at 1515 cm$^{-1}$.

<Heating (Imidization) Process>

Subsequently, the self-supporting film is heated to give a polyimide film. The heating is conducted such that the maximum temperature is preferably 300° C. or higher, 350° C. or higher, more preferably 450° C. or higher, further preferably 470° C. or higher. There are no particular restrictions to the upper limit of the heating temperature as long as the properties of a polyimide film are not deteriorated; the temperature is preferably 600° C. or lower, more preferably 550° C. or lower, further preferably 530° C. or lower, most preferably 520° C. or lower.

One example of the heating process is the following manner. The heating is first conducted at a temperature of about 100° C. to lower than 350° C. for gradually imidizing the polymer and evaporating/removing the solvent over about 0.05 to 5 hours, particularly 0.1 to 3 hours. Particularly, the heating is preferably conducted stepwise, that is, the first heating at a relatively lower temperature of about 100° C. to about 170° C. for about 0.5 to 30 min, then the second heating at a temperature of higher than 170° C. and 220° C. or lower for about 0.5 to 30 min, then the third heating at an elevated temperature of higher than 220° C. and lower than 350° C. for about 0.5 to 30 min. Furthermore, it is preferable to conduct the fourth heating at a high temperature of 350° C. or higher and 600° C. or lower. The heating process can be conducted sequentially or continuously.

Heating (imidization) process of the self-supporting film may be carried out on the support or after peeled from the support. In heating in an industrial production, a long self-supporting film may be fixed at least at both edges in a direction perpendicular to its longitudinal direction, that is, in a width direction of the film by a fixing means such as pin tenters, clips and a frame in a cure furnace while the film is, if necessary, extended or contracted either in a width direction or in a longitudinal direction.

Then, the polyimide film produced as described above may be further processed by, for example, sandblasting, corona treatment, plasma treatment or etching.

<Production of Polyimide Film from Polyimide Solution>

As described in the aforementioned item of "Preparation of polyimide precursor", in case that a polyimide is soluble, the reaction may be advanced up to imidization in the organic solvent to obtain the solution of the polyimide. The obtained polyimide solution may be used as produced for the production of films. Alternatively, it is also preferred to obtain the polyimide as a solid, and then dissolve it in a suitable solvent to obtain a polyimide solution with a desired solvent and concentration. Preferred method to obtain the polyimide as a solid includes pouring the solution into a poor solvent for the polyimide to precipitate the polyimide.

Examples of organic solvents for the re-dissolving include N-methyl-2-pyrrolidone, N,N-dimethylformamide, N,N-dimethylacetamide and N,N-diethylacetamide.

The polyimide film is obtained by applying the obtained polyimide solution on a support and heating it at, for example, 50 to 450° C., more preferably 55° C. to 400° C., further preferably 60° C. to 350° C. to remove the solvent. The heating is performed for, for example, 0.05 to 20 hours, preferably 0.1 to 15 hours. The heating is preferably conducted stepwise, that is, the first heating at a relatively lower temperature of about 50° C. to 100° C. for about 1 to 10 hours, then the second heating at a temperature of higher than 100° C. and 150° C. or lower for about 0.5 to 10 hours, then the third heating at an elevated temperature of higher than 150° C. and 350° C. or lower for about 0.5 to 10 hours, and the fourth heating at a high temperature of higher than 350° C. and 450° C. or lower for about 0.5 to 10 hours. The heating process can be conducted sequentially or continuously, and, if necessary, under vacuum pressure.

In an embodiment of the invention of Part A, the solvent is removed by heating preferably at 150° C. or lower, preferably 80° C. to 150° C. This provides polyimides having solubility to organic solvents, particularly high solubility to even TMAH aqueous solution that is used as a developing fluid of resist materials.

In another embodiment of the invention of Part A, the solvent is removed by heating preferably at 200° C. or higher, preferably 280° C. to 350° C. This provides polyimides excellent in solvent resistance having relatively low solubility to organic solvents.

Thus, polyimides that suit to objects can be obtained by appropriately controlling the drying temperature.

<Polyimide Laminate and Polyimide-Metal Laminate>

A polyimide film of the present invention has excellent adhesiveness to substrates such as a metal foil or materials such as an adhesive. Thus, there will be formed a polyimide laminate in which the polyimide film of the invention of Part A and an adhesive layer are laminated, or a polyimide-metal laminate described later.

The examples of methods of producing a polyimide-metal laminate include methods of (1) laminating a polyimide film and a base material (for example, metal foil) directly or via an adhesive by compressing or heat-compressing, (2) forming a metal layer directly on a polyimide film by wet method (plating) or dry method (metalizing such as vacuum deposition or sputtering) and (3) coating a base material, such as metal foil, with the above mentioned polyamic acid solution or the polyimide solution and drying and imidizing (drying in case of polyimide solution).

As described above, a polyimide film, a polyimide-metal laminate (including both a laminate where a film and a metal layer are laminated via an adhesive layer and a laminate where a metal layer is directly formed on a film) and a polyimide laminate of the invention of Part A may be used as a material for electronic components and an electronic devices including a printed-wiring board, a flexible printed board, a TAB tape, a COF tape or a metal wiring, or a cover substrate for a metal wiring and a chip member such as an IC chip and a base substrate for a liquid crystal display, an organic electroluminescence display, an electronic paper, a solar battery and the like.

<Method for Producing Compound of General Formula (AB2)>

The compound having aminoanilino of para-position in general formula (AB2), i.e. 2,4-bis(4-aminoanilino)-6-substituted amino-1,3,5-triazine, is obtained by reacting 6-substituted amino-1,3,5-triazine-2,4-dihalide with excess of para-phenylene diamine. Analogous method is applied to the preparation of compounds in which $R^3$ is not H.

The compound having aminoanilino of meta-position, i.e. 2,4-bis(3-aminoanilino)-6-substituted amino-1,3,5-triazine, is prepared by the following method. Hereinafter, explanation is given to a compound in which $R^3$ is H, but analogous method is applied to the preparation of compounds in which $R^3$ is not H.

First, 6-substituted amino-1,3,5-triazine-2,4-dihalide represented by general formula (AB3) is prepared by reacting a cyanuric halide with an amino compound ($NHR^1R^2$) as shown in the following reaction scheme.

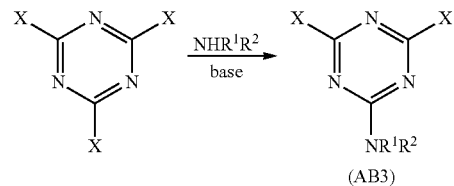

In the formula, X is halogen atom, preferably Cl, Br or I. As for $R^1$ and $R^2$, as defined for general formula (AB2), $R^1$ denotes hydrogen or methyl, $R^2$ denotes hydroxyphenyl. The base used herein is, for example, sodium carbonate and the like. Reaction temperature is, for example, 0 to 5° C.

Then, as shown in the following scheme, 6-substituted amino-1,3,5-triazine-2,4-dihalide represented by general formula (AB3) is reacted with 3-nitroaniline while refluxing to form 2,4-bis-(3-nitroanilino)-6-substituted amino-1,3,5-triazine represented by general formula (AB4).

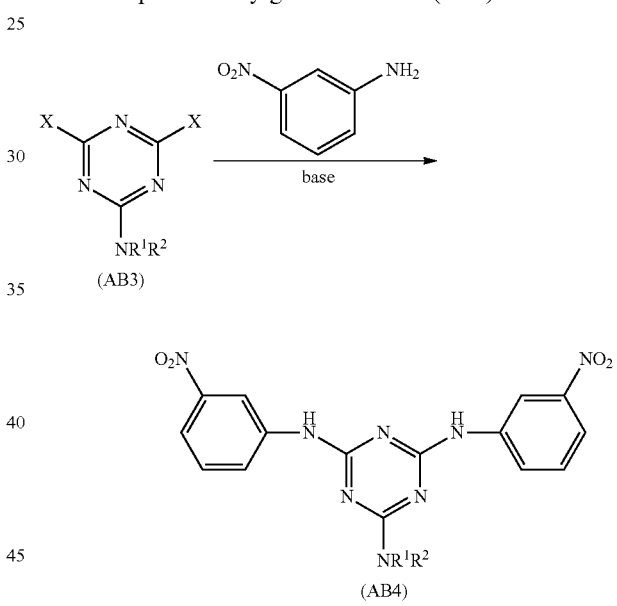

In the formula, X, $R^1$ and $R^2$ are the same as those mentioned above.

The above two reactions are preferably carried out in the presence of a base in a solvent. The base used herein is not particularly limited, and general inorganic base may be used, for example, sodium carbonate and the like.

Also, the solvent used herein is not particularly limited, but general solvents may be used, for example, ether-based solvents such as dioxane, tetrahydrofuran and diethyl ether; hydrocarbon-based solvent such as toluene and benzene; and amide-based solvents such as N, N-dimethylformamide, N, N-dimethylacetamide and N-methyl-2-pyrrolidone.

Then, 2,4-bis-(3-nitroanilino)-6-substituted amino-1,3,5-triazine represented by general formula (AB4) thus obtained is reduced to convert nitro groups to amino groups, thereby producing 2,4-bis(3-aminoanilino)-6-substituted amino-1,3, 5-triazine (AB2).

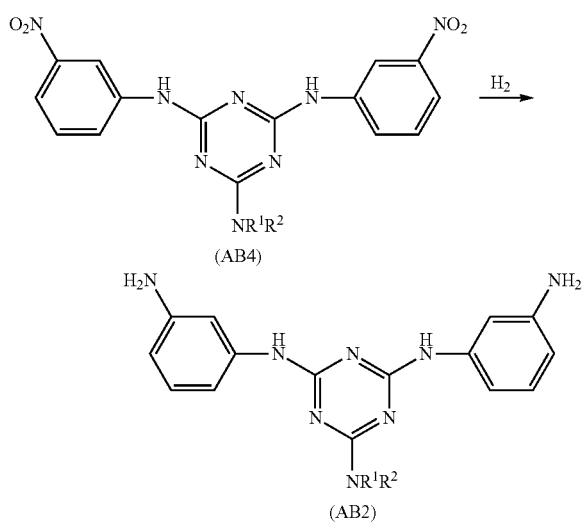

Any known reduction method may be used as the reduction reaction. For example, it may be carried out by hydrogenation in a solvent with suitably heating and for example, in the presence of suitable catalyst. As the catalyst, any known one may be used such as palladium supported on carbon and the like. The temperature for the reduction reaction is, for example, 60 to 80° C.

<<Part B>>

The invention of Part B will be explained. The invention of Part B relates to the following items.

1. A polyimide solution comprising a polyimide dissolved in an organic solvent, the polyimide comprising a structural unit represented by general formula (BII);

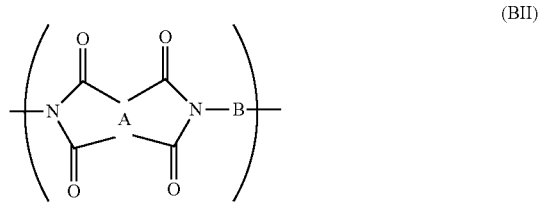

(in which A is tetravalent aromatic group or aliphatic group, and B is divalent aromatic group)

wherein in the polyimide, B in general formula (BII) comprises a triazine moiety represented by following formula (BB1):

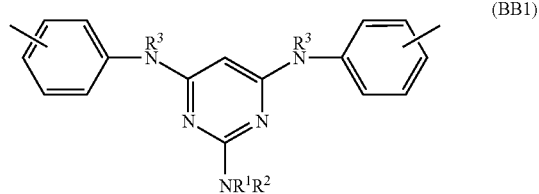

(in which $R^1$ and $R^2$, independently each other, denote hydrogen or alkyl or aryl having 1 to 12 carbon atoms, and $R^3$ denotes hydrogen, methyl or ethyl).

2. A polyimide solution according to the above item 1, wherein in the polyimide, B in general formula (BII) comprises the triazine moiety in which $R^1$ and $R^2$ are both phenyl.

3. A polyimide solution according to the above item 1 or 2, wherein in the polyimide, A in general formula (BII) comprises tetravalent residue obtainable by removing two carboxylic anhydride groups from a compound selected from 3,3',4,4'-biphenyltetracarboxylic dianhydride, 3,3',4,4'-diphenyl sulfone-tetracarboxylic dianhydride, 4,4'-oxydiphthalic dianhydride and 2,2-bis(3,4-dicarboxyphenyl)-1,1,1,3,3,3-hexafluoropropane dianhydride.

4. A polyimide solution according to the above item 1 or 2, wherein in the polyimide, A in general formula (BII) comprises tetravalent residue obtainable by removing two carboxylic anhydride groups from 2,2-bis(3,4-dicarboxyphenyl)-1,1,1,3,3,3-hexafluoropropane dianhydride.

5. A polyimide solution according to any one of the above items 1 to 4, wherein the organic solvent is selected from N-methylpyrrolidone, N,N-dimethylacetamide and γ-butyrolactone.

6. A polyimide solution according to the above item 4, wherein the organic solvent is selected from tetrahydrofuran and γ-butyrolactone.

7. A polyimide solution according to any one of the above items 1 to 6, wherein B in general formula (BII) comprises the triazine moiety represented by general formula (BB1) in an amount of 10 to 100 mol %.

8. A method for producing a polyimide solution according to any one of the above items 1 to 7, the method comprising the steps of;

producing a polyimide precursor solution comprising a polyimide precursor and a first organic solvent; the polyimide precursor comprising a structural unit represented by general formula (BI):

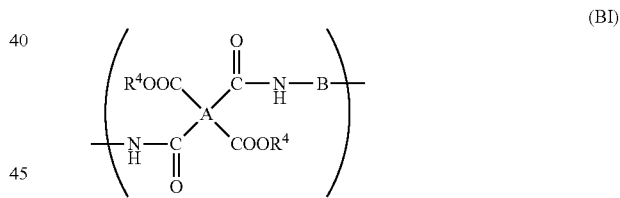

(in which A is tetravalent aromatic group or aliphatic group, B is divalent aromatic group, and $R^4$ independently each other represents hydrogen, alkyl having 1 to 6 carbon atoms, or alkylsilyl group having 3 to 9 carbon atoms,), wherein B in general formula (BI) comprises a triazine moiety represented by following formula (BB1):

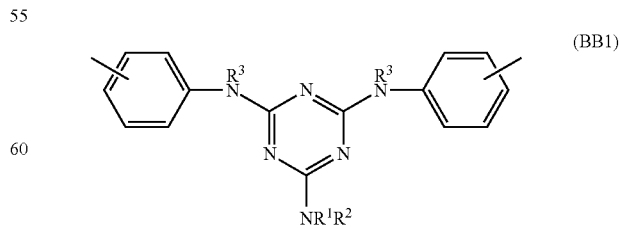

(in which $R^1$ and $R^2$, independently each other, denote hydrogen or alkyl or aryl having 1 to 12 carbon atoms, and $R^3$ denotes hydrogen, methyl or ethyl);

imidizing while removing the first organic solvent to obtain a polyimide; and dissolving the obtained polyimide in a second organic solvent to obtain the polyimide solution.

9. A method for producing a polyimide solution according to the above item 8, wherein tetracarboxylic dianhydride component constituting A in formula (BI) comprises 3,3',4,4'-biphenyltetracarboxylic dianhydride and pyromellitic dianhydride, wherein a molar ratio of 3,3',4,4'-biphenyltetracarboxylic dianhydride and pyromellitic dianhydride is 75/25 to 25/75.

10. A method for producing a polyimide solution according to any one of the above items 1 to 7, the method comprising the steps of;

reacting tetracarboxylic dianhydride component with diamine component comprising a triazine compound represented by general formula (BB2):

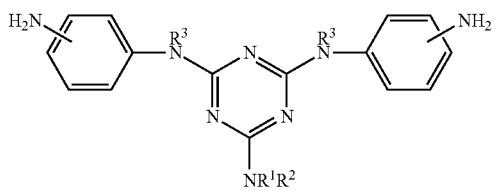

(BB2)

(in which $R^1$ and $R^2$, independently each other, denote hydrogen or alkyl or aryl having 1 to 12 carbon atoms, and $R^3$ denotes hydrogen, methyl or ethyl) to form a first polyimide solution comprising a polyimide and a first organic solvent; the polyimide comprising a structural unit represented by general formula (BII);

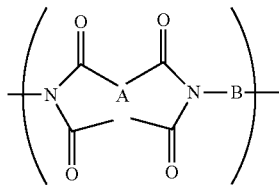

(BII)

(in which A is tetravalent aromatic group or aliphatic group, and B is divalent aromatic group)
wherein in the polyimide, B in general formula (BII) comprises a triazine moiety represented by following formula (BB1):

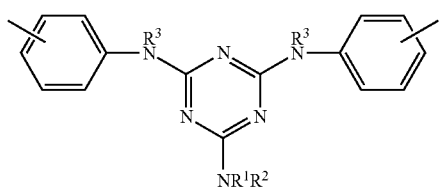

(BB1)

(in which $R^1$ and $R^2$, independently each other, denote hydrogen or alkyl or aryl having 1 to 12 carbon atoms, and $R^3$ denotes hydrogen, methyl or ethyl);

obtaining a polyimide in a form of solid from the first polyimide solution; and dissolving the obtained polyimide in a form of solid in a second organic solvent to obtain a second polyimide solution.

11. A method for producing a polyimide solution according to the above item 10, wherein tetracarboxylic dianhydride component constituting A in formula (BI) comprises 3,3',4,4'-biphenyltetracarboxylic dianhydride and pyromellitic dianhydride, wherein a molar ratio of 3,3%4,4% biphenyltetracarboxylic dianhydride and pyromellitic dianhydride is 75/25 to 50/50.

According to the invention of Part B, there is provided a polyimide solution capable of forming a coating film having excellent properties. The use of a polyimide solution of the invention of Part B allows the easy formation of polyimide coating film and the like having the properties, advantageous properties such as adhesiveness and adherence, obtainable by the use of the triazine-based diamines.

Particularly, according to an embodiment of the invention of Part B, there is provided a polyimide solution to give a polyimide film having furthermore improved heat resistance.

<<Embodiment of the Invention of Part B>>

The embodiments of the invention of Part B will be described in details.

The invention of Part B is, as described above, a polyimide solution in which the specific polyimide is dissolved in an organic solvent. "Organic solvent" in the polyimide solution of the invention of Part B corresponds to a second organic solvent referred in the method for producing a polyimide solution as described later (note, however, that the second organic solvent may be equal to a first organic solvent.).

The organic solvent (second organic solvent as described later) is not particularly limited as long as it dissolves the polyimides. The examples thereof include nitrogen-containing solvents such as N-methyl-2-pyrrolidone (NMP), N, N-dimethylformamide (DMF), N, N-dimethylacetamide (DMAc), N, N-diethylacetamide (DEAc), 1,3-dimethyl-2-imidazolidinone (DMI); sulfur-containing solvents such as dimethyl sulfoxide; cyclic ether-based solvents such as tetrahydrofuran, tetrahydropyran, 1,4-dioxane and oxetane; chain ether-based solvents such as ethylene glycol dimethyl ether, ethylene glycol monomethyl ether, ethylene glycol diethyl ether, ethylene glycol monoethyl ether, ethylene glycol monobutyl ether, diethylene glycol monoethyl ether acetate; and cyclic or chain ester-based solvents such as γ-butyrolactone, β-propiolactone.

The solubility of polyimides depends on the combination of the tetracarboxylic acid component and the diamine component and therefore the solvent preferably used among the above organic solvents may be different on the kinds of polyimides.

The polyimide used in the invention of Part B comprises a structural unit represented by general formula (BIT):

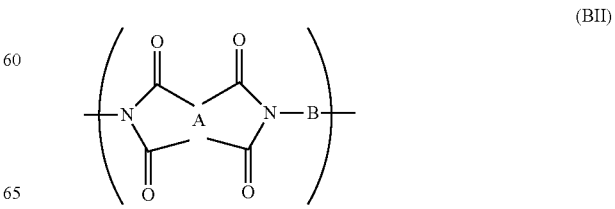

(BII)

(in which A is tetravalent aromatic group or aliphatic group, and B is a divalent aromatic group).

A is a residue obtainable by removing four COOH groups from tetracarboxylic acid (i.e. a residue obtainable by removing two carboxylic anhydride groups $(CO)_2O$ from tetracarboxylic dianhydride), and B is a residue obtainable removing two $NH_2$ groups from diamine. Hereinafter, tetracarboxylic acid and tetracarboxylic dianhydride used for the reaction of the process for producing polyimides are referred to as tetracarboxylic acid component, and diamines are referred to as diamine component. A and B in formula (BII) are included in the polyimide structure originated from tetracarboxylic acid component and diamine component, respectively.

In the polyimide contained in the solution of the invention of Part B, B in general formula (BII) comprises a triazine moiety represented by following formula (BB1):

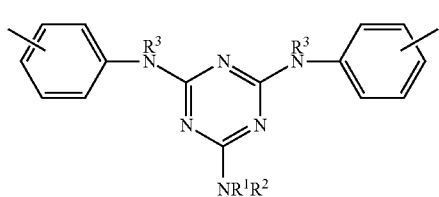

(BB1)

(in which $R^1$ and $R^2$, independently each other, denote hydrogen or alkyl or aryl having 1 to 12 carbon atoms, and $R^3$ denotes hydrogen, methyl or ethyl). For B in the polyimide, the proportion of the group represented by formula (BB1) is more than 0 to 100 mol %, preferably 5 to 100 mol % and further preferably 10 to 100 mol %.

Originated from the triazine represented by formula (BB2) used as a diamine component, the structure of formula (BB1) is introduced in the polyimide precursor and the polyimide. The details of the structure of formula (BB1) will be clear from the description about diamine components described below.

In formula (BB1), at least one of $R^1$ and $R^2$ is alkyl or aryl having 1 to 12 carbon atoms (more preferably aryl), more preferably both of $R^1$ and $R^2$ are alkyl or aryl having 1 to 12 carbon atoms. In the most preferred embodiment, both of $R^1$ and $R^2$ are aryl. Alkyl has preferably 1 to 3 carbon atoms, and aryl has preferably 6 to 12 carbon atoms and is more preferably phenyl, naphthyl or biphenyl, and most preferably phenyl.

In formula (BB1), $R^3$ is preferably hydrogen or methyl, and more preferably hydrogen.

When B in general formula (BII) of the polyimide includes a triazine moiety in which $R^1$ and $R^2$ are phenyl, particularly in an amount as described above, the polyimide is excellent in solubility and distinguished by its heat resistance.

In the polyimide used in the invention of Part B, A in general formula (BII) is particularly preferably tetravalent residue obtainable by removing two carboxylic anhydride groups from a compound selected from 3,3',4,4'-biphenyltetracarboxylic dianhydride (s-BPDA), 3,3',4,4'-diphenyl sulfone-tetracarboxylic dianhydride (DSDA), 4,4'-oxydiphthalic dianhydride (ODPA) and 2,2-bis(3,4-dicarboxyphenyl)-1,1,1,3,3,3-hexafluoropropane dianhydride (6 FDA). The polyimide having these tetravalent residue is excellent in solubility and suitable for the polyimide solution containing a nitrogen-containing solvents such as N-methyl-2-pyrrolidone (NMP), N, N-dimethylformamide (DMF), N, N-dimethylacetamide (DMAc), N, N-diethylacetamide (DEAc) or 1,3-dimethyl-2-imidazolidinone (DMI).

The polyimide in which A in general formula (BII) comprises tetravalent residue obtainable by removing two carboxylic anhydride groups from 2,2-bis(3,4-dicarboxyphenyl)-1,1,1,3,3,3-hexafluoropropane dianhydride (6 FDA) is particularly excellent in solubility and exhibits good solubility to sulfur-containing solvents such as dimethyl sulfoxide (DMSO); cyclic ether-based solvents such as tetrahydrofuran, tetrahydropyran, 1,4-dioxane and oxetane; chain ether-based solvents such as ethylene glycol dimethyl ether, ethylene glycol monomethyl ether, ethylene glycol diethyl ether, ethylene glycol monoethyl ether, ethylene glycol monobutyl ether, diethylene glycol monoethyl ether acetate; and cyclic or chain ester-based solvents such as γ-butyrolactone, β-propiolactone, in addition to a nitrogen-containing solvents such as NMP, DMF, DMAc, DEAc or DMI. Among them, the polyimide solutions containing a solvent having a low boiling point of 120° C. or lower, preferably 110° C. or lower, more preferably 100° C. or lower is advantageous in handling in coating applications due to the easiness of removing the solvent.

The polyimide solution of the invention of Part B contains polyimide(s) in organic solvent(s) in concentration of 0.1 mass % or more, preferably 0.2 mass % or more, more preferably 1 mass % or more, further preferably 5 mass % or more, preferably 70 mass % or less, more preferably 60 mass % or less.

The method for producing the polyimide solution of the invention of Part B is not particularly limited, but the examples include:

Method (i): performing imidization while removing the organic solvent from the polyimide precursor solution such as polyamic acid, to obtain a polyimide (for example, in a form of film), and dissolving the obtained polyimide in a solvent (second organic solvent) to obtain a polyimide solution;

Method (ii): reacting tetracarboxylic dianhydride component with diamine component in an organic solvent (first organic solvent) to obtain a polyimide solution;

Method (iii): reacting tetracarboxylic dianhydride component with diamine component in an organic solvent (first organic solvent) to obtain a polyimide solution, separating-obtaining polyimide in a form of solid from the solution, and dissolving the obtained polyimide in an organic solvent (second organic solvent).

<<Method (i)>>

Describing the Method (i) specifically, the method includes:

producing a polyimide precursor solution comprising a polyimide precursor comprising a structural unit represented by general formula (BI):

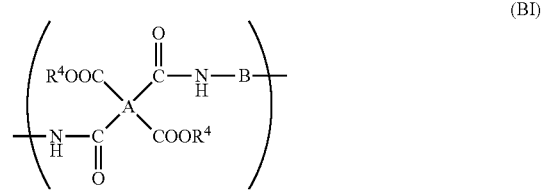

(BI)

(in which A is tetravalent aromatic group or aliphatic group, B is divalent aromatic group, and $R^4$ independently each other represents hydrogen, alkyl having 1 to 6 carbon atoms, or alkylsilyl group having 3 to 9 carbon atoms,), wherein B in general formula (BI) comprises a triazine moiety represented by following formula (BB1):

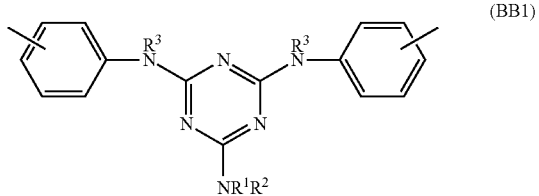

(BB1)

(in which $R^1$ and $R^2$, independently each other, denote hydrogen or alkyl or aryl having 1 to 12 carbon atoms, and $R^3$ denotes hydrogen, methyl or ethyl) and a first organic solvent;

imidizing while removing the first organic solvent to obtain a polyimide (for example, in a form of film) (for example, a step including casting the polyimide precursor solution on a support, heating it to remove the organic solvent, thereby simultaneously performing imidization of the polyimide precursor to obtain the polyimide); and dissolving the obtained polyimide in a second organic solvent to obtain the polyimide solution.

There will be described production processes and starting materials used for the polyimide precursor.

<Tetracarboxylic Acid Component and Diamine Component>

The tetracarboxylic acid dianhydride constituting the tetracarboxylic acid component may be an aromatic one or an aliphatic one. The specific examples of aromatic tetracarboxylic dianhydrides and aliphatic tetracarboxylic dianhydrides are the same as those described in Part A, and as described, they are used alone or in combination of two or more, and the tetracarboxylic dianhydride for use is suitably selected in consideration of desired properties and the like.

The tetracarboxylic acid component preferably contains at least a tetracarboxylic acid dianhydride selected from 3,3',4,4'-biphenyl tetracarboxylic dianhydride (s-BPDA), pyromellitic dianhydride (PMDA), 4,4'-oxydiphthalic dianhydride (ODPA), 3,3',4,4'-benzophenone tetracarboxylic dianhydride (BTDA), 1,2,3,4-cyclobutanetetracarboxylic dianhydride (CBDA), 2,2-bis(3,4-dicarboxyphenyl)-1,1,1,3,3,3-hexafluoropropane dianhydride (6 FDA), and 3,4,3',4'-diphenylsulfone tetracarboxylic dianhydride (DSDA).

In a preferred embodiment of the invention of Part B, the tetracarboxylic acid component preferably contains at least an acid dianhydride selected from 3,3',4,4'-biphenyl tetracarboxylic dianhydride (s-BPDA), 3,4,3',4'-diphenylsulfone tetracarboxylic dianhydride (DSDA), 4,4'-oxydiphthalic dianhydride (ODPA), and 2,2-bis(3,4-dicarboxyphenyl)-1,1,1,3,3,3-hexafluoropropane dianhydride (6 FDA). When these acid dianhydrides are used in combination with a triazine represented by formula (BB2), polyimides having excellent solubility are obtained. Particularly, when the tetracarboxylic acid component contains 6 FDA, the polyimides having particularly excellent solubility are obtained.

In this embodiment, the acid dianhydride selected from s-BPDA, DSDA, ODPA and 6 FDA is preferably contained in an amount of 50 mol % or more, more preferably 70 mol % or more, particularly preferably 75 mol % or more in 100 mol % of tetracarboxylic acid component.

The example and preferred structure of A in general formulae (BI) and (BII) correspond to the tetravalent residue obtainable by removing two carboxylic anhydride groups from the above tetracarboxylic dianhydrides, and the proportion thereof corresponds to the description of the above tetracarboxylic acid component.

The diamine component comprises a diamine compound represented by general formula (BB2).

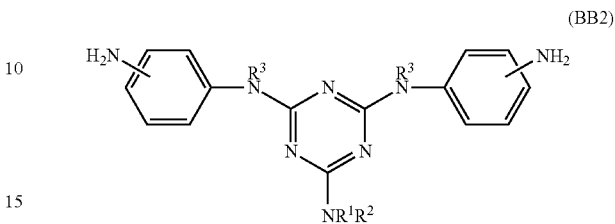

(BB2)

In the formula, $R^1$ and $R^2$, independently each other, denote hydrogen or alkyl or aryl having 1 to 12 carbon atoms, and $R^3$ denotes hydrogen, methyl or ethyl.

In formula (BB2), at least one of $R^1$ and $R^2$ is alkyl or aryl having 1 to 12 carbon atoms (more preferably aryl), more preferably both of $R^1$ and $R^2$ are alkyl or aryl having 1 to 12 carbon atoms. In the most preferred embodiment, both of $R^1$ and $R^2$ are aryl. Alkyl has preferably 1 to 3 carbon atoms, and aryl has preferably 6 to 12 carbon atoms and is more preferably phenyl, naphthyl or biphenyl, and most preferably phenyl.

In formula (BB2), $R^3$ is preferably hydrogen or methyl, and more preferably hydrogen.

In the diamine compound represented by general formula (BB2), aminoanilino groups (N-substituted or non-substituted) connected to two NH groups bonded to the triazine ring are not particularly limited, but they are preferably 4-aminoanilino (para-position) or 3-aminoanilino (mata-position).

The specific examples of diamine represented by general formula (BB2) include 2,4-bis(3 or 4-aminoanilino)-6-benzylamino-1,3,5-triazine, 2,4-bis(3 or 4-aminoanilino)-6-naphthylamino-1,3,5-triazine, 2,4-bis(3 or 4-aminoanilino)-6-biphenylamino-1,3,5-triazine, 2,4-bis(3 or 4-aminoanilino)-6-diphenylamino-1,3,5-triazine, 2,4-bis(3 or 4-aminoanilino)-6-dibenzylamino-1,3,5-triazine, 2,4-bis(3 or 4-aminoanilino)-6-dinaphthylamino-1,3,5-triazine, 2,4-bis(3 or 4-aminoanilino)-6-N-methylanilino-1,3,5-triazine, 2,4-bis(3 or 4-aminoanilino)-6-N-methylnaphthylamino-1,3,5-triazine, 2,4-bis(3 or 4-aminoanilino)-6-methylamino-1,3,5-triazine, 2,4-bis(3 or 4-aminoanilino)-6-ethylamino-1,3,5-triazine, 2,4-bis(3 or 4-aminoanilino)-6-dimethylamino-1,3,5-triazine, 2,4-bis(3 or 4-aminoanilino)-6-diethylamino-1,3,5-triazine, 2,4-bis(3 or 4-aminoanilino)-6-dibutylamino-1,3,5-triazine, 2,4-bis(3 or 4-aminoanilino)-6-amino-1,3,5-triazine and 2,4-bis(3 or 4-aminoanilino)-6-diphenylamino-1,3,5-riazine. Particularly, 2,4-bis(3 or 4-aminoanilino)-6-diphenylamino-1,3,5-triazine is preferred.

The diamine component may comprise diamine compound(s) that is generally used in the production of polyimide in addition to the diamine compound represented by general formula (BB2). The specific examples are the same as those described in Part A as the diamine compound(s) that can be used in addition to the diamine compound represented by general formula (AB2).

In the invention of Part B, the diamine compound represented by general formula (BB2) is used in an amount of more than 0 to 100 mol % or less, preferably 5 to 100 mol % and further preferably 10 to 100 mol %, and preferably 15 to 100 mol % and more preferably 17 to 100 mol %, and in a specific embodiment 25 to 100 mol % based on the total diamine component (=100 mol %).

When diamine(s) other than the diamine compound represented by formula (BB2) is used, the diamine component comprises diamine compound preferably selected from paraphenylene diamine (PPD) and diaminodiphenyl ethers, more preferably one or more compound selected from PPD, 4,4'-diaminodiphenyl ether and 3,4'-diaminodiphenyl ether, and particularly preferably PPD. The polyimide film obtained from these is excellent in mechanical property and the like.

The example and preferred structure of B in general formulae (BI) and (BII) correspond to the divalent residue obtainable by removing $NH_2$ from the above diamines, and the proportion thereof corresponds to the description of the above diamine component.

A polyimide of the invention of Part B is preferably free from at least one proton-conducting functional group selected from the group consisting of —$SO_3H$, —COOH and —$PO_3H_2$ as described in Patent Document 2, for excellent heat resistance.

<Preparation of a Polyimide Precursor>

A polyimide precursor (polyamic acid) is produced by reacting a tetracarboxylic acid component and a diamine component; for example, substantially equimolar components may be reacted in a first organic solvent to give a solution of a polyamic acid (partial imidization may be allowed to take place if the solution is maintained in homogeneous state). Alternatively, two or more polyamic acids in which one of the components is relatively excessively contained are preliminarily synthesized, and these polyamic acid solutions can be combined and mixed under the reaction conditions. The polyamic acid solution thus prepared can be used for production of a self-supporting film as produced or, as necessary, after removing or adding a solvent.

In the invention of Part B, the organic solvent used in the reaction of a tetracarboxylic acid component and a diamine component is referred to as a first organic solvent (same applies to the methods other than method (i)), and it is distinguished from the organic solvent contained in the final polyimide solution (referred to as a second organic solvent). However, depending on the method of the production, the first organic solvent may become the second organic solvent without change. In case it is clear from the context, the terms may be used without "first" or "second".

The first organic solvent used herein can be a known solvent such as N-methyl-2-pyrrolidone, N, N-dimethylformamide, N, N-dimethylacetamide and N,N-diethylacetamide. These organic solvents are used alone or in combination of two or more.

In the polymerization reaction for a polyamic acid, a concentration of the total monomers in an organic polar solvent can be appropriately selected depending on an intended use; for example, a concentration of the total monomers in an organic polar solvent is preferably 5 mass % to 30 mass %, further preferably 15 mass % to 27 mass %, particularly preferably 18 mass % to 26 mass %.

As an example of a process for preparing a polyamic acid, the above polymerization reaction of a tetracarboxylic acid component and a diamine component is conducted, for example, by mixing them in substantially equimolar amounts or in amounts such that one of them is slightly in excess of the other component (the acid component or the diamine component) and reacting them at a reaction temperature of 100° C. or lower, preferably 80° C. or lower for about 0.2 to 60 hours to give a polyamic acid solution.

For thermal imidization, the polyamic acid solution may contain, as necessary, an imidization catalyst, an organic phosphorous-containing compound or the like. For chemical imidization, the polyamic acid solution may contain, as necessary, a cyclization catalyst, a dehydrating agent or the like.

As the imidization catalyst, those exemplified in Part A may be used.

As the organic phosphorous-containing compound, those exemplified in Part A may be used.

As the cyclization catalyst, those exemplified in Part A may be used.

As the dehydrating agent, those exemplified in Part A may be used.

As the method for producing the polyimide precursor comprising a structural unit where $R^4$ representing alkyl having 1 to 6 carbon atoms or alkylsilyl group having 3 to 9 carbon atoms in formula (BI), the method includes, for example, producing the polyamic acid as described above and esterifying it by reacting with an esterifying agent, or silylating it by reacting with a known silylating agent.

<Step of Obtaining Polyimide from Polyimide Precursor Solution>

In the method (i), next, a polyimide is obtained by performing imidization while removing the first organic solvent from the polyimide precursor solution (typically polyamic acid) obtained as above.

The typical method includes flow-casting the polyimide precursor solution on a support, heating it whereby performing the imidization reaction while removing the solvent and produced water.

There are no particular restrictions to a solid concentration of the polyimide precursor solution used in the invention of Part B as long as a viscosity is within the range suitable for the production, but generally, it is preferably 5 to 30 mass %, further preferably 15 to 27 mass %, and particularly preferably 18 to 26 mass %.

There are no particular restrictions to a support as long as a polyimide precursor solution can be cast on it, but it is preferably a smooth substrate; for example, a glass plate or a metal (for example, stainless steel) drum or belt. The polyimide precursor solution cast on the support is dried to a self-supporting film having self-supporting property, which may be peeled off the support.

The heating for the desolvation and imidization is preferably conducted from lower temperature to higher temperature gradually stepwise or continuously.

The maximum temperature of the heating is generally 200° C. or higher, preferably 250° C. or higher, more preferably 300° C. or higher. The upper limit of the heating temperature is a range where the properties of the polyimide is not deteriorated, and preferably 600° C. or lower, more preferably 550° C. or lower.

One example of the heating process is the following manner. In the case of thermal imidization, the heating is first conducted at about 50° C. to about 180° C., preferably about 50° C. to about 150° C., for one minute to 24 hours, preferably 10 minutes to 12 hours. This may be conducted under reduced pressure. Next, the imidization of the polymer and evaporation/removal of the solvent is suitably conducted at a temperature of about 100° C. to lower than 350° C. for about 0.05 to 5 hours, particularly 0.1 to 3 hours. Particularly, the heating is preferably conducted stepwise. If necessary, heating at high temperature of 350° C. or higher to 600° C. or lower may be conducted.

The polyimides in a form of solid (in a form of film in this case) are thus obtained.

<Step of Obtaining Polyimide Solution from Polyimide>

The obtained polyimide, if necessary after peeled off the support, is dissolved in the second organic solvent to obtain the polyimide solution of the invention of Part B. The second organic solvent is not particularly limited as long as it can dissolve the polyimide, and suitable one is selected taking the applications into consideration.

The second organic solvent is not particularly limited as long as it dissolves the polyimides. The examples include nitrogen-containing solvents such as N-methyl-2-pyrrolidone (NMP), N, N-dimethylformamide (DMF), N,N-dimethylacetamide (DMAc), N,N-diethylacetamide, 1,3-dimethyl-2-imidazolidinone (DMI); sulfur-containing solvents such as dimethyl sulfoxide; cyclic ether-based solvents such as tetrahydrofuran, tetrahydropyran, 1,4-dioxane and oxetane; chain ether-based solvents such as ethylene glycol dimethyl ether, ethylene glycol monomethyl ether, ethylene glycol diethyl ether, ethylene glycol monoethyl ether, ethylene glycol monobutyl ether, diethylene glycol monoethyl ether acetate; and cyclic or chain ester-based solvents such as γ-butyrolactone, β-propiolactone.

In the polyimide solution obtained by method (i), contents of impurities are low, and imidization is highly advanced. Therefore, polyimide films obtained from the solution is excellent in heat resistance and insulation property. Since the obtained film is soluble, portions produced by film-cutting such as pinning slit portion produced during film manufacturing, which are usually not used as a product, may be dissolved in a solvent again and produce a polyimide solution again. Polyimide solutions obtained in this manner can be stored long term because they hardly affected by hydrolysis compared with a polyamic acid solution. Also, a polyimide film can be again obtained by casting the polyimide solution and drying it. Thus, this is industrially low-loss manufacturing method and preferred.

<<Methods (ii) and (iii)>>

In Method (ii), tetracarboxylic dianhydride component and diamine component are reacted in an organic solvent (first organic solvent) up to imidization so that a polyimide solution is obtained; and in Method after the polyimide solution is obtained in (ii), polyimide in a form of solid is obtained by separating it from the solution, and the obtained polyimide is dissolved in an organic solvent (second organic solvent).

In Method (ii), tetracarboxylic dianhydride component and diamine component are reacted, in a similar manner to the method for producing the polyamic acid in Method (i), to obtain a polyimide solution. Using tetracarboxylic dianhydride component and diamine component as described in Method (i), for example, substantially equimolar components may be reacted in a first organic solvent to give a polyimide solution. Alternatively, two or more polyimides in which one of the components is relatively excessively contained are preliminarily synthesized, and the solutions of these polyimides can be combined and mixed under the reaction conditions.

The first organic solvents and the concentrations of all monomers to be used in polymerization reaction will be chosen as similar to the method for producing the polyamic acid in Method (i).

As an example of a process for preparing a polyimide, the above polymerization reaction of a tetracarboxylic acid component and a diamine component is conducted, for example, by mixing them in substantially equimolar amounts or in amounts such that one of them is slightly in excess of the other component (the acid component or the diamine component) and reacting them at a reaction temperature of 140° C. or higher, preferably 160° C. or higher (preferably 250° C. or lower, furthermore 230° C. or lower) for about 1 to 60 hours to give a polyimide solution.

For thermal imidization, an imidization catalyst, an organic phosphorous-containing compound or the like may be added, as necessary. For chemical imidization, a cyclization catalyst, a dehydrating agent or the like may be added, as necessary. These imidization catalyst, organic phosphorous-containing compound, cyclization catalyst and dehydrating agent are explained for the method for producing the polyamic acid in Method (i).

In Method (ii), the polyimide solution thus prepared may be provided as a polyimide solution without further processing, or, as necessary, after adding a solvent or removing a part of organic solvent under reduced pressure. In this method, the first organic solvent is whole or a part of the second organic solvent.

In Method (iii), polyimide in a form of solid is obtained by separating from the polyimide solution (in the first organic solution) as produced above.

The method of separating the polyimide is not particularly limited, but includes the method of pouring the solution into a poor solvent for the polyimide to precipitate the polyimide. The poor solvents are preferably those admissible with a first organic solvent. For example, alcohols such as methanol and ethanol may be used, but not limited to these. If necessary, re-dissolving and re-precipitation may be repeated for purification. After the poor solvent is removed, as necessary by drying, the polyimide is dissolved in a second organic solvent to obtain a polyimide solution. The second solvents are those explained in Method (i) for producing the polyamic acid.

Another method of separating the polyimide, similar to Method (i), includes flow-casting the polyimide solution (in the first solvent) on a support, and heating to remove the solvent, thereby obtaining the polyimide in a form of solid. The heating temperature is preferably about 50° C. or higher, optionally under reduced pressure. Generally, it is 600° C. or lower and more preferably 500° C. or lower. In a preferred embodiment, heating is conducted at about 50° C. to 300° C.

<Additives in Polyimide Solution, Applications>

The polyimide solution of the invention of Part B may contain various additives depending on its applications. For examples, inorganic particles, organic particles or the like may be contained.

Examples of inorganic fine particles include inorganic oxide powders such as fine-particulate titanium dioxide powder, silicon dioxide (silica) powder, magnesium oxide powder, aluminum oxide (alumina) powder and zinc oxide powder; inorganic nitride powders such as fine-particulate silicon nitride powder and titanium nitride powder; inorganic carbide powders such as silicon carbide powder; and inorganic salt powders such as fine-particulate calcium carbonate powder, calcium sulfate powder and barium sulfate powder. These inorganic fine particles may be used in combination of two or more. For homogeneously dispersing these inorganic fine particles, a means known per se can be applied. Instead of inorganic fine particles, organic particles insoluble in an organic solvent, for example, polyimide fine particles may be used.

<Polyimide Laminate and Polyimide-Metal Laminate>

A polyimide coating film obtained from the polyimide solution of the invention of Part B has excellent adhesiveness to substrates such as a metal foil or materials such as an adhesive. Thus, there will be formed a polyimide laminate in which the polyimide film or the polyimide coating film obtained from the polyimide solution of the invention of Part B and an adhesive layer are laminated, or a polyimide-metal laminate described later.

The examples of methods of producing a polyimide-metal laminate include methods of (1) laminating a polyimide film and a base material (for example, metal foil) directly or via an adhesive by compressing or heat-compressing, (2) forming a metal layer directly on a polyimide film by wet method (plating) or dry method (metalizing such as vacuum deposition or sputtering) and (3) coating a base material, such as metal foil, with the above mentioned polyamic acid solution or the polyimide solution and drying and imidizing (drying in case of polyimide solution).

As described above, a polyimide film or a polyimide coating film obtained from the polyimide solution of the invention of Part B, a polyimide-metal laminate (including both a laminate where a film and a metal layer are laminated via an adhesive layer and a laminate where a metal layer is directly formed on a film) and a polyimide laminate of the present invention may be used as a material for electronic components and an electronic devices including a printed-wiring board, a flexible printed board, a TAB tape, a COF tape or a metal wiring, or a cover substrate for a metal wiring and a chip member such as an IC chip and a base substrate for a liquid crystal display, an organic electroluminescence display, an electronic paper, a solar battery and the like.

In addition, the polyimide solution of the invention of Part B is preferably used as coating materials for forming coating films in wide applications, particularly in the applications requiring insulation or heat resistance, for example, as protective films, insulation films and the like.

<Method for Producing Compound of General Formula (BB2)>

The compound having aminoanilino of para-position in general formula (BB2), i.e. 2,4-bis(4-aminoanilino)-6-(substituted)amino-1,3,5-triazine, is obtained by reacting 6-(substituted)amino-1,3,5-triazine-2,4-dihalide with excess of para-phenylene diamine. Analogous method is applied to the preparation of compounds in which $R^3$ is not H.

The compound having aminoanilino of meta-position, i.e. 2,4-bis(3-aminoanilino)-6-(substituted)amino-1,3,5-triazine, is prepared by the following method. Hereinafter, explanation is given to a compound in which $R^3$ is H, but analogous method is applied to the preparation of compounds in which $R^3$ is not H.

First, 6-substituted amino-1,3,5-triazine-2,4-dihalide represented by general formula (AB3) is prepared by reacting a cyanuric halide with an amino compound ($NHR^1R^2$) as shown in the following reaction scheme.

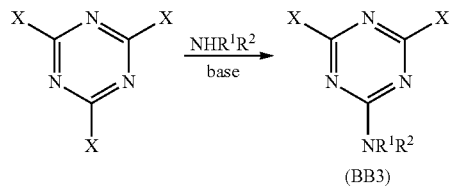

(BB3)

In the formula, X is halogen atom, preferably Cl, Br or I. As for $R^1$ and $R^2$, as defined for general formula (BB2), $R^1$ and $R^2$, independently each other, denote hydrogen or alkyl or aryl having 1 to 12 carbon atoms. The base used herein is, for example, sodium carbonate and the like. Reaction temperature is, for example, 0 to 5° C.

Then, as shown in the following scheme, 6-(substituted)amino-1,3,5-triazine-2,4-dihalide represented by general formula (BB3) is reacted with 3-nitroaniline while refluxing to form 2,4-bis-(3-nitroanilino)-6-(substituted)amino-1,3,5-triazine represented by general formula (BB4).

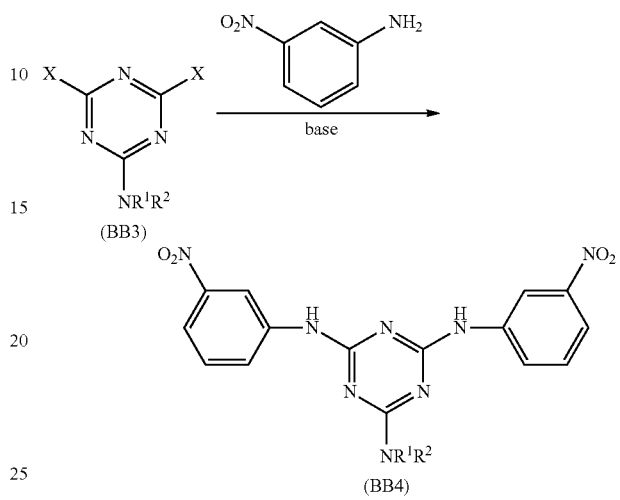

In the formula, X, $R^1$ and $R^2$ are the same as those mentioned above.

The above two reactions are preferably carried out in the presence of a base in a solvent. The base used herein is not particularly limited, and general inorganic base may be used, for example, sodium carbonate and the like.

Also, the solvent used herein is not particularly limited, but general solvents may be used, for example, ether-based solvents such as dioxane, tetrahydrofuran and diethyl ether; hydrocarbon-based solvent such as toluene and benzene; and amide-based solvents such as N, N-dimethylformamide, N, N-dimethylacetamide and N-methyl-2-pyrrolidone.

Then, 2,4-bis-(3-nitroanilino)-6-(substituted)amino-1,3,5-triazine represented by general formula (BB4) thus obtained is reduced to convert nitro groups to amino groups, thereby producing 2,4-bis(3-aminoanilino)-6-(substituted)amino-1,3,5-triazine (BB2).

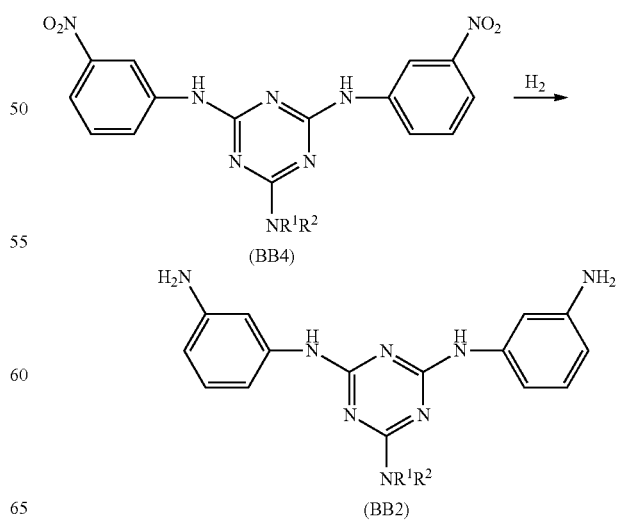

Any known reduction method may be used as the reduction reaction. For example, it may be carried out by hydrogenation in a solvent with suitably heating and for example, in the presence of suitable catalyst. As the catalyst, any known one may be used such as palladium supported on carbon and the like. The temperature for the reduction reaction is, for example, 60 to 80° C.

EXAMPLES

The present invention will be further explained in details with reference to examples, but the present invention is by no means limited to these examples.
<Method of Evaluation>
Evaluation of the properties of polyamic acids and polyimides was carried out based on the following methods.

(1) Measurement of Logarithmic Viscosity Number of Polyamic Acid

A polyamic acid solution prepared as described below was diluted to 0.5 g/dL with N,N-dimethylacetamide, and its logarithmic viscosity number was determined using an Ostwald's viscometer at 30° C.

(2) Solubility Test of Polyimide Films 10 mg of the obtained polyimide film was added in 5 mL of various organic solvents. "++" was recorded when it dissolved at room temperature, "+" was recorded when it dissolved after heating (heating temperature 40 to 80° C.), "±" was recorded when it partially dissolved or swelled, and "−" was recorded when it was insoluble. The organic solvents used were 1,3-dimethyl-2-imidazolidinone (DMI), N,N-dimethylacetamide (DMAc), N-methyl-2-pyrrolidone (NMP), 2.38 wt % (mass %) tetramethylammonium hydroxide aqueous solution (TMAH), dimethyl sulfoxide (DMSO), γ-butyrolactone (γ-BL) and tetrahydrofuran (THF).

(3) Measurement of Logarithmic Viscosity Number of Polyimide Solution

The obtained polyimide was dissolved in N, N-dimethylacetamide to give a concentration of 0.5 g/dL, and its logarithmic viscosity number was determined using an Ostwald's viscometer at 30° C.

(4) Glass Transition Temperature Glass transition temperature was determined by DMS210 manufactured by Seiko Instruments Inc. (rate of temperature increase: 2° C./min; measuring frequency: 1 Hz; under nitrogen flow).

(5) Weight Loss Temperature

Weight loss temperature was determined by EXSTAR TG/DTA7200 manufactured by Seiko Instruments Inc. (rate of temperature increase: 10° C./min; under nitrogen or air flow).

(6) Measurement of Peeling Strength of Polyimide-metal Laminate Peeling strength at 90° peeling of polyimide-metal laminates was determined at a peeling speed of 50 mm/min under the atmosphere of a temperature of 23° C. and a humidity of 50%.

(7) Coefficient of Linear Thermal Expansion of Polyimide Film Measurement was carried out by EXSTAR TMA/SS6100 manufactured by Seiko Instruments Inc. (rate of temperature increase: 10° C./min), and coefficient of linear thermal expansion (CTE) was determined for the range of 150 to 200° C.

Examples of the Invention of Part A

Next, examples of the invention of Part A will be described. The explanation of examples of Part A and the explanation of examples of Part B are independent each other, and therefore, identity names of the prepared materials, for example "polyamic acid solution A", "polyimide film A1" and the like in the description of examples of Part A mean "polyamic acid solution A", "polyimide film A1" and the like described in Part A, and do not denote the materials having the same identity names which may be present in Part B.

Synthesis Examples of Diamines

Triazine-based diamines were prepared as follows.

Synthesis Referential Example 1

<Synthesis of 6-anilino-1,3,5-triazine-2,4-dichloride (ATD)>

Into a three neck flask (1 L) equipped with a stirrer, a thermometer, a dropping funnel and a calcium chloride tube, cyanuric chloride (36.52 g, 0.2 mol) and THF (120 mL) were charged and dissolved completely with cooling at −5° C. to 0° C. with an ice bath. To the three neck flask, a solution of aniline (19.03 g, 0.2 mol) dissolved in THF (70 mL) was added dropwise gradually. After the dropwise addition, the mixture was stirred for 2 hours at 0° C. to 5° C. To the three neck flask, a solution of sodium carbonate (12.90 g, 0.12 mol) dissolved in distilled water (70 mL) was added dropwise gradually with taking care not to raise the temperature of the mixture. After the dropwise addition, the mixture was stirred for 2 hours. The reaction mixture was fed into a separating funnel, and saturated saline solution was added. Anhydrous magnesium sulfate was added in the separated organic phase, and the mixture was stirred overnight. After removing the anhydrous magnesium sulfate by suction filtration, THF was evaporated by an evaporator to obtain a solid crude product. The crude product was recrystallized from dehydrated hexane/toluene mixed solvent to obtain white needle-like crystal.

Yield (quantity):40.6 g, Yield (ratio): 84%, Melting point: 136-137° C., 1H-NMR [400 MHz, DMSO-$d_6$, ppm]: δ 7.18 (t, 1H, Ar—H), 7.40 (t, 2H, Ar—H), 7.61 (d, 2H, Ar—H), 8.92 (s, 1H, NH)

13 C NMR[101 MHz, DMSO-$d_6$, TMS, ppm]: δ 170.1, 169.2, 164.2, 137.3, 129.3, 125.4, 122.0

Synthesis Referential Example 2

<Synthesis of 2,4-bis(4-aminoanilino)-6-anilino-1,3,5-triazine (p-ATDA)> synthesis of comparative diamine compound Into a three neck flask (1 L) equipped with a stirrer, a condenser, a dropping funnel with side-tube and a nitrogen inlet, 1,4-dioxane (100 mL), sodium carbonate (8.90 g, 0.08 mol), p-phenylenediamine (34.62 g, 0.32 mol) were charged and dissolved by heating. 6-anilino-1,3,5-triazine-2,4-dichloride (10.11 g, 0.04 mol) dissolved in 1,4-dioxane (80 mL) was charged in the dropping funnel, and added dropwise taking 5 hours into the refluxing solution. The mixture was stirred overnight at the refluxing temperature. After the reaction, the reaction mixture was washed in a beaker (3 L) four times with hot water, once with water so that the washed water became transparent. The solid was collected by suction filtration, and the solid was added in acetone and dissolved by stirring for 30 min at refluxing temperature, and insoluble matters were filtered off. Acetone was removed from the filtrate by evaporator to obtain a crude product. The crude product was recrystallized from hexane/toluene. Herein, activated carbon-treatment was carried out by adding activated carbon and refluxing for about one hour before the hot-filtration. Then, the crystal obtained after the hot-filtration was dried in vacuo for 6 hours at 190° C. Light brown powder was obtained.

Yield (quantity): 9.17 g, Yield (ratio): 58%, Melting point: 224-225° C.

$^1$H-NMR[400 MHz, DMSO-d$_6$, TMS, ppm]: δ 4.78 (s, 4H, Ar—NH$_2$), 6.53 (d, 4H, NH$_2$-o-Ar—H), 6.94 (t, 1H, p-Ar—H), 7.23 (t, 2H, m-Ar—H), 7.34 (d, 4H, NH$_2$-m-Ar—H), 7.79 (d, 2H, o-Ar—H), 8.64 (s, 2H, Ar—NH-Ar), 8.95 (s, 1H, Ar—NH)

$^{13}$C NMR[101 MHz, DMSO-d$_6$, TMS, ppm]: δ 164.1, 164.0, 144.1, 140.4, 129.0, 128.2, 122.6, 121.4, 119.9, 113.8

Elemental Analysis (C$_{21}$H$_{20}$N$_8$ Mw:384.44)

Calculated value (%) C; 65.61 H; 5.24 N; 29.15

Measured value (%) C; 65.88 H; 5.36 N; 29.07

Synthesis Example 1

(i) Synthesis of 6-(4-hydroxyanilino)-1,3,5-triazine-2,4-dichloride

Into a three neck 500 mL flask equipped with a thermometer, a dropping funnel and a nitrogen inlet for the reaction under nitrogen stream, a stirrer, cyanuric chloride 3.50 g (0.0190 mol) and THF 100 mL were charged and stirred until it dissolved completely at room temperature. Next, the solution was cooled to 5° C. with an ice bath, 4-aminophenol 2.12 g (0.0194 mol) dissolved in THF 80 mL was added dropwise and stirred while keeping at 5° C. or lower. After the reaction, an aqueous solution of sodium carbonate 1.03 g (9.74×10$^{-3}$ mol) in 50 mL was added to neutralize a chloride salt of by-product and stirred. The end of reaction was confirmed by checking non-existence of a spot of cyanuric chloride as the starting material in TLC (eluent is acetone). After the termination of the reaction, an organic phase was separated by using a 500 mL-separating funnel, the solvent was evaporated by an evaporator. The crude product was recrystallized from hexane-THF mixed solvent, and the solid after filtration was dried at 60° C. for 6 hours in vacuo to obtain 6-(4-hydroxyanilino)-1,3,5-triazine-2,4-dichloride.

Yield (quantity): 2.37 g, Yield (ratio): 49%, Melting point: 214° C.

$^1$H-NMR (400 MHz, DMSO-d$_6$, TMS, ppm): δ6.78 (d, 2H, Ar—H), 7.33 (d, 2H, Ar—H), 9.49 (s, 1H, OH), 10.9 (s, 1H, NH)

$^{13}$C-NMR (101 MHz, DMSO-d$_6$, TMS, ppm): δ 115.2, 123.5, 127.9, 154.9, 163.4, 168.4, 169.5

FT-IR (KBr, cm$^{-1}$); 3395 (OH), 3122 (C—H), 1557 (C=N), 1512 (C=C), 787 (C—Cl)

Elemental Analysis (C$_9$H$_6$N$_4$OCl$_2$ Mw: 257.08)

Calculated value (%) C; 42.05 H; 2.35 N; 21.79

Measured value (%) C; 41.90 H; 2.55 N; 21.80

(ii) Synthesis of 2,4-bis(4-aminoanilino)-6-(4-hydroxyanilino)-1,3,5-triazine (AHHT)

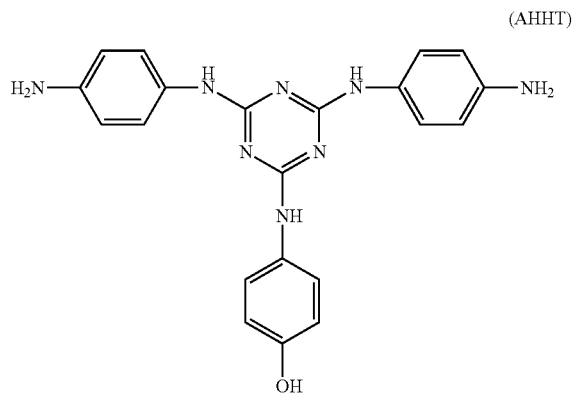 [SMILES: Nc1ccc(Nc2nc(Nc3ccc(N)cc3)nc(Nc3ccc(O)cc3)n2)cc1]

(AHHT)

Into a three neck 3000 mL flask, a stirrer, 1,4-dioxane 75 mL, sodium carbonate 0.982 g (9.21×10$^{-3}$ mol) and p-phenylenediamine 12.05 g (0.111 mol) were charged, and after a dropping funnel, Dimroth condenser and a nitrogen inlet were installed, the mixture was stirred until dissolved completely. 6-(4-hydroxyanilino)-1,3,5-triazine-2,4-dichloride 2.30 g (9.21×10$^{-3}$ mol) dissolved in 1,4-dioxane 55 mL was added dropwise for 6 hours while keeping the reflux temperature of 1,4-dioxane, and stirred overnight. The end of reaction was confirmed by checking non-existence of a spot of 6-(4-hydroxyanilino)-1,3,5-triazine-2,4-dichloride as the starting material in TLC (eluent is THF/hexane mixed solvent). The obtained crude product was washed with hot water and distilled water, then dissolved in THF and decolorized by adding activated carbon. After the activated carbon was filtered off, THF was removed from the filtrate by evaporation. The obtained solid was recrystallized from 1,4-dioxane, and a solid after filtration was dried at 200° C. for 8 hours in vacuo to obtain 2,4-bis(4-aminoanilino)-6-(4-hydroxyanilino)-1,3,5-triazine (AHHT).

Yield (quantity): 17.1 g, Yield (ratio): 46.6%, Melting point: 274° C.

$^1$H-NMR (400 MHz, DMSO-d$_6$, ppm): δ4.76 (s, 4H, NH$_2$), 6.50 (d, 4H, Ar—H), 6.65 (d, 2H, Ar—H), 7.32 (s, 4H, Ar—H), 7.49 (d, 2H, Ar—H), 8.52 (s, 2H, NH), 8.64 (s, 1H, NH), 9.01 (s, 1H$_2$OH)

$^{13}$C-NMR (101 MHz, DMSO-d$_6$, ppm): δ164.5, 164.5, 152.8, 144.4, 132.3, 130.0, 122.9, 122.5, 115.2, 114.2

FT-IR (KBr, cm$^{-1}$): 3387 (O-H), 3327 (N—H), 3022 (C—H), 1565 (C=N), 1518 (C=C)

Elemental Analysis (C$_{21}$H$_{20}$N$_{80}$ Mw:400.44)

Calculated value (%) C; 62.99 H; 5.03 N; 27.98

Measured value (%) C; 62.88 H; 5.12 N; 27.80

Synthesis Example 2

(i) Synthesis of 6-(N-methyl-4-hydroxyanilino)-1,3,5-triazine-2,4-dichloride

Into a three neck 300 mL flask, a stirrer, THF (90 mL) and cyanuric chloride (23.25 g; 126 mmol) were charged, and after a thermometer, a dropping funnel with side-tube and a nitrogen inlet were installed, the mixture was stirred until dissolved completely under nitrogen stream. After the mixture was dissolved, the solution was cooled to −5 to −10° C. with an ice bath. 4-aminophenol (16.50 g; 134 mmol) dissolved in THF (80 mL) was added dropwise and stirred while keeping at 0° C. or lower for 2 hours. After the reaction, an aqueous solution of sodium carbonate (6.625 g, 66.3 mmol) in 60 mL was added to neutralize a chloride salt of by-product and stirred at the same temperature for 2 hours. Allowing the temperature to increase naturally up to room temperature, the mixture was stirred for further one hour. The end of reaction was confirmed by checking non-existence of a spot of cyanuric chloride as the starting material in TLC. After the termination of the reaction, an aqueous phase and an organic phase were separated by using a 1000 mL-separating funnel to obtain the organic phase in which the object product was dissolved. When doing this process, washing with saturated saline solution was repeated three times. The organic phase was dehydrated with anhydrous sodium sulfate. After removing the sodium sulfate by filtration, the organic solvent in the separated organic phase was evaporated by an evaporator. The crude product was recrystallized from hexane-THF mixed solvent, and the solid after filtration was dried at 80° C. for 6 hours in vacuo to obtain 6-(N-methyl-p-hydroxyanilino)-1,3,5-triazine-2,4-dichloride.

Yield (quantity): 2.368 g, Yield (ratio): 53%, Melting point: 165° C.

$^1$H-NMR (400 MHz, CDCl$_3$-d, ppm): δ7.40 (s, 1H, —OH), 7.06 (d, 2H, Ar—H), 6.84 (d, 2H, Ar—H), 3.50 (s, 3H, CH$_3$)

$^{13}$C-NMR (101 MHz, CDCl$_3$-d, ppm): δ170.1, 169.8, 165.1, 155.9, 134.1, 127.1, 116.3, 39.5

Elemental Analysis (C$_{10}$H$_{18}$N$_4$OCl$_2$ Mw:271.10)
Calculated value (%) C; 44.30 H; 2.97 N; 20.67
Measured value (%) C; 44.35 H; 3.13 N; 20.37

(ii) Synthesis of 2,4-bis(4-aminoanilino)-6-(N-methyl-4-hydroxyanilino)-1,3,5-triazine (AMHT)

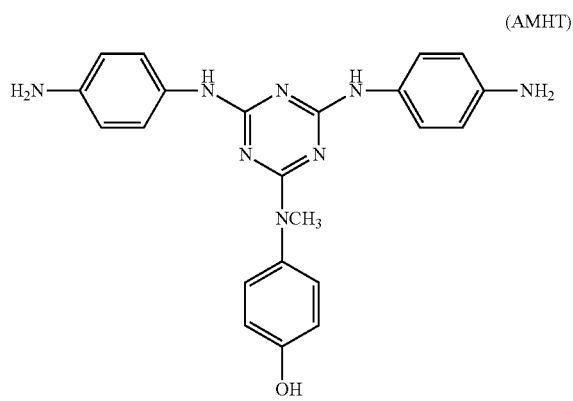 [SMILES: CN(c1ccc(O)cc1)c1nc(Nc2ccc(N)cc2)nc(Nc2ccc(N)cc2)n1]

(AMHT)

Into a three neck 1000 mL flask, a stirrer, 1,4-dioxane (300 mL), p-phenylenediamine (114.89 g; 1.06 mol) and sodium carbonate (7.04 g; 0.0664 mol) were charged, and after a dropping funnel with side-tube and a nitrogen inlet were installed, the mixture was stirred at refluxing temperature. After the mixture was dissolved, 6-(N-methyl-p-hydroxyanilino)-1,3,5-triazine-2,4-dichloride (18.0 g; 0.0664 mol) dissolved in 1,4-dioxane (300 mL) was added dropwise and stirred overnight at the reflux temperature. The end of reaction was confirmed by TLC. After the termination of the reaction, the crude product was washed with hot water and distilled water until the aqueous solution became transparent. The crude product was dissolved in acetone completely, decolorized by using activated carbon and the activated carbon was remove by hot-filtration. The solvent was removed from the filtrate by evaporation. The obtained solid was recrystallized from 1,4-dioxane, and a solid after filtration was dried to obtain the target product of 2,4-bis(p-aminoanilino)-6-(N-methyl-p-hydroxyanilino)-1,3,5-triazine (AMHT).

Yield (quantity): 18.0 g, Yield (ratio): 65%, Melting point: 260° C.

$^1$H-NMR (400 MHz, DMSO-d$_6$, ppm): δ9.37 (s, 1H, —OH), 8.48 (s, 2H, N—H), 7.28 (s, 4H, Ar—H), 7.10 (d, 2H, Ar—H), 6.77 (d, 2H, Ar—H), 6.42 (s, 4H, Ar—H), 4.71 (s, 4H, N—H$_2$), 3.35 (s, 3H, CH3)

$^{13}$C-NMR (101 MHz, DMSO-d$_6$, ppm): δ166.5, 163.7, 155.1, 136.4, 129.6, 128.1, 115.1, 113.7, 83.6, 66.3, 39.5

FT-IR (KBr, cm$^{-1}$): 3465 (O-H), 3388 (N—H)
Elemental Analysis (C22H$_{22}$N$^{80}$ Mw:400.44)
Calculated value (%) C; 63.75 H; 5.35 N; 27.04
Measured value (%) C; 63.86 H; 5.58 N; 26.58

<<Preparation of Polyamic Acid Solution>>

Polyamic acid solutions were prepared as follows.

(Preparation of Polyamic Acid Solution A)
PMDA/AHHT

Into a three neck flask equipped with a stirring rod and a nitrogen inlet, 2,4-bis(4-aminoanilino)-6-(4-hydroxyanilino)-1,3,5-triazine (AHHT) (1.00 g, 2.50 mmol) and N,N-dimethylacetamide (DMAc) (5 mL) were charged and dissolved by stirring at room temperature. Then, to the mixture, pyromellitic dianhydride (PMDA) (0.545 g, 2.50 mmol) was added and reacted at room temperature with stirring for 6 hours to obtain a viscous polymerization solution, which was diluted with DMAc, giving polyamic acid solution A (polyimide precursor solution A). Logarithmic viscosity number ($\eta_{inh}$) of the polyamic acid was 1.40 dL/g.

(Preparation of Polyamic Acid Solution B)
s-BPDA/AHHT

Polyamic acid solution B was prepared in a similar manner to the preparation of polyamic acid solution A except that 3,3',4,4'-biphenyltetracarboxylic dianhydride (s-BPDA) was used as an acid dianhydride.

(Preparation of Polyamic Acid Solution C)
CBDA/AHHT

Polyamic acid solution C was prepared in a similar manner to the preparation of polyamic acid solution A except that 1,2,3,4-cyclobutanetetracarboxylic dianhydride (CBDA) was used as an acid dianhydride.

(Preparation of Polyamic Acid Solution D)
6 FDA/AHHT

Polyamic acid solution D was prepared in a similar manner to the preparation of polyamic acid solution A except that 4,4'-(hexafluoroisopropylidene)diphthalic dianhydride (6 FDA) was used as an acid dianhydride.

(Preparation of Polyamic Acid Solution E)
ODPA/AHHT

Polyamic acid solution E was prepared in a similar manner to the preparation of polyamic acid solution A except that 4,4'-oxydiphthalic dianhydride (ODPA) was used as an acid dianhydride.

(Preparation of Polyamic Acid Solution F)
BTDA/AHHT

Polyamic acid solution F was prepared in a similar manner to the preparation of polyamic acid solution A except that 3,3',4,4'-benzophenone tetracarboxylic dianhydride (BTDA) was used as an acid dianhydride.

(Preparation of Polyamic Acid Solution G)
DSDA/AHHT
Polyamic acid solution G was prepared in a similar manner to the preparation of polyamic acid solution A except that 3,3',4,4'-diphenylsulfone tetracarboxylic dianhydride (DSDA) was used as an acid dianhydride.

(Preparation of Polyamic Acid Solution H)
PMDA/AMHT
Polyamic acid solution H (polyimide precursor solution H) was prepared in a similar manner to the preparation of polyamic acid solution A except that 2,4-bis(4-aminoanilino)-6-(N-methyl-p-hydroxyanilino)-1,3,5-triazine (AMHT) (1.04 g, 2.50 mmol) was used as a diamine component.

(Preparation of Polyamic Acid Solution I)
s-BPDA/AMHT
Polyamic acid solution I was prepared in a similar manner to the preparation of polyamic acid solution H except that 3,3',4,4'-biphenyl tetracarboxylic dianhydride (s-BPDA) was used as an acid dianhydride.

(Preparation of Polyamic Acid Solution J)
CBDA/AMHT
Polyamic acid solution J was prepared in a similar manner to the preparation of polyamic acid solution H except that 1,2,3,4-cyclobutanetetracarboxylic dianhydride (CBDA) was used as an acid dianhydride.

(Preparation of Polyamic Acid Solution K)
6 FDA/AMHT
Polyamic acid solution K was prepared in a similar manner to the preparation of polyamic acid solution H except that 4,4'-(hexafluoroisopropylidene)diphthalic dianhydride (6 FDA) was used as an acid dianhydride.

(Preparation of Polyamic Acid Solution L)
ODPA/AMHT
Polyamic acid solution L was prepared in a similar manner to the preparation of polyamic acid solution H except that 4,4'-oxydiphthalic dianhydride (ODPA) was used as an acid dianhydride.

(Preparation of Polyamic Acid Solution M)
BTDA/AMHT
Polyamic acid solution M was prepared in a similar manner to the preparation of polyamic acid solution H except that 3,3',4,4'-benzophenone tetracarboxylic dianhydride (BTDA) was used as an acid dianhydride.

(Preparation of Polyamic Acid Solution N)
DSDA/AMHT
Polyamic acid solution N was prepared in a similar manner to the preparation of polyamic acid solution H except that 3,3',4,4'-diphenylsulfone tetracarboxylic dianhydride (DSDA) was used as an acid dianhydride.

(Preparation of Polyamic Acid Solution O)
PMDA/p-ATDA
Polyamic acid solution O (polyimide precursor solution O) was prepared in a similar manner to the preparation of polyamic acid solution A except that 2,4-bis(4-aminoanilino)-6-anilino-1,3,5-triazine (p-ATDA) (0.961 g, 2.50 mmol) was used as a diamine.

(Preparation of Polyamic Acid Solution P)
s-BPDA/p-ATDA
Polyamic acid solution P was prepared in a similar manner to the preparation of polyamic acid solution O except that 3,3',4,4'-biphenyl tetracarboxylic dianhydride (s-BPDA) was used as an acid dianhydride.

(Preparation of Polyamic Acid Solution Q)
CBDA/p-ATDA
Polyamic acid solution Q was prepared in a similar manner to the preparation of polyamic acid solution O except that 1,2,3,4-cyclobutanetetracarboxylic dianhydride (CBDA) was used as an acid dianhydride.

(Preparation of Polyamic Acid Solution R)
6 FDA/p-ATDA
Polyamic acid solution R was prepared in a similar manner to the preparation of polyamic acid solution O except that 4,4'-(hexafluoroisopropylidene)diphthalic dianhydride (6 FDA) was used as an acid dianhydride.

(Preparation of Polyamic Acid Solution S)
ODPA/p-ATDA
Polyamic acid solution S was prepared in a similar manner to the preparation of polyamic acid solution O except that 4,4'-oxydiphthalic dianhydride (ODPA) was used as an acid dianhydride.

(Preparation of Polyamic Acid Solution T)
BTDA/p-ATDA
Polyamic acid solution T was prepared in a similar manner to the preparation of polyamic acid solution O except that 3,3',4,4'-benzophenone tetracarboxylic dianhydride (BTDA) was used as an acid dianhydride.

<<Preparation of Polyimide Film by Thermal Imidization>>

Example A1

Preparation of Polyimide Film A1

PMDA/AHHT
Polyamic acid solution A was cast as a thin film on a glass plate, and deaerated under reduced pressure. Thermal imidization was performed by heating under reduced pressure at 60° C. for 6 hours, and stepwisely 100° C., 150° C., 200° C., 250° C. and 300° C., each for one hour. After cooling it, it was immersed in water to peel the polyimide film from the glass plate. The film was dried, giving polyimide film A1 having thickness of 27 μm. Properties and solubility to organic solvent of the obtained polyimide film are shown in Table A1 and Table A2, respectively.

Example A2

Preparation of Polyimide Film B1 s-BPDA/AHHT
Polyimide film B1 was obtained in similar manner as described for the preparation of polyimide film A1 except that polyamic acid solution B was used in place of polyamic acid solution A. The properties of the obtained polyimide film were shown in Table A1.

Example A3

Preparation of Polyimide Film C1

CBDA/AHHT
Polyimide film C1 was obtained in similar manner as described for the preparation of polyimide film A1 except that polyamic acid solution C was used in place of polyamic acid solution A. The properties of the obtained polyimide film were shown in Table A1.

Example A4

Preparation of Polyimide Film D1

6 FDA/AHHT
Polyimide film D1 was obtained in similar manner as described for the preparation of polyimide film A1 except that polyamic acid solution D was used in place of polyamic acid solution A. The properties of the obtained polyimide film were shown in Table A1.

Example A5

Preparation of Polyimide Film E1

ODPA/AHHT
Polyimide film E1 was obtained in similar manner as described for the preparation of polyimide film A1 except that polyamic acid solution E was used in place of polyamic acid solution A. The properties of the obtained polyimide film were shown in Table A1.

Example A6

Preparation of Polyimide Film F1

BTDA/AHHT
Polyimide film F1 was obtained in similar manner as described for the preparation of polyimide film A1 except that polyamic acid solution F was used in place of polyamic acid solution A. The properties of the obtained polyimide film were shown in Table A1.

Example A7

Preparation of Polyimide Film G1

DSDA/AHHT
Polyimide film G1 was obtained in similar manner as described for the preparation of polyimide film A1 except that polyamic acid solution G was used in place of polyamic acid solution A. The properties of the obtained polyimide film were shown in Table A1.

Example A8

Preparation of Polyimide Film H1

PMDA/AMHT
Polyimide film H1 was obtained in similar manner as described for the preparation of polyimide film A1 except that polyamic acid solution H was used in place of polyamic acid solution A. Properties and solubility to organic solvent of the obtained polyimide film are shown in Table A1 and Table A2, respectively.

Example A9

Preparation of Polyimide Film I1 s-BPDA/AMHT
Polyimide film I1 was obtained in similar manner as described for the preparation of polyimide film A1 except that polyamic acid solution I was used in place of polyamic acid solution A. The properties of the obtained polyimide film were shown in Table A1.

Example A10

Preparation of Polyimide Film J1

CBDA/AMHT
Polyimide film J1 was obtained in similar manner as described for the preparation of polyimide film A1 except that polyamic acid solution J was used in place of polyamic acid solution A. The properties of the obtained polyimide film were shown in Table A1.

Example A11

Preparation of Polyimide Film K1

6 FDA/AMHT
Polyimide film K1 was obtained in similar manner as described for the preparation of polyimide film A1 except that polyamic acid solution K was used in place of polyamic acid solution A. The properties of the obtained polyimide film were shown in Table A1.

Example A12

Preparation of Polyimide Film L1 ODPA/AMHT

Polyimide film L1 was obtained in similar manner as described for the preparation of polyimide film A1 except that polyamic acid solution L was used in place of polyamic acid solution A. The properties of the obtained polyimide film were shown in Table A1.

Example A13

Preparation of Polyimide Film M1

BTDA/AMHT
Polyimide film M1 was obtained in similar manner as described for the preparation of polyimide film A1 except that polyamic acid solution M was used in place of polyamic acid solution A. The properties of the obtained polyimide film were shown in Table A1.

Example A14

Preparation of Polyimide Film N1

DSDA/AMHT
Polyimide film N1 was obtained in similar manner as described for the preparation of polyimide film A1 except that polyamic acid solution N was used in place of polyamic acid solution A. The properties of the obtained polyimide film were shown in Table A1.

Referential Example A1

Preparation of Polyimide Film O1

PMDA/p-ATDA
Polyamic acid solution O was cast as a thin film on a glass plate, and thermal imidization was performed by heating at 60° C. for 6 hours, 100° C. for 1 hour, 200° C. for 1 hour, and further 300° C. for 1 hour to obtain polyimide film O1. Properties and solubility to organic solvent of the obtained polyimide film are shown in Table A1 and Table A2, respectively.

Referential Example A2

Preparation of Polyimide Film P1 s-BPDA/p-ATDA
Polyimide film P1 was obtained in similar manner as described for the preparation of polyimide film O1 exceptthat polyamic acid solution P was used in place of polyamic acid solution O. The properties of the obtained polyimide film were shown in Table A1. t

Referential Example A3

Preparation of Polyimide Film Q1

CBDA/p-ATDA

Polyimide film Q1 was obtained in similar manner as described for the preparation of polyimide film O1 except that polyamic acid solution Q was used in place of polyamic acid solution O. The properties of the obtained polyimide film were shown in Table A1.

Referential Example A4

Preparation of Polyimide Film R1

6FDA/p-ATDA

Polyimide film R1 was obtained in similar manner as described for the preparation of polyimide film O1 except that polyamic acid solution R was used in place of polyamic acid solution O. The properties of the obtained polyimide film were shown in Table A1.

Referential Example A5

Preparation of Polyimide Film S1

ODPA/p-ATDA

Polyimide film S1 was obtained in similar manner as described for the preparation of polyimide film O1 except that polyamic acid solution S was used in place of polyamic acid solution O. The properties of the obtained polyimide film were shown in Table A1.

Referential Example A6

Preparation of Polyimide Film T1

BTDA/p-ATDA

Polyimide film T1 was obtained in similar manner as described for the preparation of polyimide film O1 except that polyamic acid solution T was used in place of polyamic acid solution O. The properties of the obtained polyimide film were shown in Table A1.

TABLE A2

|  | acid component (mol %) | diamine (mol %) | DMAc | NMP |
|---|---|---|---|---|
| Example A1 | PMDA | AHHT | + | + |
| Example A8 | PMDA | AMHT | + | ++ |
| Ref. Example A1 | PMDA | p-ATDA | ± | ± |

<<Preparation of Polyimide Solution>>

(Preparation of Polyimide Solution B)

s-BPDA/AHHT

Into a 100 mL-three neck flask equipped with a three-one motor and a nitrogen inlet, 2,4-bis(4-aminoanilino)-6-(4-hydroxyanilino)-1,3,5-triazine (AHHT) (1.00 g, 2.50 mmol) and N-methylpyrrolidone (NMP) (5 mL) were added under nitrogen stream and dissolved by stirring at room temperature. Then, to the mixture, 3,3',4,4'-biphenyl tetracarboxylic dianhydride (s-BPDA) (0.736 g, 2.50 mmol) was added with stirring at room temperature and further stirred at room temperature for 6 hours. Since gelation takes place due to the viscosity increase with the progress of the polymerization, the solvent was added in the respective systems, and polyamic acid solution as polyimide precursor was obtained. Then, in a three neck flask equipped with Dean-Stark apparatus and Dimroth condenser, NMP and the polyamic acid solution were charged so that the reaction solution became 5 wt %. 5 mL of Toluene was added as azeotropic solvent and water was removed from the system by stirring at 140° C. for 3 hours, and further stirred at 200° C. for 3 hours to carry out imidization reaction. The reaction solution was poured into methanol to precipitate a solid matter, and the crude product was obtained after suction filtration. The obtained crude product was dissolved in NMP and re-precipitated, and was dried in vacuo at 80° C. to give polyimide flake B, which was used for solubility test. The obtained product was dissolved in NMP again to obtain polyimide solution B.

(Preparation of Polyimide Solution C)

CBDA/AHHT

Polyimide flake C and polyimide solution C were prepared in a similar manner to the preparation of polyimide

TABLE A1

|  | polyimide film | acid component (mol %) | diamine (mol %) | Tg (° C.) | Td10(N2) (° C.) |
|---|---|---|---|---|---|
| Example A1 | polyimide film A1 | PMDA | AHHT | 286 | 524 |
| Example A2 | polyimide film B1 | s-BPDA | AHHT | 303 | 542 |
| Example A3 | polyimide film C1 | CBDA | AHHT | 298 | 466 |
| Example A4 | polyimide film D1 | 6FDA | AHHT | 310 | 518 |
| Example A5 | polyimide film E1 | ODPA | AHHT | 271 | 527 |
| Example A6 | polyimide film F1 | BTDA | AHHT | 300 | 513 |
| Example A7 | polyimide film G1 | DSDA | AHHT | 307 | 459 |
| Example A8 | polyimide film H1 | PMDA | AMHT | 306 | 542 |
| Example A9 | polyimide film I1 | s-BPDA | AMHT | 282 | 538 |
| Example A10 | polyimide film J1 | CBDA | AMHT | 319 | 463 |
| Example A11 | polyimide film K1 | 6FDA | AMHT | 300 | 510 |
| Example A12 | polyimide film L1 | ODPA | AMHT | 276 | 508 |
| Example A13 | polyimide film M1 | BTDA | AMHT | 290 | 508 |
| Example A14 | polyimide film N1 | DSDA | AMHT | 304 | 465 |
| Ref. Example A1 | polyimide film O1 | PMDA | p-ATDA | 320 | 509 |
| Ref. Example A2 | polyimide film P1 | s-BPDA | p-ATDA | 258 | 500 |
| Ref. Example A3 | polyimide film Q1 | CBDA | p-ATDA | — | 455 |
| Ref. Example A4 | polyimide film R1 | 6FDA | p-ATDA | 289 | 504 |
| Ref. Example A5 | polyimide film S1 | ODPA | p-ATDA | 220 | 493 |
| Ref. Example A6 | polyimide film T1 | BTDA | p-ATDA | 227 | 503 | solution B except that 1,2,3,4-cyclobutanetetracarboxylic dianhydride (CBDA) was used as an acid dianhydride.
(Preparation of Polyimide Solution D)

6 FDA/AHHT

Polyimide flake D and polyimide solution D were prepared in a similar manner to the preparation of polyimide solution B except that 4,4'-(hexafluoroisopropylidene)diphthalic dianhydride (6 FDA) was used as an acid dianhydride.
(Preparation of Polyimide Solution H)

PMDA/AMHT

Polyimide flake H and polyimide solution H were prepared in a similar manner to the preparation of polyimide solution B except that 2,4-bis(4-aminoanilino)-6-(N-methyl-4-hydroxyanilino)-1,3,5-triazine (AMHT) (1.04 g, 2.50 mmol) was used as a diamine component and pyromellitic dianhydride (PMDA) (0.545 g, 2.50 mmol) was used as an acid dianhydride.
(Preparation of Polyimide Solution I)

s-BPDA/AMHT

Polyimide flake I and polyimide solution I were prepared in a similar manner to the preparation of polyimide solution H except that 3,3',4,4'-biphenyl tetracarboxylic dianhydride (s-BPDA) was used as an acid dianhydride.
(Preparation of Polyimide Solution J)

CBDA/AMHT

Polyimide flake J and polyimide solution J were prepared in a similar manner to the preparation of polyimide solution H except that 1,2,3,4-cyclobutanetetracarboxylic dianhydride (CBDA) was used as an acid dianhydride.
(Preparation of Polyimide Solution K)

6 FDA/AMHT

Polyimide flake K and polyimide solution K were prepared in a similar manner to the preparation of polyimide solution H except that 4,4'-(hexafluoroisopropylidene)diphthalic dianhydride (6 FDA) was used as an acid dianhydride.
<<Preparation of Polyimide Film from Polyimide Solution>>

Example A15

Preparation of Polyimide Film B2 and polyimide film B3 s-BPDA/AHHT

Polyimide solution B was cast as a thin film on a glass plate, and deaerated under reduced pressure. The film was dried stepwise in a vacuum oven at 60° C. for 6 hours and 100° C. for 6 hours, giving polyimide film B2.

Polyimide solution B was cast as a thin film on a glass plate, and deaerated under reduced pressure. The film was dried stepwise in a vacuum oven at 60° C. for 6 hours, 100° C. for 6 hours and further 300° C. for 1 hour, giving polyimide film B3. Properties of the obtained polyimide films are shown in Table A3 and solubility of polyimide flake B and polyimide film B3 to organic solvents are shown in Table A4.

Example A16

Preparation of Polyimide Film C2

CBDA/AHHT

Polyimide films C2 and C3 were obtained in similar manner as described for the preparation of polyimide film B2 except that polyimide solution C was used in place of polyimide solution B. The properties of the obtained polyimide film were shown in Table A3 and solubility of polyimide flake C and polyimide film C3 to organic solvents are shown in Table A4.

Example A17

Preparation of Polyimide Film D2 and polyimide film D3

6 FDA/AHHT

Polyimide films D2 and D3 were obtained in similar manner as described for the preparations of polyimide films B2 and B3 except that polyimide solution D was used in place of polyimide solution B. The properties of the obtained polyimide film were shown in Table A3 and solubility of polyimide flake D and polyimide film D3 to organic solvents are shown in Table A4.

Example A18

Preparation of Polyimide Film H2 and Polyimide Film H3

PMDA/AMHT

Polyimide films H2 and H3 were obtained in similar manner as described for the preparations of polyimide films B2 and B3 except that polyimide solution H was used in place of polyimide solution B. The properties of the obtained polyimide film were shown in Table A3 and solubility of polyimide flake H and polyimide film H3 to organic solvents are shown in Table A4.

Example A19

Preparation of Polyimide Film I2 and Polyimide Film I3 s-BPDA/AMHT

Polyimide films I2 and I3 were obtained in similar manner as described for the preparations of polyimide films B2 and B3 except that polyimide solution I was used in place of polyimide solution B. The properties of the obtained polyimide film were shown in Table A3 and solubility of polyimide flake I and polyimide film I3 to organic solvents are shown in Table A4.

Example A20

Preparation of Polyimide Film J2

CBDA/AMHT

Polyimide films J2 and J3 were obtained in similar manner as described for the preparations of polyimide films B2 and B3 except that polyimide solution J was used in place of polyimide solution B. The properties of the obtained polyimide film were shown in Table A3 and solubility of polyimide flake J and polyimide film J3 to organic solvents are shown in Table A4.

Example A21

Preparation of Polyimide Film K2 and polyimide film K3

6 FDA/AMHT

Polyimide films K2 and K3 were obtained in similar manner as described for the preparations of polyimide films B2 and B3 except that polyimide solution K was used in place of polyimide solution B. The properties of the obtained polyimide film were shown in Table A3 and solubility of polyimide flake K and polyimide film K3 to organic solvents are shown in Table A4.

TABLE A3

| | polyimide film | acid component (mol %) | diamine (mol %) | drying temp. (° C.) | Tg (° C.) | Td10(N2) (° C.) |
|---|---|---|---|---|---|---|
| Example A15 (1) | PI film B2 | s-BPDA | AHHT | 100 | 273 | 555 |
| Example A15 (2) | PI film B3 | s-BPDA | AHHT | 300 | 310 | 540 |
| Example A16 (1) | PI film C2 | CBDA | AHHT | 100 | — | — |
| Example A16 (2) | PI film C3 | CBDA | AHHT | 300 | — | — |
| Example A17 (1) | PI film D2 | 6FDA | AHHT | 100 | 275 | 509 |
| Example A17 (2) | PI film D3 | 6FDA | AHHT | 300 | 312 | 507 |
| Example A18 (1) | PI film H2 | PMDA | AMHT | 100 | 276 | 481 |
| Example A18 (2) | PI film H3 | PMDA | AMHT | 300 | 279 | 522 |
| Example A19 (1) | PI film I2 | s-BPDA | AMHT | 100 | 273 | 555 |
| Example A19 (2) | PI film I3 | s-BPDA | AMHT | 300 | 315 | 513 |
| Example A20 (1) | PI film J2 | CBDA | AMHT | 100 | — | — |
| Example A20 (2) | PI film J3 | CBDA | AMHT | 300 | — | — |
| Example A21 (1) | PI film K2 | 6FDA | AMHT | 100 | 275 | 509 |
| Example A21 (2) | PI film K3 | 6FDA | AMHT | 300 | 312 | 528 |

PI = polyimide

<<Manufacturing of Polyimide-Metal Laminate and Evaluation of Peeling Strength>>

Example A22 s-BPDA/AHHT

Polyimide-metal laminate was manufactured using polyamic acid solution B. Polyimide-metal laminate was obtained by coating a rolled copper foil (BHY-13H-T, 18 μm thickness; Manufactured by JX Nippon Mining & Metals Corporation) with polyamic acid solution B and heating at 120° C. for 10 min, and further raising a temperature up to 400° C. taking 20 min. The thickness of the polyimide film in the polyimide-metal laminate was 27 μm. The result of 90°-peeling test of the polyimide-metal laminate showed that it had good adhesiveness and the film was broken at 1.1 kN/m. Therefore, the polyimide-metal laminate is presumed to have the peeling strength of 1.1 kN/m or higher.

Example A23 s-BPDA/AMHT

Polyimide-metal laminate was manufactured in similar manner as described in Example A22 except that polyamic acid solution I was used in place of polyamic acid solution B and peeling test was carried out. The result showed that it had good adhesiveness and the film was broken at 1.1 kN/m. Therefore, the polyimide-metal laminate is presumed to have the peeling strength of 1.1 kN/m or higher.

Example A24 s-BPDA/AHHT

Polyimide-metal laminate was manufactured in similar manner as described in Example A22 except that polyimide solution B was used in place of polyamic acid solution B and peeling test was carried out. The result showed that it had good adhesiveness and the film was broken at 1.1 kN/m. Therefore, the polyimide-metal laminate is presumed to have the peeling strength of 1.1 kN/m or higher.

TABLE A4

| | polyimide | acid component (mol %) | diamine (mol %) | drying temp. (° C.) | DMI | DMAc | NMP | TMAH |
|---|---|---|---|---|---|---|---|---|
| Example A15 (2) | PI flake B | s-BPDA | AHHT | 80 | ++ | ++ | ++ | ++ |
| Example A15 (2) | PI film B3 | s-BPDA | AHHT | 300 | ± | ± | + | − |
| Example A16 (2) | PI flake C | CBDA | AHHT | 80 | ++ | ++ | ++ | ++ |
| Example A16 (2) | PI film C3 | CBDA | AHHT | 300 | ± | ± | + | ± |
| Example A17 (2) | PI flake D | 6FDA | AHHT | 80 | ++ | ++ | ++ | ++ |
| Example A17 (2) | PI film D3 | 6FDA | AHHT | 300 | ± | ± | + | − |
| Example A18 (2) | PI flake H | PMDA | AMHT | 80 | ++ | ++ | ++ | ++ |
| Example A18 (2) | PI film H3 | PMDA | AMHT | 300 | ± | ± | + | − |
| Example A19 (2) | PI flake I | s-BPDA | AMHT | 80 | ++ | + | ++ | ++ |
| Example A19 (2) | PI film I3 | s-BPDA | AMHT | 300 | ± | ± | + | − |
| Example A20 (2) | PI flake J | CBDA | AMHT | 80 | ++ | ++ | ++ | ++ |
| Example A20 (2) | PI film J3 | CBDA | AMHT | 300 | + | + | + | ± |
| Example A21 (2) | PI flake K | 6FDA | AMHT | 80 | ++ | ++ | ++ | ++ |
| Example A21 (2) | PI film K3 | 6FDA | AMHT | 300 | ± | ± | + | − |

PI = polyimide

Example A25 s-BPDA/AMHT

Polyimide-metal laminate was manufactured in similar manner as described in Example A22 except that polyimide solution I was used in place of polyamic acid solution B and peeling test was carried out. The result showed that it had good adhesiveness and the film was broken at 0.66 kN/m. Therefore, the polyimide-metal laminate is presumed to have the peeling strength of 0.66 kN/m or higher.

<<Manufacturing of Two-Layered Polyimide Laminate and Evaluation of Peeling Strength>>

Example A26 s-BPDA/AHHT

Two-layered polyimide laminate was manufactured using polyamic acid solution B. Except that a polyimide film (Upilex75 S, 75 μm thickness; manufacture by UBE Industries, Ltd.) was coated with polyamic acid solution B, a two-layered polyimide laminate was obtained in similar manner as described in Example A22, and the peeling test was carried out. The result showed that it had good adhesiveness and the film was broken at 1.0 kN/m. Therefore, the two-layered polyimide laminate is presumed to have the peeling strength of 1.0 kN/m or higher.

Example A27 s-BPDA/AMHT

Two-layered polyimide laminate was manufactured in similar manner as described in Example A26 except that polyamic acid solution I was used in place of polyamic acid solution B and peeling test was carried out. The result showed that it had good adhesiveness and the film was broken at 0.63 kN/m. Therefore, the two-layered polyimide laminate is presumed to have the peeling strength of 0.63 kN/m or higher.

Example A28 s-BPDA/AMHT

Two-layered polyimide laminate was manufactured in similar manner as described in Example A26 except that polyimide solution I was used in place of polyamic acid solution B and peeling test was carried out. The result showed that it had good adhesiveness and the film was broken at 1.1 kN/m. Therefore, the two-layered polyimide laminate is presumed to have the peeling strength of 1.1 kN/m or higher.

Referential Example A7

6 FDA/p-ATDA

Two-layered polyimide laminate was manufactured in similar manner as described in Example A26 except using polyamic acid solution R in place of polyamic acid solution B and heating at 120° C. for 10 min, and further raising a temperature up to 300° C. taking 20 min, and peeling test was carried out. The result showed that it had no adhesiveness.

Referential Example A8

ODPA/p-ATDA

Two-layered polyimide laminate was manufactured in similar manner as described in Example A26 except using polyamic acid solution S in place of polyamic acid solution B and heating at 120° C. for 10 min, and further raising a temperature up to 300° C. taking 20 min, and peeling test was carried out. The result showed that it had no adhesiveness.

Referential Example A9

BTDA/p-ATDA

Two-layered polyimide laminate was manufactured in similar manner as described in Example A26 except using polyamic acid solution T in place of polyamic acid solution B and heating at 120° C. for 10 min, and further raising a temperature up to 300° C. taking 20 min, and peeling test was carried out. The result showed that it had no adhesiveness.

From the examples and referential examples, mainly the following findings have become clear.

(1) With respect to polyimide films formed by thermal imidization of the self-supporting films of polyamic acids, the film formed by using AHHT or AMHT as a diamine has higher glass transition temperature and higher 10% weight-loss temperature than the film formed by using p-ATDA having no OH substituent.

(2) With respect to polyimide films formed from the polyimide solution, when AHHT and AMHT are used as a diamine, 10% weight-loss temperature increases compared with the case that p-ATDA having no OH substituent is used.

(3) Polyimide flakes obtained by precipitating polyimide solution in methanol and drying at 80° C. in vacuo are not only soluble in many organic solvents, but also shows high solubility in tetramethylammonium hydroxide aqueous solution (TMAH)

(4) Bonding peeling strength of a polyimide-metal laminates obtained by applying polyamic acids and curing thereof are 1.1 kN/m, as high as the film is broken. In addition, bonding peeling strengths of polyimide-metal laminates obtained by applying polyimide solutions and drying thereof are 0.66 to 1.1 kN/m, also as high as films are broken.

(5) Bonding peeling strengths of two-layered polyimide laminates obtained by applying polyamic acids and curing thereof are 0.63 to 1.1 kN/m, as high as films are broken. In addition, bonding peeling strength of two-layered polyimide laminate obtained by applying polyimide solution and drying thereof is 1.1 kN/m, also as high as the film is broken.

Examples of the Invention of Part B

Next, examples of the invention of Part B will be described. As already mentioned, the explanation of examples of Part B and the explanation of examples of Part A are independent each other, and therefore, identity names of the prepared materials, for example "polyamic acid solution A", "polyimide film A1" and the like in the description of examples of Part B mean "polyamic acid solution A", "polyimide film A1" and the like described in Part B, and do not denote the materials having the same identity names which may be present in Part A.

<<Preparation of Polyamic Acid Solution>>

Polyamic acid solutions were prepared as follows.

(Preparation of Polyamic Acid Solution A)

PMDA/PTDA

Into a three neck flask equipped with a stirring rod and a nitrogen inlet, 2,4-bis(4-aminoanilino)-6-diphenylamino-1,3,5-triazine (PTDA) (1.15 g, 2.50 mmol) and N,N-dimethylacetamide (DMAc) (5 mL) were charged and dissolved by stirring at room temperature. Then, to the mixture, pyromellitic dianhydride (PMDA) (0.545 g, 2.50 mmol) was added and reacted at room temperature with stirring for 6 hours to obtain a viscous polymerization solution, which was diluted with DMAc, giving polyamic acid solution A (polyimide precursor solution A). Logarithmic viscosity number ($\eta_{inh}$) of the polyamic acid was 0.66 dL/g.

(Preparation of Polyamic Acid Solution B)
s-BPDA/PTDA
Polyamic acid solution B was prepared in a similar manner to the preparation of polyamic acid solution A except that 3,3',4,4'-biphenyltetracarboxylic dianhydride (s-BPDA) was used as an acid dianhydride.

(Preparation of Polyamic Acid Solution C)
DSDA/PTDA
Polyamic acid solution C was prepared in a similar manner to the preparation of polyamic acid solution A except that 3,3',4,4'-diphenylsulfone tetracarboxylic dianhydride (DSDA) was used as an acid dianhydride.

(Preparation of Polyamic Acid Solution D)
BTDA/PTDA
Polyamic acid solution D was prepared in a similar manner to the preparation of polyamic acid solution A except that 3,3',4,4'-benzophenone tetracarboxylic dianhydride (BTDA) was used as an acid dianhydride.

(Preparation of Polyamic Acid Solution E)
ODPA/PTDA
Polyamic acid solution E was prepared in a similar manner to the preparation of polyamic acid solution A except that 4,4'-oxydiphthalic dianhydride (ODPA) was used as an acid dianhydride.

(Preparation of Polyamic Acid Solution F)
6 FDA/PTDA
Polyamic acid solution F was prepared in a similar manner to the preparation of polyamic acid solution A except that 4,4'-(hexafluoroisopropylidene)diphthalic dianhydride (6 FDA) was used as an acid dianhydride.

(Preparation of Polyamic Acid Solution G)
PMDA/p-ATDA
Polyamic acid solution G (polyimide precursor solution G) was prepared in a similar manner to the preparation of polyamic acid solution A except that 2,4-bis(4-aminoanilino)-6-anilino-1,3,5-triazine (p-ATDA)(0.961 g, 2.50 mmol) was used as a diamine component.

(Preparation of Polyamic Acid Solution H)
s-BPDA/p-ATDA
Polyamic acid solution H was prepared in a similar manner to the preparation of polyamic acid solution G except that 3,3',4,4'-biphenyltetracarboxylic dianhydride (s-BPDA) was used as an acid dianhydride.

(Preparation of Polyamic Acid Solution I)
DSDA/p-ATDA
Polyamic acid solution I was prepared in a similar manner to the preparation of polyamic acid solution G except that 3,3',4,4'-diphenylsulfone tetracarboxylic dianhydride (DSDA) was used as an acid dianhydride.

(Preparation of Polyamic Acid Solution J)
BTDA/p-ATDA
Polyamic acid solution J was prepared in a similar manner to the preparation of polyamic acid solution G except that 3,3',4,4'-benzophenone tetracarboxylic dianhydride (BTDA) was used as an acid dianhydride.

(Preparation of Polyamic Acid Solution K)
ODPA/p-ATDA
Polyamic acid solution K was prepared in a similar manner to the preparation of polyamic acid solution G except that 4,4'-oxydiphthalic dianhydride (ODPA) was used as an acid dianhydride.

(Preparation of Polyamic Acid Solution L)
6 FDA/p-ATDA
Polyamic acid solution L was prepared in a similar manner to the preparation of polyamic acid solution G except that 4,4'-(hexafluoroisopropylidene)diphthalic dianhydride (6 FDA) was used as an acid dianhydride.

(Preparation of Polyamic Acid Solution M)
s-BPDA/PPD
Polyamic acid solution M was prepared in a similar manner to the preparation of polyamic acid solution B except that para-phenylene diamine (PPD) (0.270 g, 2.50 mmol) was used as a diamine component.

(Preparation of Polyamic Acid Solution N)
CBDA/PTDA
Polyamic acid solution N was prepared in a similar manner to the preparation of polyamic acid solution A except that 1,2,3,4-cyclobutanetetracarboxylic dianhydride (CBDA) was used as an acid dianhydride.

(Preparation of Polyamic Acid Solution O)
CBDA/p-ATDA
Polyamic acid solution O was prepared in a similar manner to the preparation of polyamic acid solution G except that 1,2,3,4-cyclobutanetetracarboxylic dianhydride (CBDA) was used as an acid dianhydride.

(Preparation of Polyamic Acid Solution P)
s-BPDA/PMDA/PTDA=75/25/100
Polyamic acid solution P was prepared in a similar manner to the preparation of polyamic acid solution A except that 3,3',4,4'-biphenyltetracarboxylic dianhydride (s-BPDA) and pyromellitic dianhydride (PMDA) were used as acid dianhydride with the molar ratio in the acid dianhydride component of s-BPDA/PMDA=75/25.

(Preparation of Polyamic Acid Solution Q)
s-BPDA/PMDA/PTDA=50/50/100
Polyamic acid solution Q was prepared in a similar manner to the preparation of polyamic acid solution A except that 3,3',4,4'-biphenyltetracarboxylic dianhydride (s-BPDA) and pyromellitic dianhydride (PMDA) were used as acid dianhydride with the molar ratio in the acid dianhydride component of s-BPDAJPMDA=50/50.

(Preparation of Polyamic Acid Solution R)
s-BPDA/PMDA/PTDA=25/75/100
Polyamic acid solution R was prepared in a similar manner to the preparation of polyamic acid solution A except that 3,3',4,4'-biphenyltetracarboxylic dianhydride (s-BPDA) and pyromellitic dianhydride (PMDA) were used as acid dianhydride with the molar ratio in the acid dianhydride component of s-BPDA/PMDA=25/75.

(Preparation of Polyamic Acid Solution S)
s-BPDA/p-ATDA
Polyamic acid solution S has the same formulation as polyamic acid solution H.

(Preparation of Polyamic Acid Solution T)
s-BPDA/PMDA/p-ATDA=50/50/100
Polyamic acid solution T was prepared in a similar manner to the preparation of polyamic acid solution G except that 3,3',4,4'-biphenyltetracarboxylic dianhydride (s-BPDA) and pyromellitic dianhydride (PMDA) were used as acid dianhydride with the molar ratio in the acid dianhydride component of s-BPDA/PMDA=50/50.

(Preparation of Polyamic Acid Solution U)
PMDA/p-ATDA=100/100
Polyamic acid solution U has the same formulation as polyamic acid solution G.
(Preparation of Polyamic Acid Solution V)
s-BPDA/p-ATDA/m-ATDA=100/70/30
Polyamic acid solution V was prepared in a similar manner to the preparation of polyamic acid solution G except that 3,3',4,4'-biphenyltetracarboxylic dianhydride (s-BPDA) was used as acid dianhydride, and the mixture of 2,4-bis(4-aminoanilino)-6-anilino-1,3,5-triazine (p-ATDA) and 2,4-bis(3-aminoanilino)-6-anilino-1,3,5-triazine (m-ATDA) with the ratio of 70:30 (molar ratio) was used as diamine.
(Preparation of Polyamic Acid Solution W)
s-BPDA/p-ATDA/m-ATDA=100/50/50
Polyamic acid solution W was prepared in a similar manner to the preparation of polyamic acid solution V except that the mixture ratio of p-ATDA and m-ATDA is 50:50 (molar ratio).
(Preparation of Polyamic Acid Solution X)
s-BPDA/p-ATDA/m-ATDA=100/30/70
Polyamic acid solution X was prepared in a similar manner to the preparation of polyamic acid solution V except that the mixture ratio of p-ATDA and m-ATDA is 30:70 (molar ratio).
(Preparation of Polyamic Acid Solution Y)
s-BPDA/m-ATDA=100/100
Polyamic acid solution Y was prepared in a similar manner to the preparation of polyamic acid solution V except that m-ATDA was used as diamine with 100% (molar ratio).
(Preparation of Polyamic Acid Solution Z)
DSDA/p-ATDA=100/100
Polyamic acid solution Z was prepared in a similar manner to the preparation of polyamic acid solution G except that DSDA was used as acid dianhydride component.
(Preparation of Polyamic Acid Solution Z1)
6 FDA/p-ATDA=100/100
Polyamic acid solution Z1 was prepared in a similar manner to the preparation of polyamic acid solution G except that 6 FDA was used as acid dianhydride component.
<<Solubility Test for Polyimide Solution (Preparation of Polyimide Solution)>>
Polyimide films were prepared from polyamic acids by thermal imidization, and solubility test was conducted. The polyimides showing the result of "+" or better ("++" and "+") mean that the polyimide solutions were easily obtained (dissolved at room temperature or by heating easily).

Film-Forming Example B1

Preparation of Polyimide Film A

PMDA/PTDA
Polyamic acid solution A was cast as a thin film on a glass plate, and deaerated under reduced pressure. Thermal imidization was performed by heating under reduced pressure at 60° C. for 6 hours, and stepwisely 100° C., 150° C., 200° C., 250° C. and 300° C., each for one hour. After cooling it, it was immersed in water to peel the polyimide film from the glass plate. The film was dried, giving polyimide film A having thickness of 10 μm. Properties of polyimide film A are shown in Table B1 and Table B6.

Example B1

Preparation of Polyimide Solution A

Solubility test of polyimide film A to various organic solvents was conducted, and the preparation of polyimide solution A was tried. The results are shown in Table B2.

Film-Forming Example B2

Preparation of Polyimide Film B s-BPDA/PTDA
Polyimide film B was obtained in similar manner as described for the preparation of polyimide film A except that polyamic acid solution B was used in place of polyamic acid solution A. Properties of polyimide film B are shown in Table B1 and Table B6.

Example B2

Preparation of Polyimide Solution B

Solubility test of polyimide film B to various organic solvents was conducted, and the preparation of polyimide solution B was tried. The results are shown in Table B2.

Film-Forming Example B3

Preparation of Polyimide Film C

DSDA/PTDA
Polyimide film C was obtained in similar manner as described for the preparation of polyimide film A except that polyamic acid solution C was used in place of polyamic acid solution A. Properties of polyimide film C are shown in Table B1.

Example B3

Preparation of Polyimide Solution C

Solubility test of polyimide film C to various organic solvents was conducted, and the preparation of polyimide solution C was tried. The results are shown in Table B2. In addition, solubility test of polyimide film C to γ-butyrolactone was conducted and the result was "+".

Film-Forming Example B4

Preparation of Polyimide Film D

BTDA/PTDA
Polyimide film D was obtained in similar manner as described for the preparation of polyimide film A except that polyamic acid solution D was used in place of polyamic acid solution A. Properties of the obtained polyimide are shown in Table B1.

Example B4

Preparation of Polyimide Solution D

Solubility test of polyimide film D to various organic solvents was conducted, and the preparation of polyimide solution D was tried. The results are shown in Table B2.

Film-forming Example B5

Preparation of Polyimide Film E

ODPA/PTDA

Polyimide film E was obtained in similar manner as described for the preparation of polyimide film A except that polyamic acid solution E was used in place of polyamic acid solution A. Properties of the obtained polyimide are shown in Table B1.

Example B5

Preparation of Polyimide Solution E

Solubility test of polyimide film E to various organic solvents was conducted, and the preparation of polyimide solution E was tried. The results are shown in Table B2.

Film-Forming Example B6

Preparation of Polyimide Film F

6 FDA/PTDA

Polyimide film F was obtained in similar manner as described for the preparation of polyimide film A except that polyamic acid solution F was used in place of polyamic acid solution A. Properties of the obtained polyimide are shown in Table B1.

Example B6

Preparation of Polyimide Solution F

Solubility test of polyimide film F to various organic solvents was conducted, and the preparation of polyimide solution F was tried. The results are shown in Table B2. In addition, solubility test of polyimide film F to γ-butyrolactone was conducted and the result was "++".

Film-Forming Example B7

Preparation of Polyimide Film G

PMDA/p-ATDA

Polyamic acid solution G was cast as a thin film on a glass plate, and thermal imidization was performed by heating at 60° C. for 6 hours, 100° C. for 1 hour, 200° C. for 1 hour, and further 300° C. for 1 hour to obtain polyimide film G. Properties of the obtained polyimide are shown in Table B1 and Table 6.

Example B7

Preparation of Polyimide Solution G

Solubility test of polyimide film G to various organic solvents was conducted, and the preparation of polyimide solution G was tried. The results are shown in Table B2.

Film-Forming Example B8

Preparation of Polyimide Film H s-BPDA/p-ATDA

Polyimide film H was obtained in similar manner as described for the preparation of polyimide film G except that polyamic acid solution H was used in place of polyamic acid solution G. Properties of the obtained polyimide are shown in Table B1 and Table 6.

Example B8

Preparation of Polyimide Solution H

Solubility test of polyimide film H to various organic solvents was conducted, and the preparation of polyimide solution H was tried. The results are shown in Table B2.

Film-Forming Example B9

Preparation of Polyimide Film I

DSDA/p-ATDA

Polyimide film I was obtained in similar manner as described for the preparation of polyimide film G except that polyamic acid solution I was used in place of polyamic acid solution G. Properties of the obtained polyimide are shown in Table B1 and the solubility to organic solvents is shown in Table B2.

Example B9

Preparation of Polyimide Solution I

Solubility test of polyimide film I to various organic solvents was conducted, and the preparation of polyimide solution I was tried. The results are shown in Table B2.

Film-Forming Example B10

Preparation of Polyimide Film J

BTDA/p-ATDA

Polyimide film J was obtained in similar manner as described for the preparation of polyimide film G except that polyamic acid solution J was used in place of polyamic acid solution G. Properties of the obtained polyimide are shown in Table B1.

Example B10

Preparation of Polyimide Solution J

Solubility test of polyimide film J to various organic solvents was conducted, and the preparation of polyimide solution J was tried. The results are shown in Table B2.

Film-Forming Example B11

Preparation of Polyimide Film K

ODPA/p-ATDA

Polyimide film K was obtained in similar manner as described for the preparation of polyimide film G except that polyamic acid solution K was used in place of polyamic acid solution G. Properties of the obtained polyimide are shown in Table B1.

Example B11

Preparation of Polyimide Solution K

Solubility test of polyimide film K to various organic solvents was conducted, and the preparation of polyimide solution K was tried. The results are shown in Table B2.

Film-Forming Example B12

Preparation of Polyimide Film L

6 FDA/p-ATDA
Polyimide film L was obtained in similar manner as described for the preparation of polyimide film G except that polyamic acid solution L was used in place of polyamic acid solution G. Properties of the obtained polyimide are shown in Table B1.

Example B12

Preparation of Polyimide Solution L

Solubility test of polyimide film L to various organic solvents was conducted, and the preparation of polyimide solution L was tried. The results are shown in Table B2.

Film-Forming Comparative Example B1

Preparation of Polyimide Film M s-BPDA/PPD
Polyamic acid solution M was cast as a thin film on a glass plate, and thermal imidization was performed by heating at 60° C. for 6 hours, 100° C. for 1 hour, 200° C. for 1 hour, 300° C. for 1 hour, and further 400° C. for 1 hour to obtain polyimide film M.

Comparative Example B1

Preparation of Polyimide Solution M

Solubility test of polyimide film M to various organic solvents was conducted, and the preparation of polyimide solution M was tried. However, it was not dissolved in any organic solvents. The results are shown in Table B2.

Film-Forming Example B13

Preparation of Polyimide Film N

CBDA/PTDA
Polyimide film N was obtained in similar manner as described for the preparation of polyimide film A except that polyamic acid solution N was used in place of polyamic acid solution A.

Example B13

Preparation of Polyimide Solution N

Solubility test of polyimide film N to various organic solvents was conducted, and the preparation of polyimide solution N was tried. The results are shown in Table B3.

Film-Forming Example B14

Preparation of Polyimide Film O

CBDA/p-ATDA
Polyimide film O was obtained in similar manner as described for the preparation of polyimide film A except that polyamic acid solution O was used in place of polyamic acid solution G.

Example B14

Preparation of Polyimide Solution 0

Solubility test of polyimide film O to various organic solvents was conducted, and the preparation of polyimide solution O was tried. The results are shown in Table B3.

Film-Forming Example B15

Preparation of Polyimide Film P s-BPDA/PMDA/PTDA=75/25/100
Polyimide film P was obtained in similar manner as described for the preparation of polyimide film A except that polyamic acid solution P was used in place of polyamic acid solution A. Properties of the obtained polyimide are shown in Table B4 and Table B6.

Example B15

Preparation of Polyimide Solution P

Solubility test of polyimide film P to various organic solvents was conducted, and the preparation of polyimide solution P was tried. The results are shown in Table B5.

Film-Forming Example B16

Preparation of Polyimide Film Q s-BPDA/PMDA/PTDA=50/50/100
Polyimide film Q was obtained in similar manner as described for the preparation of polyimide film A except that polyamic acid solution Q was used in place of polyamic acid solution A. Properties of the obtained polyimide are shown in Table B4 and Table B6.

Example B16

Preparation of Polyimide Solution Q

Solubility test of polyimide film Q to various organic solvents was conducted, and the preparation of polyimide solution Q was tried. The results are shown in Table B5.

Film-Forming Example B17

Preparation of Polyimide Film R s-BPDA/PMDA/PTDA=25/75/100

Polyimide film R was obtained in similar manner as described for the preparation of polyimide film A except that polyamic acid solution R was used in place of polyamic acid solution A. Properties of the obtained polyimide are shown in Table B4 and Table B6.

Example B17

Preparation of Polyimide Solution R

Solubility test of polyimide film R to various organic solvents was conducted, and the preparation of polyimide solution R was tried. The results are shown in Table B5.

TABLE B1

|  | polyamic acid solution | acid component (mol %) | diamine (mol %) | Tg (° C.) | Td5(N2) (° C.) |
|---|---|---|---|---|---|
| Film-forming Ex. B1 | A | PMDA | PTDA | 367 | 516 |
| Film-forming Ex. B2 | B | s-BPDA | PTDA | 319 | 497 |
| Film-forming Ex. B3 | C | DSDA | PTDA | 316 | 461 |
| Film-forming Ex. B4 | D | BTDA | PTDA | 292 | 484 |
| Film-forming Ex. B5 | E | ODPA | PTDA | 307 | 483 |
| Film-forming Ex. B6 | F | 6FDA | PTDA | 302 | 486 |
| Film-forming Ex. B7 | G | PMDA | p-ATDA | 320 | 487 |
| Film-forming Ex. B8 | H | s-BPDA | p-ATDA | 258 | 480 |
| Film-forming Ex. B9 | I | DSDA | p-ATDA | 238 | 459 |
| Film-forming Ex. B10 | J | BTDA | p-ATDA | 227 | 478 |
| Film-forming Ex. B11 | K | ODPA | p-ATDA | 220 | 473 |
| Film-forming Ex. B12 | L | 6FDA | p-ATDA | 289 | 477 |
| Film-forming comp, Ex. B1 | M | s-BPDA | PPD |  |  |

TABLE B2

|  | polyimide film | acid component (mol %) | diamine (mol %) | NMP | DMAc | THF |
|---|---|---|---|---|---|---|
| Example B1 | A | PMDA | PTDA | ++ | ± | − |
| Example B2 | B | s-BPDA | PTDA | ++ | ++ | − |
| Example B3 | C | DSDA | PTDA | ++ | ++ | − |
| Example B4 | D | BTDA | PTDA | + | ± | − |
| Example B5 | E | ODPA | PTDA | ++ | ++ | − |
| Example B6 | F | 6FDA | PTDA | ++ | ++ | ++ |
| Example B7 | G | PMDA | p-ATDA | ± | ± | − |
| Example B8 | H | s-BPDA | p-ATDA | ++ | ++ | − |
| Example B9 | I | DSDA | p-ATDA | + | + | − |
| Example B10 | J | BTDA | p-ATDA | ± | ± | − |
| Example B11 | K | ODPA | p-ATDA | + | + | − |
| Example B12 | L | 6FDA | p-ATDA | + | ++ | ± |
| Comp, Ex. B1 | M | s-BPDA | PPD | − | − | − |

TABLE B3

|  | polyimide film | acid component | diamine | NMP | DMAc | DMI | DMSO | y-BL |
|---|---|---|---|---|---|---|---|---|
| Example B13 | N | CBDA | PTDA | ++ | ++ | + | ++ | + |
| Example B14 | O | CBDA | p-ATDA | ++ | ++ | + | + | + |

TABLE B4

|  | polyamic acid solution | acid component s-BPDA (mol %) | acid component PMDA (mol %) | diamine PTDA (mol %) | Tg (° C.) | Td5(N2) (° C.) |
|---|---|---|---|---|---|---|
| Film-forming Ex. B15 | P | 75 | 25 | 100 | 320 | 486 |
| Film-forming Ex. B16 | Q | 50 | 50 | 100 | 327 | 498 |
| Film-forming Ex. B17 | R | 25 | 75 | 100 | 332 | 505 |

TABLE B5

| polyimide film | acid component s-BPDA (mol %) | acid component PMDA (mol %) | diamine PTDA (mol %) | NMP | DMAc | DMI |
|---|---|---|---|---|---|---|
| Example B15 | P | 75 | 25 | 100 | ++ | ++ | ++ |
| Example B16 | Q | 50 | 50 | 100 | ++ | ++ | ++ |
| Example B17 | R | 25 | 75 | 100 | ++ | ++ | + |

| | polyamic acid solution | acid component s-BPDA (mol %) | acid component PMDA (mol %) | diamine PTDA (mol %) | diamine p-ATDA (mol %) | CTE (ppm/k) |
|---|---|---|---|---|---|---|
| Film-forming Ex. B2 | B | 100 | 0 | 100 | 0 | 23 |
| Film-forming Ex. B15 | P | 75 | 25 | 100 | 0 | 21 |
| Film-forming Ex. B16 | Q | 50 | 50 | 100 | 0 | 21 |
| Film-forming Ex. B17 | R | 25 | 75 | 100 | 0 | 21 |
| Film-forming Ex. B1 | A | 0 | 100 | 100 | 0 | 20 |
| Film-forming Ex. B7 | G | 0 | 100 | 0 | 100 | 13 |
| Film-forming Ex. B8 | H | 100 | 0 | 0 | 100 | 24 |

<<Manufacturing of Polyimide-Metal Laminate and Evaluation of Peeling Strength>>

Example B18 s-BPDA/PTDA

Polyimide-metal laminate was manufactured using polyamic acid solution B. Polyimide-metal laminate was obtained by coating a rolled copper foil (BHY-13H-T, 18 μm thickness; Manufactured by JX Nippon Mining & Metals Corporation) with polyamic acid solution B and heating at 120° C. for 10 min, and further raising a temperature up to 400° C. taking 20 min. The thickness of the polyimide film in the polyimide-metal laminate was 25 μm. The result of 90°-peeling test of the polyimide-metal laminate showed that it had good adhesiveness and the film was broken at 0.86 kN/m. Therefore, the polyimide-metal laminate is presumed to have the peeling strength of 0.86 kN/m or higher.

Example B19

ODPA/PTDA

Polyimide-metal laminate was manufactured in similar manner as described in Example B18 except that polyamic acid solution K was used in place of polyamic acid solution B and peeling test was carried out. The result showed that it had good adhesiveness and the film was broken at 0.92 kN/m. Therefore, the polyimide-metal laminate is presumed to have the peeling strength of 0.92 kN/m or higher.

Example B20 s-BPDA/PMDA/PTDA=75/25/100
Polyimide-metal laminate was manufactured in similar manner as described in Example B18 except that polyamic acid solution P was used in place of polyamic acid solution B and peeling test was carried out. The result showed that it had good adhesiveness and the film was broken at 0.50 kN/m. Therefore, the polyimide-metal laminate is presumed to have the peeling strength of 0.50 kN/m or higher.

Example B21 s-BPDA/PMDA/PTDA=50/50/100
Polyimide-metal laminate was manufactured in similar manner as described in Example B18 except that polyamic acid solution Q was used in place of polyamic acid solution B and peeling test was carried out. The result showed that it had good adhesiveness and the film was broken at 0.60 kN/m. Therefore, the polyimide-metal laminate is presumed to have the peeling strength of 0.60 kN/m or higher.

Example B22 s-BPDA/PMDA/PTDA=25/75/100
Polyimide-metal laminate was manufactured in similar manner as described in Example B18 except that polyamic acid solution R was used in place of polyamic acid solution B and peeling test was carried out. The result showed that it had good adhesiveness and the film was broken at 0.65 kN/m. Therefore, the polyimide-metal laminate is presumed to have the peeling strength of 0.65 kN/m or higher.

<<Manufacturing of Polyimide Laminate and Evaluation of Peeling Strength>>

Example B22

Two-Layered Polyimide Laminate s-BPDA/PTDA
Two-layered polyimide laminate was manufactured using polyamic acid solution B. Except that a polyimide film (Upilex75 S, 75 μm thickness; manufacture by UBE Industries, Ltd.) was coated with polyamic acid solution B, a two-layered polyimide laminate was obtained in similar manner as described in Example B18, and the peeling test was conducted. The result showed that it had good adhesiveness and the film was broken at 0.88 kN/m. Therefore, the two-layered polyimide laminate is presumed to have the peeling strength of 0.88 kN/m or higher.

<<Solubility Test for Polyimide Solution (Preparation of Polyimide Solution)>>

Polyimides were prepared from polyamic acids by solution-imidization, and solubility test was conducted. The polyimides showing the result of "+" or better ("++" and "+") mean that the polyimide solutions were easily obtained (dissolved at room temperature or by heating easily).

<<Preparation of Polyimide from Solution-Imidization>>

(Preparation of Polyimide A)

PMDA/PTDA

Into a flask, polyamic acid solution A and NMP were charged so that polyamic acid solution A became 5 mass %. 5 mL of Toluene was added as azeotropic solvent and water was removed from the system by stirring at 140° C. for 3 hours, and further stirred at 200° C. for 3 hours to carry out imidization reaction. The reaction solution was poured into methanol to precipitate a solid matter, and the crude product was obtained after suction filtration. The obtained crude product was dissolved in NMP and re-precipitated, and was dried in vacuo at 80° C. to give polyimide A in flake-form.

(Preparation of Polyimide B)

s-BPDA/PTDA

Polyimide B in flake-form was prepared in a similar manner to the preparation of polyimide A except that polyamic acid solution B was used in place of polyamic acid solution A.

(Preparation of Polyimide C)

DSDA/PTDA

Polyimide C in flake-form was prepared in a similar manner to the preparation of polyimide A except that polyamic acid solution C was used in place of polyamic acid solution A.

(Preparation of Polyimide D)

BTDA/PTDA

Polyimide D in flake-form was prepared in a similar manner to the preparation of polyimide A except that polyamic acid solution D was used in place of polyamic acid solution A.

(Preparation of Polyimide E)

ODPA/PTDA

Polyimide E in flake-form was prepared in a similar manner to the preparation of polyimide A except that polyamic acid solution E was used in place of polyamic acid solution A.

(Preparation of Polyimide F)

6 FDA/PTDA

Polyimide F in flake-form was prepared in a similar manner to the preparation of polyimide A except that polyamic acid solution F was used in place of polyamic acid solution A.

(Preparation of Polyimide G)

PMDA/p-ATDA

Polyimide G in flake-form was prepared in a similar manner to the preparation of polyimide A except that polyamic acid solution G was used in place of polyamic acid solution A.

(Preparation of Polyimide H)

s-BPDA/p-ATDA

Polyimide H in flake-form was prepared in a similar manner to the preparation of polyimide A except that polyamic acid solution H was used in place of polyamic acid solution A.

(Preparation of Polyimide I)

DSDA/p-ATDA

Polyimide I in flake-form was prepared in a similar manner to the preparation of polyimide A except that polyamic acid solution I was used in place of polyamic acid solution A.

(Preparation of Polyimide J)

BTDA/p-ATDA

Polyimide J in flake-form was prepared in a similar manner to the preparation of polyimide A except that polyamic acid solution J was used in place of polyamic acid solution A.

(Preparation of Polyimide K)

ODPA/p-ATDA

Polyimide K in flake-form was prepared in a similar manner to the preparation of polyimide A except that polyamic acid solution K was used in place of polyamic acid solution A.

(Preparation of Polyimide L)

6 FDA/p-ATDA

Polyimide L in flake-form was prepared in a similar manner to the preparation of polyimide A except that polyamic acid solution L was used in place of polyamic acid solution A.

(Preparation of Polyimide P)

s-BPDA/PMDA/PTDA=75/25/100

Polyimide P in flake-form was prepared in a similar manner to the preparation of polyimide A except that polyamic acid solution P was used in place of polyamic acid solution A.

(Preparation of Polyimide Q)

s-BPDA/PMDA/PTDA=50/50/100

Polyimide Q in flake-form was prepared in a similar manner to the preparation of polyimide A except that polyamic acid solution Q was used in place of polyamic acid solution A.

(Preparation of Polyimide R)

s-BPDA/PMDA/PTDA=25/75/100

Polyimide R in flake-form was prepared in a similar manner to the preparation of polyimide A except that polyamic acid solution R was used in place of polyamic acid solution A.

(Preparation of Polyimide S)

s-BPDA/p-ATDA=100/100

Into a flask, polyamic acid solution S and NMP in such amounts that polyamic acid solution S became 5 mass %, and pyridine and acetic anhydride as chemical imidization catalyst were charged. The imidization reaction was carried out by stirring the mixture at 100° C. for 10 hours. The reaction solution was poured into methanol to precipitate a solid matter, and the crude product was obtained after suction filtration. The obtained crude product was dissolved in NMP and re-precipitated, and was dried in vacuo at 80° C. to give polyimide S in flake-form.

(Preparation of Polyimide T)

s-BPDA/PMDA/p-ATDA=50/50/100

Polyimide T in flake-form was prepared in a similar manner to the preparation of polyimide S except that polyamic acid solution T was used in place of polyamic acid solution S.

(Preparation of Polyimide U)

PMDA/p-ATDA=100/100

Polyimide U in flake-form was prepared in a similar manner to the preparation of polyimide S except that polyamic acid solution U was used in place of polyamic acid solution S.

(Preparation of Polyimide V)

s-BPDA/p-ATDA/m-ATDA=100/70/30

Polyimide V in flake-form was prepared in a similar manner to the preparation of polyimide S except that polyamic acid solution V was used in place of polyamic acid solution S.

(Preparation of Polyimide W)

s-BPDA/p-ATDA/m-ATDA=100/50/50

Polyimide W in flake-form was prepared in a similar manner to the preparation of polyimide S except that polyamic acid solution W was used in place of polyamic acid solution S.

(Preparation of Polyimide X)

s-BPDA/p-ATDA/m-ATDA=100/30/70

Polyimide X in flake-form was prepared in a similar manner to the preparation of polyimide S except that polyamic acid solution X was used in place of polyamic acid solution S.

(Preparation of Polyimide Y)

s-BPDA/m-ATDA=100/100

Polyimide Y in flake-form was prepared in a similar manner to the preparation of polyimide S except that polyamic acid solution Y was used in place of polyamic acid solution S.

(Preparation of Polyimide Z)

DSDA/p-ATDA=100/100

Polyimide Z in flake-form was prepared in a similar manner to the preparation of polyimide S except that polyamic acid solution Z was used in place of polyamic acid solution S.

(Preparation of Polyimide Z1)

6 FDA/p-ATDA=100/100

Polyimide Z1 in flake-form was prepared in a similar manner to the preparation of polyimide S except that polyamic acid solution Z1 was used in place of polyamic acid solution S.

Example B24

Preparation of Polyimide Solution A2

Solubility test of polyimide A to various organic solvents was conducted, and the preparation of polyimide solution A2 was tried. The results are shown in Table B7.

Example B25

Preparation of Polyimide Solution B2

Solubility test of polyimide B to various organic solvents was conducted, and the preparation of polyimide solution B2 was tried. The results are shown in Table B7.

Example B26

Preparation of Polyimide Solution C2

Solubility test of polyimide C to various organic solvents was conducted, and the preparation of polyimide solution C2 was tried. The results are shown in Table B7.

Example B27

Preparation of Polyimide Solution D2

Solubility test of polyimide D to various organic solvents was conducted, and the preparation of polyimide solution D2 was tried. The results are shown in Table B7.

Example B28

Preparation of Polyimide Solution E2

Solubility test of polyimide E to various organic solvents was conducted, and the preparation of polyimide solution E2 was tried. The results are shown in Table B7.

Example B29

Preparation of Polyimide Solution F2

Solubility test of polyimide F to various organic solvents was conducted, and the preparation of polyimide solution F2 was tried. The results are shown in Table B7.

Example B30

Preparation of Polyimide Solution P2

Solubility test of polyimide P to various organic solvents was conducted, and the preparation of polyimide solution P2 was tried. The results are shown in Table B8.

Example B31

Preparation of Polyimide Solution Q2

Solubility test of polyimide Q to various organic solvents was conducted, and the preparation of polyimide solution Q2 was tried. The results are shown in Table B8.

Example B32

Preparation of Polyimide Solution R2

Solubility test of polyimide R to various organic solvents was conducted, and the preparation of polyimide solution R2 was tried. The results are shown in Table B8.

Example B33

Preparation of Polyimide Solution H2

Solubility test of polyimide H to various organic solvents was conducted, and the preparation of polyimide solution H2 was tried. The results are shown in Table B9.

Example B34

Preparation of Polyimide Solution I2

Solubility test of polyimide I to various organic solvents was conducted, and the preparation of polyimide solution I2 was tried. The results are shown in Table B9.

Example B35

Preparation of Polyimide Solution J2

Solubility test of polyimide J to various organic solvents was conducted, and the preparation of polyimide solution J2 was tried. The results are shown in Table B9.

Example B36

Preparation of Polyimide Solution K2

Solubility test of polyimide K to various organic solvents was conducted, and the preparation of polyimide solution K2 was tried. The results are shown in Table B9.

Example B37

Preparation of Polyimide Solution L2

Solubility test of polyimide L to various organic solvents was conducted, and the preparation of polyimide solution L2 was tried. The results are shown in Table B9.

Example B38

Preparation of Polyimide Solution S2

Solubility test of polyimide S to various organic solvents was conducted, and the preparation of polyimide solution S2 was tried. The results are shown in Table B10.

Example B39

Preparation of Polyimide Solution V2

Solubility test of polyimide V to various organic solvents was conducted, and the preparation of polyimide solution V2 was tried. The results are shown in Table B11.

Example B40

Preparation of Polyimide Solution W2

Solubility test of polyimide W to various organic solvents was conducted, and the preparation of polyimide solution W2 was tried. The results are shown in Table B11.

Example B41

Preparation of Polyimide Solution X2

Solubility test of polyimide X to various organic solvents was conducted, and the preparation of polyimide solution X2 was tried. The results are shown in Table B11.

Example B42

Preparation of Polyimide Solution Y2

Solubility test of polyimide Y to various organic solvents was conducted, and the preparation of polyimide solution Y2 was tried. The results are shown in Table B11.

Example B43

Preparation of Polyimide Solution Z2

NMP solution of polyimide Z was prepared to give polyimide solution Z2.

Example B44

Preparation of Polyimide Solution Z1-2

NMP solution of polyimide Z1 was prepared to give polyimide solution Z1-2.

TABLE B7

| | polyimide in flake-form | acid component | diamine | NMP | DMAc | DMI | DMSO | y-BL | THF |
|---|---|---|---|---|---|---|---|---|---|
| Example B24 | A | PMDA | PTDA | ++ | ± | ± | ± | − | − |
| Example B25 | B | s-BPDA | PTDA | ++ | + | ++ | ± | ± | − |
| Example B26 | C | DSDA | PTDA | ++ | ++ | ++ | ± | ± | − |
| Example B27 | D | BTDA | PTDA | ++ | ++ | ++ | ++ | ± | − |
| Example B28 | E | ODPA | PTDA | ++ | ++ | ++ | ++ | ++ | − |
| Example B29 | F | 6FDA | PTDA | ++ | ++ | ++ | ++ | ++ | ++ |

TABLE B8

| | polyimide in flake-form | acid component s-BPDA (mol %) | acid component PMDA (mol %) | diamine PTDA (mol %) | NMP | DMAc | DMI |
|---|---|---|---|---|---|---|---|
| Example B30 | P | 75 | 25 | 100 | ++ | ++ | ++ |
| Example B31 | Q | 50 | 50 | 100 | ++ | ++ | ++ |
| Example B32 | R | 25 | 75 | 100 | ++ | ± | + |

TABLE B9

| | polyimide in flake-form | acid component | diamine | NMP | DMAc | DMI | DMF | y-BL |
|---|---|---|---|---|---|---|---|---|
| Example B33 | H | s-BPDA | p-ATDA | ++ | ++ | ++ | ++ | ± |
| Example B34 | I | DSDA | p-ATDA | ++ | ++ | ++ | ++ | + |
| Example B35 | J | BTDA | p-ATDA | ++ | ++ | ++ | ++ | + |
| Example B36 | K | ODPA | p-ATDA | ++ | ++ | ++ | ++ | + |
| Example B37 | L | 6FDA | p-ATDA | ++ | ++ | ++ | ++ | + |

TABLE B10

| | polyimide in flake-form | acid component s-BPDA (mol %) | acid component PMDA (mol %) | diamine p-ATDA (mol %) | NMP | DMAc | DMI | DMF |
|---|---|---|---|---|---|---|---|---|
| Example B38 | S | 100 | 0 | 100 | ++ | ++ | ++ | ++ |

TABLE B11

| | polyimide in flake-form | acid component s-BPDA (mol %) | diamine p-ATDA (mol %) | diamine m-ATDA (mol %) | NMP | DMAc |
|---|---|---|---|---|---|---|
| Example B39 | V | 100 | 70 | 30 | ++ | ++ |
| Example B40 | W | 100 | 50 | 50 | ++ | ++ |
| Example B41 | X | 100 | 30 | 70 | ++ | ++ |
| Example B42 | Y | 100 | 0 | 100 | ++ | ++ |

Film-forming Example B18

Preparation of Polyimide Film P2 s-BPDA/PMDA/PTDA=75/25/100

Polyimide film P2 was obtained in similar manner as described for the preparation of polyimide film A (Film-forming Example B1) except that polyimide solution P2 was used in place of polyamic acid solution A. CTE of polyimide film P2 is shown in Table B12. CTE was such a low value as 25 ppm/K.

Film-forming Example B19

Preparation of Polyimide Film Q2 s-BPDA/PMDA/PTDA=50/50/100
Polyimide film Q2 was obtained in similar manner as described for the preparation of polyimide film A (Film-forming Example B1) except that polyimide solution Q2 was used in place of polyamic acid solution A. CTE of polyimide film Q2 is shown in Table B12. CTE was such a low value as 20 ppm/K.

Film-forming Example B20

Preparation of Polyimide Film S2 s-BPDA/p-ATDA

Polyimide film S2 was obtained in similar manner as described for the preparation of polyimide film A (Film-forming Example B1) except that polyimide solution S2 was used in place of polyamic acid solution A. CTE of polyimide film S2 is shown in Table B12. CTE was such a low value as 31 ppm/K.

TABLE 12

| | polyimide in flake-form | acid component s-BPDA (mol %) | acid component PMDA (mol %) | diamine PTDA (mol %) | diamine p-ATDA (mol %) | CTE (ppm/K) |
|---|---|---|---|---|---|---|
| Film-forming Ex. B18 | P | 75 | 25 | 100 | 0 | 25 |
| Film-forming Ex. B19 | Q | 50 | 50 | 100 | 0 | 20 |
| Film-forming Ex. B20 | S | 100 | 0 | 0 | 100 | 31 |

<<Manufacturing of Polyimide-Metal Laminate and Evaluation of Peeling Strength>>

Example B45

6 FDA/PTDA

Polyimide-metal laminate was manufactured in similar manner as described in Example B18 except that polyimide solution F2 obtained by dissolving polyimide F in NMP at room temperature in concentration of 20.8 mass % was used in place of polyamic acid solution B and peeling test was carried out. The result showed that it had good adhesiveness and the film was broken at 0.92 kN/m. Therefore, the polyimide-metal laminate is presumed to have the peeling strength of 0.92 kN/m or higher.

Example B46 s-BPDA/PMDA/PTDA=75/25/100

Polyimide-metal laminate was manufactured in similar manner as described in Example B18 except that polyimide solution P2 obtained by dissolving polyimide P in NMP at room temperature in concentration of 20.0 mass % was used in place of polyamic acid solution B and peeling test was carried out. The result showed that it had good adhesiveness and the film was broken at 0.82 kN/m. Therefore, the polyimide-metal laminate is presumed to have the peeling strength of 0.82 kN/m or higher.

Example B47 s-BPDA/PMDA/PTDA=50/50/100

Polyimide-metal laminate was manufactured in similar manner as described in Example B18 except that polyimide solution Q2 obtained by dissolving polyimide Q in NMP at room temperature in concentration of 15.4 mass % was used in place of polyamic acid solution B and peeling test was carried out. The result showed that it had good adhesiveness and the film was broken at 0.79 kN/m. Therefore, the polyimide-metal laminate is presumed to have the peeling strength of 0.79 kN/m or higher.

Example B48

BTDA/PTDA

Polyimide-metal laminate was manufactured in similar manner as described in Example B18 except that polyimide solution D2 obtained by dissolving polyimide D in NMP at room temperature in concentration of 14.0 mass % was used in place of polyamic acid solution B and heated up to 350° C., and peeling test was carried out. The result showed that it had good adhesiveness and the film was broken at 0.53 kN/m. Therefore, the polyimide-metal laminate is presumed to have the peeling strength of 0.53 kN/m or higher.

Example B49

ODPA/PTDA

A polyimide solution E2 obtained by dissolving polyimide E in NMP at room temperature in concentration of 18.0 mass % was cast as a thin film on a glass plate, and heated by a hot plate at 123° C. for 720 sec. The film was peeled from the glass plate to give a self-supporting film. This self-supporting film was fixed at four sides with pin tenters and heated for imidization in an oven continuously from 150° C. to 320° C. for 9 min, to produce a polyimide film having a thickness of 50 µm. Then, on the both surface of the obtained polyimide film, copper foils (3 EC-VLP, 18 µm, available from Mitsui Mining & Smelting Co., Ltd.) were laminated by pressing under the condition of 320° C. and 4 MPa for 10 minutes to produce a polyimide-metal laminate, and peeling test was carried out. The result showed that it had good adhesiveness and it was 0.77 kN/m.

Example B50

PMDA/PTDA

Polyimide-metal laminate was manufactured in similar manner as described in Example B18 except that polyamic acid solution A was used in place of polyamic acid solution B and peeling test was carried out. The result showed that it had good adhesiveness and the film was broken at 0.71 kN/m. Therefore, the polyimide-metal laminate is presumed to have the peeling strength of 0.71 kN/m or higher.

Example B51

DSDA/PTDA

Polyimide-metal laminate was manufactured in similar manner as described in Example B18 except that polyamic acid solution C was used in place of polyamic acid solution B and heated up to 350° C., and peeling test was carried out. The result showed that it had good adhesiveness and the film was peeled off at 0.56 kN/m.

Example B52

ODPA/PTDA

Polyimide-metal laminate was manufactured in similar manner as described in Example B18 except that polyimide solution E2 obtained by dissolving polyimide E in NMP at room temperature in concentration of 25.0 mass % was used in place of polyamic acid solution B and peeling test was carried out. The result showed that it had good adhesiveness and the film was broken at 0.87 kN/m. Therefore, the polyimide-metal laminate is presumed to have the peeling strength of 0.87 kN/m or higher.

Example B53

DSDA/PTDA

Polyimide-metal laminate was manufactured in similar manner as described in Example B18 except that polyimide solution C2 obtained by dissolving polyimide C in NMP at room temperature in concentration of 25.0 mass % was used in place of polyamic acid solution B and peeling test was carried out. The result showed that it had good adhesiveness and the film was broken at 0.75 kN/m. Therefore, the polyimide-metal laminate is presumed to have the peeling strength of 0.75 kN/m or higher.

Example B54

ODPA/p-ATDA

Polyimide-metal laminate was manufactured in similar manner as described in Example B18 except that polyimide solution K2 obtained by dissolving polyimide K in NMP at room temperature in concentration of 20.0 mass % was used in place of polyamic acid solution B and peeling test was carried out. The result showed that it had good adhesiveness and the film was broken at 1.08 kN/m. Therefore, the polyimide-metal laminate is presumed to have the peeling strength of 1.08 kN/m or higher.

Example B55 s-BPDA/p-ATDA

Polyimide-metal laminate was manufactured in similar manner as described in Example B18 except that polyimide solution S2 obtained by dissolving polyimide S in NMP at room temperature in concentration of 11.0 mass % was used in place of polyamic acid solution B and peeling test was carried out. The result showed that it had good adhesiveness and the film was broken at 0.40 kN/m. Therefore, the polyimide-metal laminate is presumed to have the peeling strength of 0.40 kN/m or higher.

Example B56

DSDA/p-ATDA

Polyimide-metal laminate was manufactured in similar manner as described in Example B18 except that polyimide solution Z2 obtained by dissolving polyimide Z in NMP at room temperature in concentration of 20.0 mass % was used in place of polyamic acid solution B and heated up to 350° C., and peeling test was carried out. The result showed that it had good adhesiveness and the film was broken at 0.51 kN/m. Therefore, the polyimide-metal laminate is presumed to have the peeling strength of 0.51 kN/m or higher.

Example B57

6 FDA/p-ATDA

Polyimide-metal laminate was manufactured in similar manner as described in Example B18 except that polyimide solution Z1-2 obtained by dissolving polyimide Z1 in NMP at room temperature in concentration of 15.0 mass % was used in place of polyamic acid solution B and heated up to 300° C., and peeling test was carried out. The result showed that it had good adhesiveness and the film was broken at 1.06 kN/m. Therefore, the polyimide-metal laminate is presumed to have the peeling strength of 1.06 kN/m or higher.

Example B58

The rotational viscosity at 30° C. of polyimide solution S2 (solvent: NMP) just after the preparation, and the rotational viscosity at 30° C. of the same solution after storing for 2 weeks at 23° C. and 40° C. were measured. From these values, solution viscosity holding ratio after 2 weeks (=viscosity after storage/viscosity just after the preparation) were calculated. It was 97% for the storage of 2 weeks at 23° C., and 92% for the storage of 2 weeks at 40° C., showing high viscosity-holding ratio. Next polyimide solution S2 (solvent: NMP) just after the preparation was stored for 4 weeks at 23° C. and 40° C. and their rotational viscosity at 30° C. were measured, and solution viscosity holding ratio after 4 weeks was calculated. Resultantly, it was as high as 97% for the storage of 4 weeks at 23° C., and 89% for the storage of 4 weeks at 40° C., showing that the polyimide solution has very high storage stability.

From the above examples and referential examples, mainly the following findings have become clear.

(1) With respect to polyimide films formed by thermal imidization of the self-supporting films of polyamic acids, the film formed by using PTDA as a diamine has same or higher solubility than the film formed by using p-ATDA having one less phenyl substitution group.

(2) Bonding peeling strengths of polyimide-metal laminates obtained by applying polyamic acids on metal layers and curing thereof are 0.5 to 0.92 kN/m, particularly 0.86 to 0.92 kN/m, as high as films are broken.

(3) Bonding peeling strength of a two-layered polyimide laminate obtained by applying a polyamic acid on a polyimide film and curing thereof is 0.88 kN/m, as high as the film is broken.

(4) When 6 FDA is used as a tetracarboxylic acid component, the polyimide has high solubility in such organic solvents as γ-butyrolactone and THF. The polyimide solution obtained by using these components is effective in coating applications.

(5) When CBDA is used as a tetracarboxylic acid component, the polyimide exhibits high solubility in γ-butyrolactone. The polyimide solution obtained by using these components is effective in coating applications.

(6) From the comparison of Table B1 and Table B5, with respect to polyimide films formed by thermal imidization of the self-supporting films of polyamic acids obtained using s-BPDA and PMDA as tetracarboxylic acid component and PTDA as diamine component in which the molar ratio of the three components are s-BPDA/PMDA/PTDA=75/25/100-25/75/100, the films exhibit very good solubility at room temperature in NMP, DMAc and DMI. The solubility to organic solvents of polyimide films obtained by using PMDA as tetracarboxylic acid component can be increased by using s-BPDA together.

(7) From Table B8, with respect to polyimides in flake-form formed from solution-imidization of polyamic acids obtained using s-BPDA and PMDA as tetracarboxylic acid component and PTDA as diamine component in which the molar ratio of the three components are s-BPDA/PMDA/PTDA=75/25/100-50/50/100, the polyimides exhibit very good solubility at room temperature in NMP, DMAc and DMI.

(8) Bonding peeling strengths of polyimide-metal laminates obtained by applying polyimide solutions and curing thereof are 0.53 to 0.92 kN/m, as high as films are broken.

(9) Bonding peeling strengths of polyimide-metal laminates formed by thermal-pressing copper foils on both side of the polyimide film that is obtained by casting a polyimide solutions and curing thereof, is 0.77 kN/m, as high as it reaches cohesive failure of the film.

(10) The storage stability of polyimide solutions is very high.

The invention claimed is:

1. A polyimide precursor comprising a structural unit represented by general formula (AI):

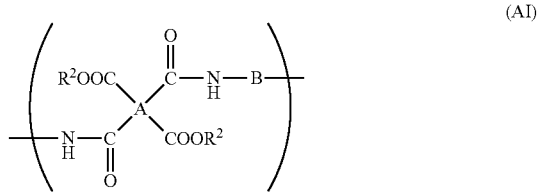

(AI)

wherein A is tetravalent aromatic group or aliphatic group, B is a divalent aromatic group, and each $R^2$ independently represents hydrogen, an alkyl group having 1 to 6 carbon atoms, or an alkylsilyl group having 3 to 9 carbon atoms, wherein B in general formula (AI) comprises a triazine moiety represented by the following formula (AB1):

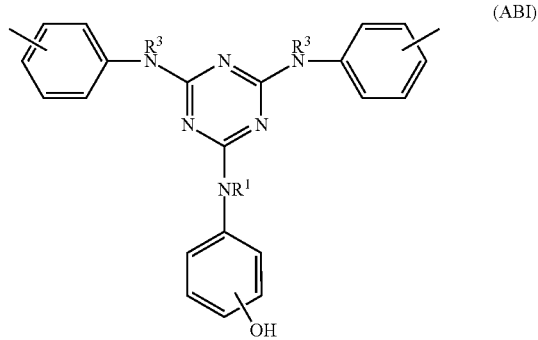

(AB1)

wherein $R^1$ is hydrogen, an alkyl group having 1 to 6 carbon atoms or an aromatic group, and $R^3$ is hydrogen, methyl or ethyl.

2. A polyimide precursor according to claim 1, wherein A in general formula (AI) comprises a tetravalent aromatic group obtainable by removing two carboxylic anhydride groups from a compound selected from the group consisting of 3,3',4,4'-biphenyltetracarboxylic dianhydride, 4,4'-oxydiphthalic dianhydride and 3,3',4,4'-benzophenonetetracarboxylic dianhydride.

3. A polyimide precursor according to claim 1, wherein A in general formula (AI) comprises a tetravalent aromatic group obtainable by removing two carboxylic anhydride groups from pyromellitic dianhydride.

4. A polyimide precursor according to claim 1, wherein B in general formula (AI) comprises the triazine moiety represented by general formula (AB 1) in an amount of 10 to 100 mol %.

5. A polyimide obtainable from the polyimide precursor according to claim 1, comprising a structural unit represented by general formula (AII):

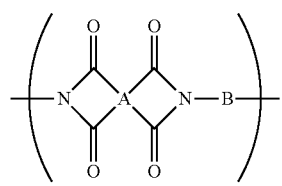

(AII)

wherein A and B are as defined above.

6. A polyimide film comprising the polyimide according to claim 5.

7. A metal laminate comprising the polyimide film according to claim 6 and a metal layer laminated on the polyimide film directly or via an adhesive.

8. A process for manufacturing a polyimide film, comprising:
reacting a tetracarboxylic dianhydride component with a diamine component comprising a diamine compound represented by general formula (AB2) in an organic solvent;
removing the organic solvent to obtain a solid polyimide;
dissolving the solid polyimide in an organic solvent;
flow-casting or applying the obtained polyimide solution on a support; and
heating at 80 to 150 ° C. or lower,

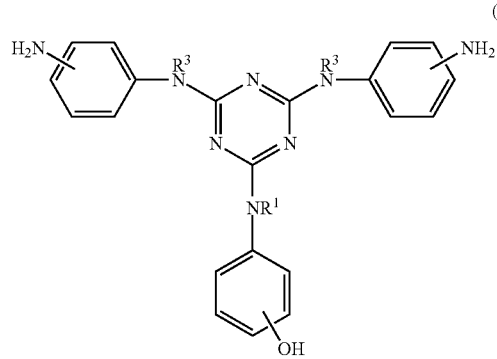

(AB2)

wherein $R^1$ is hydrogen, an alkyl group having 1 to 6 carbon atoms or an aromatic group, and $R^3$ is hydrogen, methyl or ethyl.

9. A process for manufacturing a polyimide film, comprising:
reacting a tetracarboxylic dianhydride component with a diamine component comprising a diamine compound represented by general formula (AB2) in an organic solvent;
removing the organic solvent to obtain a solid polyimide;
dissolving the solid polyimide in an organic solvent;
flow-casting or applying the obtained polyimide solution on a support; and
heating at 280 to 350 ° C. or lower,

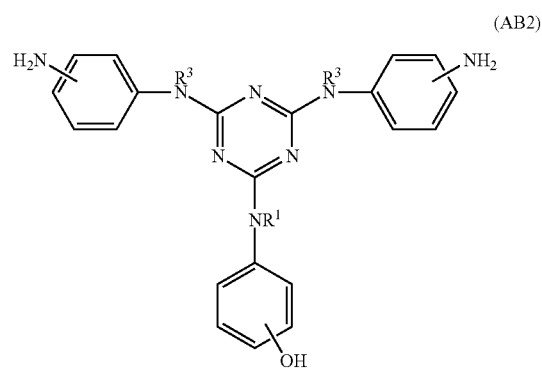

(AB2)

wherein $R^1$ is hydrogen, an alkyl group having 1 to 6 carbon atoms or an aromatic group, and $R^3$ is hydrogen, methyl or ethyl.

10. A polyimide solution comprising a polyimide dissolved in an organic solvent, the polyimide comprising a structural unit represented by general formula (BII):

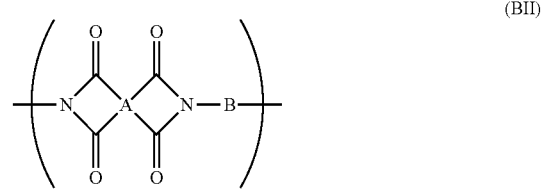

(BII)

wherein A is a tetravalent aromatic group or aliphatic group, and B is a divalent aromatic group,
wherein in the polyimide, B in general formula (BII) comprises a triazine moiety represented by the following formula (BB 1):

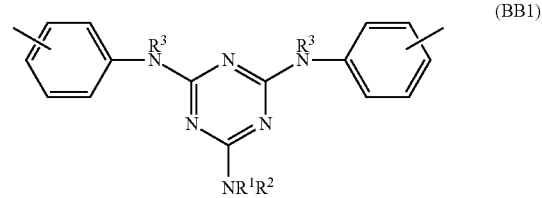

(BB1)

wherein $R^1$ and $R^2$ each independently represent hydrogen or alkyl or aryl having 1 to 12 carbon atoms, and $R^3$ is hydrogen, methyl or ethyl.

11. The polyimide solution according to claim 10, wherein in the polyimide, B in general formula (BII) comprises the triazine moiety in which $R^1$ and $R^2$ are both phenyl.

12. The polyimide solution according to claim 10, wherein in the polyimide, A in general formula (BII) comprises a tetravalent residue obtainable by removing two carboxylic anhydride groups from a compound selected from the group consisting of 3,3',4,4'-biphenyltetracarboxylic dianhydride, 3,3',4,4'-diphenyl sulfone-tetracarboxylic dianhydride, 4,4'-oxydiphthalic dianhydride and 2,2-bis(3,4-dicarboxyphenyl)-1,1,1,3,3,3-hexafluoropropane dianhydride.

13. The polyimide solution according to claim 10, wherein in the polyimide, A in general formula (BII) comprises a tetravalent residue obtainable by removing two carboxylic anhydride groups from 2,2-bis(3,4-dicarboxyphenyl)-1,1,1,3,3,3-hexafluoropropane dianhydride.

14. The polyimide solution according to claim 10, wherein the organic solvent is selected from the group consisting of N-methylpyrrolidone, N,N-dimethylacetamide and γ-butyrolactone.

15. The polyimide solution according to claim 13, wherein the organic solvent is tetrahydrofuran or γ-butyrolactone.

16. The polyimide solution according to claim 10, wherein B in general formula (BII) comprises the triazine moiety represented by general formula (BB1) in an amount of 10 to 100 mol %.

17. A method for producing a polyimide solution according to claim 10, the method comprising:
producing a polyimide precursor solution comprising a polyimide precursor and a first organic solvent, wherein the polyimide precursor comprises a structural unit represented by general formula (BI):

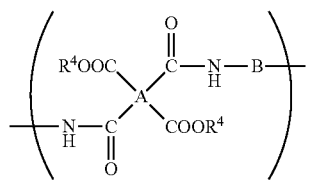

(BI)

wherein A is tetravalent aromatic group or aliphatic group, B is a divalent aromatic group, and each $R^4$ independently represents hydrogen, an alkyl group having 1 to 6 carbon atoms, or an alkylsilyl group having 3 to 9 carbon atoms, wherein B in general formula (BI) comprises a triazine moiety represented by following formula (BB 1):

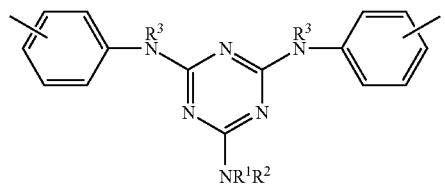

(BB1)

wherein each $R^1$ and $R^2$ independently represents hydrogen or alkyl or aryl having 1 to 12 carbon atoms, and $R^3$ represents hydrogen, methyl or ethyl;
imidizing while removing the first organic solvent to obtain a polyimide; and
dissolving the obtained polyimide in a second organic solvent to obtain the polyimide solution.

18. A method for producing a polyimide solution according to claim 17, wherein tetracarboxylic dianhydride component constituting A in formula (BI) comprises 3,3',4,4'-biphenyltetracarboxylic dianhydride and pyromellitic dianhydride, wherein a molar ratio of 3,3',4,4'-biphenyltetracarboxylic dianhydride and pyromellitic dianhydride is 75/25 to 25/75.

19. A method for producing a polyimide solution according to claim 10, the method comprising:
reacting tetracarboxylic dianhydride component with diamine component comprising a triazine compound represented by general formula (BB2):

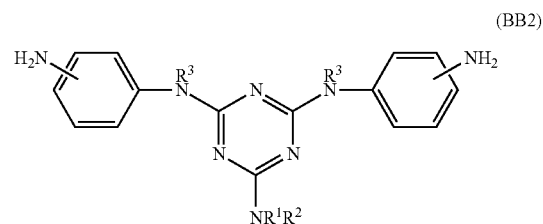

(BB2)

wherein each $R^1$ and $R^2$ independently represents hydrogen or alkyl or aryl having 1 to 12 carbon atoms, and $R^3$ represents hydrogen, methyl or ethyl,
to form a first polyimide solution comprising a polyimide and a first organic solvent; the polyimide comprising a structural unit represented by general formula (BII):

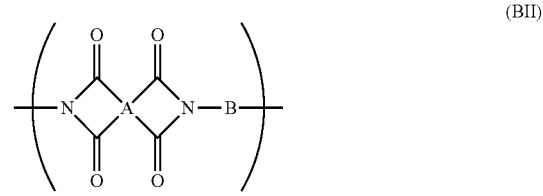

(BII)

wherein A is tetravalent aromatic group or aliphatic group, and B is divalent aromatic group, wherein in the polyimide, B in general formula (BII) comprises a triazine moiety represented by the following formula (BB1):

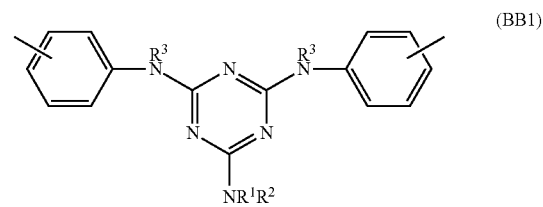

(BB1)

wherein each $R^1$ and $R^2$ independently represents hydrogen or alkyl or aryl having 1 to 12 carbon atoms, and $R^3$ represents hydrogen, methyl or ethyl;
obtaining a polyimide in a form of solid from the first polyimide solution; and
dissolving the obtained polyimide in a form of solid in a second organic solvent to obtain a second polyimide solution.

20. A method for producing a polyimide solution according to claim 10, wherein the tetracarboxylic dianhydride component comprising A in formula (BI) comprises 3,3',4,4'-biphenyltetracarboxylic dianhydride and pyromellitic dianhydride, wherein a molar ratio of 3,3',4,4'-biphenyltetracarboxylic dianhydride and pyromellitic dianhydride is 75/25 to 50/50.

* * * * *

UNITED STATES PATENT AND TRADEMARK OFFICE
CERTIFICATE OF CORRECTION

PATENT NO. : 9,556,312 B2
APPLICATION NO. : 14/401058
DATED : January 31, 2017
INVENTOR(S) : Yoshiyuki Oishi et al.

It is certified that error appears in the above-identified patent and that said Letters Patent is hereby corrected as shown below:

In the Specification

Column 9, Line 33, "5,8,11," should be --5,6,11,--.

Column 10, Line 42, "R'" should be --$R^1$--.

Column 14, Lines 31-32, "tirethyleneglycol" should be --triethyleneglycol--.

Column 20, Line 32, "of;" should be --of:--.

Column 21, Line 14, "of;" should be --of:--.

Column 21, Line 35, "(BII);" should be --(BII):--.

Column 26, Line 54, "5-riazine." should be --5-triazine.--.

Column 36, Line 48, "9.01 (s, 1H$_2$OH)" should be --9.01 (s, 1H, OH)--.

Column 37, Line 32, "($C_{10}H_{18}N_4OCl_2$)" should be --($C_{10}H_8N_4OCl_2$)--.

Column 38, Line 15, "CH3)" should be --$CH_3$)--.

Column 38, Line 19, "($C22H_{22}N^{80}$" should be --($C_{22}H_{22}N_8O$--.

Column 40, Line 43, "s-BPDAJAHHT" should be --s-BPDA/AHHT--.

Column 42, Line 67, "A1. t" should be --A1.--.

Column 46, Line 41, "12" should be --I2--.

Signed and Sealed this
Twentieth Day of June, 2017

Joseph Matal
*Performing the Functions and Duties of the
Under Secretary of Commerce for Intellectual Property and
Director of the United States Patent and Trademark Office*

Column 46, Line 42, "13" should be --I3--.

Column 46, Line 46, "12" should be --I2--.

Column 46, Line 46, "13" should be --I3--.

Column 46, Line 51, "13" should be --I3--.

Column 50, Line 33, after "(TMAH)" insert --.--.

Column 52, Line 47, "s-BPDAJPMDA=50/50." should be --s-BPDA/PMDA=50/50.--.

Column 58, Line 22, "0" should be --O--.

Column 66, Line 63, "12" should be --I2--.

Column 66, Line 66, "12" should be --I2--.

In the Claims

Column 75, Line 8 (Claim 2), "3,3',4,4 '-" should be --3,3',4,4'- --.

Column 75, Line 9 (Claim 2), "3,3',4,4 '-" should be --3,3',4,4'- --.

Column 75, Line 18 (Claim 4), "(AB 1)" should be --(AB1)--.